United States Patent
Zhou

(10) Patent No.: US 10,003,531 B2
(45) Date of Patent: Jun. 19, 2018

(54) METHOD FOR ESTABLISHING TUNNEL, METHOD FOR ALLOCATING LABEL, DEVICE AND NETWORK SYSTEM

(71) Applicant: Huawei Technologies Co., Ltd., Shenzhen (CN)

(72) Inventor: Peng Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 273 days.

(21) Appl. No.: 14/986,144

(22) Filed: Dec. 31, 2015

(65) Prior Publication Data

US 2016/0119229 A1    Apr. 28, 2016

Related U.S. Application Data

(63) Continuation of application No. PCT/CN2013/078887, filed on Jul. 5, 2013.

(51) Int. Cl.
*H04L 12/723* (2013.01)
*H04L 12/46* (2006.01)
(Continued)

(52) U.S. Cl.
CPC ........ *H04L 45/507* (2013.01); *H04L 12/4633* (2013.01); *H04L 12/4641* (2013.01); *H04L 12/6418* (2013.01); *H04L 45/02* (2013.01)

(58) Field of Classification Search
None
See application file for complete search history.

(56) References Cited

U.S. PATENT DOCUMENTS 7,567,577 B2 * 7/2009 Thubert .................. H04L 45/02
370/401
7,656,857 B2 * 2/2010 Thubert .................. H04L 45/12
370/238
(Continued)

FOREIGN PATENT DOCUMENTS

CN    102041199 A    5/2011
CN    102355402 A    2/2012
(Continued)

OTHER PUBLICATIONS

Bashandy, A., "BGP FRR Protection Against Edge Node Failure Using Vector Labels", Network Working Group, Intended Status: Standards Track, Jul. 7, 2012, 32 pages.
(Continued)

*Primary Examiner* — Chi H Pham
*Assistant Examiner* — Shick Hom
(74) *Attorney, Agent, or Firm* — Slater Matsil, LLP

(57) ABSTRACT

A network system includes a first Egress PE1, a second Egress PE2, and an Ingress PE3, the PE1, PE2 separately communicate with a CE, and the PE1, PE2 are located in a same redundancy group, and are separately used as primary/backup devices; the PE1, PE2 separately generate a virtual node, where the virtual node has a global unique Router ID in the network system. The virtual node is used as a next hop node of the PE1, PE2; and the PE1, PE2 send link state information to the PE3, so that the PE3 obtains Router IDs of the PE1 and PE2, a Router ID of the virtual node, and the link state information of the PE1, PE2, and the PE1, PE2 separately allocate a first label to a FEC of a first VPN, and send the first label and the Router ID of the virtual node to the PE3.

24 Claims, 14 Drawing Sheets

(51) Int. Cl.
      *H04L 12/64*       (2006.01)
      *H04L 12/751*      (2013.01)

(56) References Cited

U.S. PATENT DOCUMENTS

| | | | |
|---|---|---|---|
| 2006/0291485 | A1 | 12/2006 | Thubert et al. |
| 2007/0121486 | A1* | 5/2007 | Guichard ............... H04L 45/02 370/216 |

FOREIGN PATENT DOCUMENTS

| | | |
|---|---|---|
| CN | 102404199 A | 4/2012 |
| CN | 102449964 A | 5/2012 |
| EP | 2720415 A1 | 4/2014 |
| EP | 2720415 B1 | 1/2016 |
| WO | 2012106919 A1 | 8/2012 |

OTHER PUBLICATIONS

Bashandy, A.., "BGP FRR Protection Against Edge Node Failure Using Table Mirroring With Context Labels", Network Working Group, Intended Status: Standards Track, Oct. 8, 2012, 25 pages.

Martini, L., et al., "Inter-Chassis Communication Protocol for L2VPN PE Redundancy", Internet Engineering Task Force, Intended Status: Standards Track, Feb. 21, 2013, 80 pages.

Shen, E.Y., et al., "PW Endpoint Fast Failure Protection", Internet Engineering Task Force, Intended Status: Standards Track, Feb. 8, 2013, 28 pages.

Shen, Y., et al., "RSVP Setup Protection", Internet Engineering Task Force, Intended Status: Standards Track, Feb. 8, 2013, 12 pages.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|U|    Message Type           |        Message Length           |
+-+-+-+-+-+-+-+-+-+-+-+-+-+-+-+-+-+-+-+-+-+-+-+-+-+-+-+-+-+-+-+-+
|                            Message ID                          |
+-+-+-+-+-+-+-+-+-+-+-+-+-+-+-+-+-+-+-+-+-+-+-+-+-+-+-+-+-+-+-+-+
| Type=0x0005 (ICC RG ID)     |        Length=4                  |
+-+-+-+-+-+-+-+-+-+-+-+-+-+-+-+-+-+-+-+-+-+-+-+-+-+-+-+-+-+-+-+-+
|                            ICC RG ID                           |
+-+-+-+-+-+-+-+-+-+-+-+-+-+-+-+-+-+-+-+-+-+-+-+-+-+-+-+-+-+-+-+-+
|                                                                |
+                                                                +
|                       Mandatory Parameters                     |
~                                                                ~
+                                                                +
|                                                                |
+-+-+-+-+-+-+-+-+-+-+-+-+-+-+-+-+-+-+-+-+-+-+-+-+-+-+-+-+-+-+-+-+
|                                                                |
+                                                                +
|                       Optional Parameters                      |
~                                                                ~
+                                                                +
|                                                                |
+-+-+-+-+-+-+-+-+-+-+-+-+-+-+-+-+-+-+-+-+-+-+-+-+-+-+-+-+-+-+-+-+
```

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|U|F|      Type               |            Length               |
+-+-+-+-+-+-+-+-+-+-+-+-+-+-+-+-+-+-+-+-+-+-+-+-+-+-+-+-+-+-+-+-+
|                              TLV(s)                            |
~                                                                ~
+-+-+-+-+-+-+-+-+-+-+-+-+-+-+-+-+-+-+-+-+-+-+-+-+-+-+-+-+-+-+-+-+
```

FIG. 7

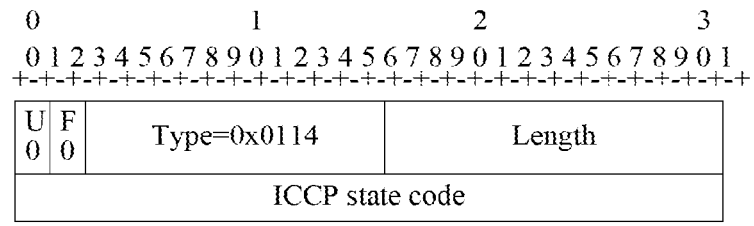
FIG. 15(a)
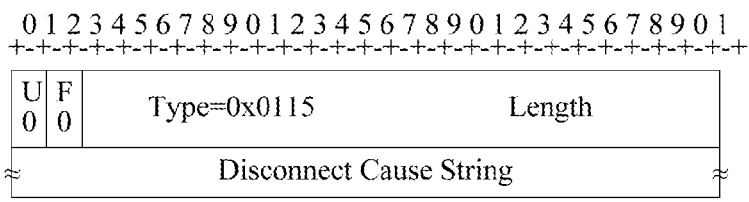
FIG. 15(b)
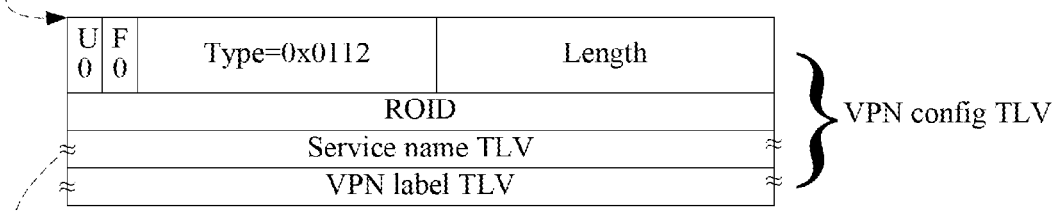
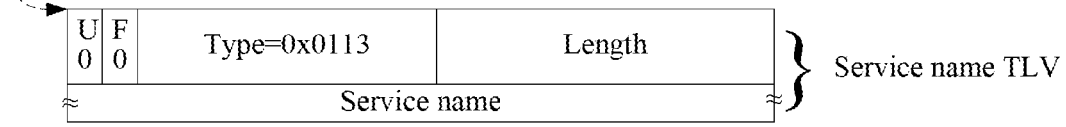
FIG. 16

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
```
| U 0 | F 0 | Type=0x0102 | Length |
|---|---|---|---|
| | | VPN label | Reserved |
| Label lower (Lower limit of an available label space range) | | | Label upper (upper limit of an available label space range) |
FIG. 17
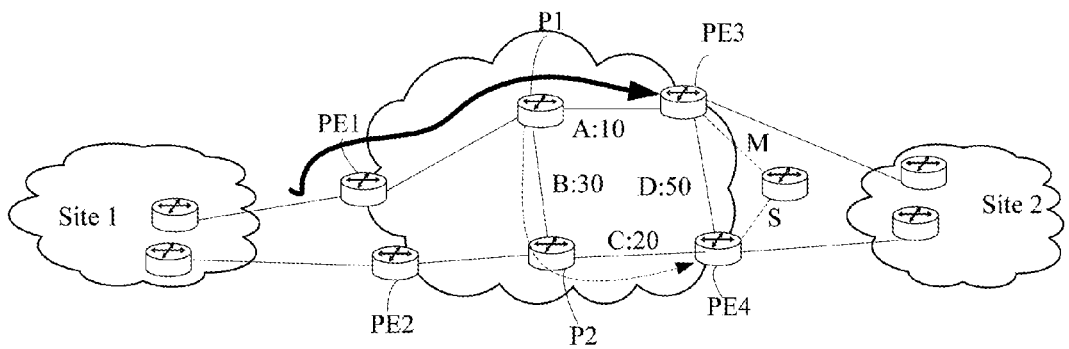
FIG. 18
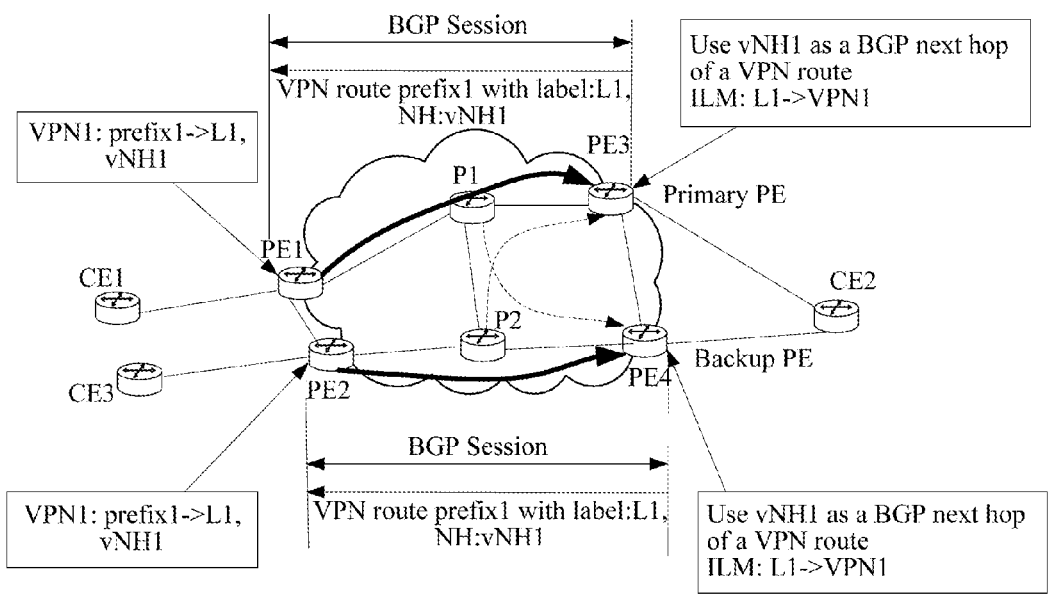
FIG. 19

METHOD FOR ESTABLISHING TUNNEL, METHOD FOR ALLOCATING LABEL, DEVICE AND NETWORK SYSTEM

This application is a continuation of International Application No. PCT/CN2013/078887, filed on Jul. 5, 2013, which is hereby incorporated by reference in its entirety.

TECHNICAL FIELD

The present application relates to a method for establishing a tunnel, a method for allocating a label, a device and a network system.

BACKGROUND

Multi-protocol label switching (MPLS) operates at a layer between a link layer and a network layer that are in a TCP/IP protocol stack, and is used for providing a connection service to an Internet Protocol (IP) layer, and also obtaining a service from the link layer. The MPLS uses label switching instead of IP forwarding. A label is a short connection identifier with a fixed length and a local meaning only. The label header is encapsulated between the link layer header and the network layer header. The MPLS is not limited to any specific link layer protocol, and can transmit a network packet by using any layer-2 medium. The MPLS is not a service or an application, and is actually a tunneling technology. This technology not only supports multiple upper-layer protocols and services, but also may guarantee security of information transmission to an extent. The Label Distribution Protocol (LDP) is a control protocol of multi-protocol label switching MPLS, is equivalent to a signaling protocol in a conventional network, and is responsible for operations such as classifying a forwarding equivalence class (FEC), allocating a label, and establishing and maintaining a label switched path (LSP). The LDP stipulates various messages and relevant processing procedures in a label distribution process.

The MPLS supports labels of multiple layers, and is connection-oriented on a forwarding plane, and therefore has high scalability, so that it becomes possible to provide various services for a customer on a uniform MPLS/IP network infrastructure. By using the LDP protocol, a label switched router (LSR) may directly map routing information of a network layer to a switched path of a data link layer, so as to establish an LSP of the network layer. Currently, the LDP is widely applied in VPN services, and has advantages such as simple networking and configuration, supporting a route topology-driven establishment of an LSP, and supporting a large-capacity LSP.

A virtual private network (VPN) is a virtual private communications network established in a public network in dependence on an Internet service provider (ISP) and a network service provider (NSP). A basic principle of the VPN is: a VPN packet is encapsulated in a tunnel by using the tunneling technology, and a private data transmission channel is established by using a VPN backbone network, so as to transparently transmit the packet. The tunneling technology uses a protocol for encapsulating a packet of another protocol, and an encapsulation protocol itself may be also encapsulated or carried by another encapsulation protocol.

A BGP/MPLS IP VPN is a Layer 3 Virtual Private Network (L3VPN) that uses the Border Gateway Protocol (BGP) to publish a VPN route on a service provider backbone network, and uses MPLS to forward a VPN packet on the service provider backbone network. IP herein refers to that the VPN carries an IP packet.

Pseudo-wire emulation edge to edge (PWE3) is a mechanism for emulating, on a PSN network, key attributes of services such as asynchronous transfer mode (ATM), frame relay (FR), and Ethernet services. The PWE3 may enable an operator to migrate a conventional service to the packet switched network PSN to reduce network operating costs.

To guarantee high availability of a service, different layers of a network all need to support redundancy: when a fault occurs in a resource such as a network node, a link, or a channel that is currently in use, the service can be switched to another redundant available resource, so as to guarantee that the network can continue to provide the service as stipulated.

LDP FRR is a fast protection method in which a protection path of a tunnel is calculated in advance, and a data packet is switched to a backup path immediately after a fault of a primary path is detected. The LDP FRR may perform protection for a node and a link, and the protection is always initiated by a faulty upstream neighbor, and different nodes establish different protection paths for a downstream node. Because a path or tunnel from an ingress node to an egress node is generally long, a relatively long switching time is needed after an upstream node initiates protection switching until the path is switched.

SUMMARY

An objective of embodiments of the present application is to provide a method for establishing a tunnel, a device and a network system, so as to reduce a protection switching time.

To achieve the foregoing objective, the embodiments of the present application use the following technical solutions.

According to a first aspect, an embodiment of the present application provides a network system, including a first egress provider edge device Egress PE, a second Egress PE and an ingress provider edge device Ingress PE, where the first Egress PE communicates with a customer edge device CE, and the second Egress PE communicates with the CE. The first Egress PE and the second Egress PE are located in a redundancy protection group including the first Egress PE and the second Egress PE, where the first Egress PE is a primary device, and the second Egress PE is a backup device. The first Egress PE is configured to: generate a virtual node, where the virtual node has a global unique Router ID in the network system, the virtual node is used as a next hop node of the first Egress PE, and the virtual node is used as a next hop node of the second Egress PE; send a first link state message to the Ingress PE, where the first link state message includes: a Router ID of the first Egress PE and state information of a link from the first Egress PE to the virtual node, and the state information of the link from the first Egress PE to the virtual node includes a cost value M of the link from the first Egress PE to the virtual node and the Router ID of the virtual node; and send a second link state message to the Ingress PE, where the second link state message includes: the Router ID of the virtual node, state information of a link from the virtual node to the first Egress PE and state information of a link from the virtual node to the second Egress PE, the state information of the link from the virtual node to the first Egress PE includes a cost value N of the link from the virtual node to the first Egress PE and the Router ID of the first Egress PE, and the state information of the link from the virtual node to the second Egress PE includes a cost value T of the link from the virtual node to the second Egress PE and a Router ID of the second Egress PE. The second Egress PE is configured to generate the virtual node; send a third link state message to the Ingress PE, where the third link state message includes: the Router ID of the second Egress PE and state information of a link from the second Egress PE to the virtual node, and the state information of the link from the second Egress PE to the virtual node includes a cost value S of the link from the second Egress PE to the virtual node and the Router ID of the virtual node; and send a fourth link state message to the Ingress PE, where the fourth link state message includes: the Router ID of the virtual node, the state information of the link from the virtual node to the first Egress PE and the state information of the link from the virtual node to the second Egress PE, the state information of the link from the virtual node to the first Egress PE includes the cost value N of the link from the virtual node to the first Egress PE and the Router ID of the first Egress PE, and the state information of the link from the virtual node to the second Egress PE includes the cost value T of the link from the virtual node to the second Egress PE and the Router ID of the second Egress PE, where N and T are maximum cost values in an Interior Gateway Protocol IGP, and S and M satisfy (1) or (2):

$$\begin{cases} Sxy4 + S > Sxy3 + M \text{ and} \\ C34 + S > M \end{cases} \quad (1)$$

where Px is any neighboring node of the first Egress PE, Pxy is any neighboring node of Px in a network excluding the first Egress PE, Sxy3 is a cost value of a shortest path from Pxy to the first Egress PE, Sxy4 is a cost value of a shortest path from Pxy to the second Egress PE, and C34 is a cost value of a shortest path from the first Egress PE to the second Egress PE; and $$X + M < Y + S \quad (2)$$

where X is a cost value of a shortest path from the Ingress PE to the first Egress PE, and Y is a cost value of a shortest path from the Ingress PE to the second Egress PE.

In a first possible implementation manner of the first aspect, the Router ID of the virtual node is statically configured, or obtained by means of dynamic negotiation between the first Egress PE and the second Egress PE.

With reference to the first aspect or the first possible implementation manner of the first aspect, in a second possible implementation manner of the first aspect, the Router ID of the virtual node is a loopback identifier Loopback ID.

With reference to the first aspect, or the first or second possible implementation manner of the first aspect, in a third possible implementation manner of the first aspect, if multiple M-S pairs satisfy (1) or (2), an M-S pair whose S is minimum or an M-S pair whose M is minimum is selected, M in the selected M-S pair is carried in the first link state information, and S in the selected M-S pair is carried in the third link state information.

With reference to the first aspect, or the first or second or third possible implementation manner of the first aspect, in a fourth possible implementation manner of the first aspect, in manner (2), M=1, and S is a maximum IGP cost value.

With reference to the first aspect, or the first or second or third or fourth possible implementation manner of the first aspect, in a fifth possible implementation manner of the first aspect, the Router ID of the virtual node is an Internet Protocol IP address that is possessed by one with a higher priority in the first Egress PE and the second Egress PE and is not occupied. According to a second aspect, an embodiment of the present application provides a network system, including a first egress provider edge device Egress PE, a second Egress PE and an ingress provider edge device Ingress PE, where the first Egress PE communicates with a customer edge device CE, and the second Egress PE communicates with the CE. The first Egress PE and the second Egress PE are located in a redundancy protection group including the first Egress PE and the second Egress PE, where the first Egress PE is a primary device, and the second Egress PE is a backup device. The first Egress PE is configured to: generate a virtual node, where the virtual node has a global unique Router ID in the network system, the virtual node is used as a next hop node of the first Egress PE, and the virtual node is used as a next hop node of the second Egress PE; send a first link state message to the Ingress PE, where the first link state message includes: a Router ID of the first Egress PE and state information of a link from the first Egress PE to the virtual node, and the state information of the link from the first Egress PE to the virtual node includes a cost value M of the link from the first Egress PE to the virtual node and the Router ID of the virtual node; and send a second link state message to the Ingress PE, where the second link state message includes: the Router ID of the virtual node, state information of a link from the virtual node to the first Egress PE and state information of a link from the virtual node to the second Egress PE, the state information of the link from the virtual node to the first Egress PE includes a cost value N of the link from the virtual node to the first Egress PE and the Router ID of the first Egress PE, and the state information of the link from the virtual node to the second Egress PE includes a cost value T of the link from the virtual node to the second Egress PE and a Router ID of the second Egress PE. The second Egress PE is configured to: generate the virtual node; send a third link state message to the Ingress PE, where the third link state message includes: the Router ID of the second Egress PE and state information of a link from the second Egress PE to the virtual node, and the state information of the link from the second Egress PE to the virtual node includes a cost value S of the link from the second Egress PE to the virtual node and the Router ID of the virtual node; and send a fourth link state message to the Ingress PE, where the fourth link state message includes: the Router ID of the virtual node, the state information of the link from the virtual node to the first Egress PE and the state information of the link from the virtual node to the second Egress PE, the state information of the link from the virtual node to the first Egress PE includes the cost value N of the link from the virtual node to the first Egress PE and the Router ID of the first Egress PE, and the state information of the link from the virtual node to the second Egress PE includes the cost value T of the link from the virtual node to the second Egress PE and the Router ID of the second Egress PE. The first Egress PE is further configured to allocate a first label to a first forwarding equivalence class of a first virtual private network VPN, and send the first label and the Router ID of the virtual node to the Ingress PE. The second Egress PE is further configured to allocate the first label to the first forwarding equivalence class of the first VPN, and send the first label and the Router ID of the virtual node to the Ingress PE.

In a first possible implementation manner of the second aspect, the Router ID of the virtual node is statically configured, or obtained by means of dynamic negotiation between the first Egress PE and the second Egress PE.

With reference to the second aspect or the first possible implementation manner of the second aspect, in a second possible implementation manner of the second aspect, the Router ID of the virtual node is a loopback identifier Loopback ID.

With reference to the second aspect, or the first or second possible implementation manner of the second aspect, in a third possible implementation manner of the second aspect, the Router ID of the virtual node is an IP address that is possessed by the first Egress PE and is not occupied or an Internet Protocol IP address that is possessed by the second Egress PE and is not occupied.

With reference to the first or second possible implementation manner of the second aspect, in a fourth possible implementation manner of the second aspect, the Router ID of the virtual node is an Internet Protocol IP address that is possessed by one with a higher priority in the first Egress PE and the second Egress PE and is not occupied.

With reference to the first or second or third or fourth possible implementation manner of the second aspect, in a fifth possible implementation manner of the second aspect, the first label is statically configured, or obtained by means of dynamic negotiation between the first Egress PE and the second Egress PE.

According to a third aspect, an embodiment of the present application provides a method for establishing a tunnel, where the method is applied to a network system, where the network system includes a first egress provider edge device Egress PE, a second Egress PE and an ingress provider edge device Ingress PE, the first Egress PE communicates with a customer edge device CE, the second Egress PE communicates with the CE, and the first Egress PE and the second Egress PE are located in a redundancy protection group including the first Egress PE and the second Egress PE, where the first Egress PE is a primary device, and the second Egress PE is a backup device. The method includes: generating a virtual node on the first Egress PE, where the virtual node has a global unique Router ID in the network system, the virtual node is used as a next hop node of the first Egress PE, and the virtual node is used as a next hop node of the second Egress PE; generating the virtual node on the second Egress PE; sending, by the first Egress PE, a first link state message to the Ingress PE, where the first link state message includes: a Router ID of the first Egress PE and state information of a link from the first Egress PE to the virtual node, and the state information of the link from the first Egress PE to the virtual node includes a cost value M of the link from the first Egress PE to the virtual node and the Router ID of the virtual node; sending, by the first Egress PE, a second link state message to the Ingress PE, where the second link state message includes: the Router ID of the virtual node, state information of a link from the virtual node to the first Egress PE and state information of a link from the virtual node to the second Egress PE, the state information of the link from the virtual node to the first Egress PE includes a cost value N of the link from the virtual node to the first Egress PE and the Router ID of the first Egress PE, and the state information of the link from the virtual node to the second Egress PE includes a cost value T of the link from the virtual node to the second Egress PE and a Router ID of the second Egress PE; sending, by the second Egress PE, a third link state message to the Ingress PE, where the third link state message includes: the Router ID of the second Egress PE and state information of a link from the second Egress PE to the virtual node, and the state information of the link from the second Egress PE to the virtual node includes a cost value S of the link from the second Egress PE to the virtual node and the Router ID of the virtual node; and sending, by the second Egress PE, a fourth link state message to the Ingress PE, where the fourth link state message includes: the Router ID of the virtual node, the state information of the link from the virtual node to the first Egress PE and the state information of the link from the virtual node to the second Egress PE, the state information of the link from the virtual node to the first Egress PE includes the cost value N of the link from the virtual node to the first Egress PE and the Router ID of the first Egress PE, and the state information of the link from the virtual node to the second Egress PE includes the cost value T of the link from the virtual node to the second Egress PE and the Router ID of the second Egress PE, where N and T are maximum cost values in an Interior Gateway Protocol IGP, and S and M satisfy (1) or (2):

$$\begin{cases} Sxy4 + S > Sxy3 + M \quad \text{and} \\ C34 + S > M \end{cases} \quad (1)$$

where Px is any neighboring node of the first Egress PE, Pxy is any neighboring node of Px in a network excluding the first Egress PE, Sxy3 is a cost value of a shortest path from Pxy to the first Egress PE, Sxy4 is a cost value of a shortest path from Pxy to the second Egress PE, and C34 is a cost value of a shortest path from the first Egress PE to the second Egress PE; and $$X+M<Y+S \quad (2)$$

where X is a cost value of a shortest path from the Ingress PE to the first Egress PE, and Y is a cost value of a shortest path from the Ingress PE to the second Egress PE.

In a first possible implementation manner of the third aspect, the generating the virtual node on the first Egress PE and the second Egress PE includes: generating, by the first Egress PE and the second Egress PE, the virtual node by means of dynamic negotiation.

With reference the first possible implementation manner of the third aspect, in a second possible implementation manner of the third aspect, the generating, by the first Egress PE and the second Egress PE, the virtual node by means of dynamic negotiation includes: establishing an Inter-Chassis Communication Protocol ICCP connection between the first Egress PE and the second Egress PE, separately sending their respective priorities to each other, and selecting one party with a higher priority to determine the Router ID of the virtual node.

With reference the second possible implementation manner of the third aspect, in a third possible implementation manner of the third aspect, the Router ID of the virtual node is an Internet Protocol IP address that is possessed by one party with a higher priority in the first Egress PE and the second Egress PE and is not occupied.

With reference the third possible implementation manner of the third aspect, in a fourth possible implementation manner of the third aspect, if the priority of the first Egress PE is equal to that of the second Egress PE, an address of the first Egress PE is compared with that of the second Egress PE, the Router ID of the virtual node is determined by one party with a larger address in the first Egress PE and the second Egress PE.

With reference the third possible implementation manner of the third aspect, in a fifth possible implementation manner of the third aspect, if the priority of the first Egress PE is equal to that of the second Egress PE, an address of the first Egress PE is compared with that of the second Egress PE, the Router ID of the virtual node is determined by one party with a smaller address in the first Egress PE and the second Egress PE.

With reference to the fourth or fifth possible implementation manner of the third aspect, in a sixth possible implementation manner of the third aspect, the Router ID of the virtual node is an address that is possessed by the one party with the larger address in the first Egress PE and the second Egress PE and is not used.

With reference to the fourth or fifth possible implementation manner of the third aspect, in a seventh possible implementation manner of the third aspect, the Router ID of the virtual node is an address that is possessed by the one party with the smaller address in the first Egress PE and the second Egress PE and is not used.

With reference to the first or second or third or fourth or fifth or sixth or seventh possible implementation manner of the third aspect, in an eighth possible implementation manner of the third aspect, the generating, by the first Egress PE and the second Egress PE, the virtual node by means of dynamic negotiation includes: adding a first type-length-value TLV to an Inter-Chassis Communication Protocol ICCP packet, where the first TLV includes a vNH field and a priority field, the priority field carries a priority of a sender of the ICCP packet, and the vNH field carries an address of the sender of the ICCP packet.

With reference to the third aspect, or the first or second or third or fourth or fifth or sixth or seventh or eighth possible implementation manner of the third aspect, in a ninth possible implementation manner of the third aspect, the allocating, by the first Egress PE and the second Egress PE, the first label to the first forwarding equivalence class of the first VPN separately includes: allocating, by the first Egress PE and the second Egress PE, the first label by means of dynamic negotiation.

With reference the ninth possible implementation manner of the third aspect, in a tenth possible implementation manner of the third aspect, the allocating, by the first Egress PE and the second Egress PE, the first label by means of dynamic negotiation includes: establishing the ICCP connection between the first Egress PE and the second Egress PE, separately sending their respective priorities to each other, and selecting the one party with the higher priority to determine the first label.

With reference the tenth possible implementation manner of the third aspect, in an eleventh possible implementation manner of the third aspect, if the priority of the first Egress PE is equal to that of the second Egress PE, the address of the first Egress PE is compared with that of the second Egress PE, the first label is determined by the one party with the larger address in the first Egress PE and the second Egress PE.

With reference the tenth possible implementation manner of the third aspect, in a twelfth possible implementation manner of the third aspect, if the priority of the first Egress PE is equal to that of the second Egress PE, the address of the first Egress PE is compared with that of the second Egress PE, the first label is determined by the one party with the smaller address in the first Egress PE and the second Egress PE.

With reference to the ninth or tenth or eleventh or twelfth possible implementation manner of the third aspect, in a thirteenth possible implementation manner of the third aspect, the allocating, by the first Egress PE and the second Egress PE, the first label by means of dynamic negotiation is implemented by carrying a second TLV in the ICCP packet, where the second TLV includes a VPN label field and a priority field, the priority field carries the priority of the sender of the ICCP packet, and the VPN label field carries the first label provided by the sender of the ICCP packet.

With reference the thirteenth possible implementation manner of the third aspect, in a fourteenth possible implementation manner of the third aspect, the second TLV further includes an available label upper limit field and an available label lower limit field, where the available label upper limit field and the available label lower limit field are used for determining a label range that may be provided by the sender of the ICCP packet.

With reference to the third aspect, or the first or second or third or fourth or fifth or sixth or seventh or eighth or ninth or tenth or eleventh or twelfth or thirteenth or fourteenth possible implementation manner of the third aspect, in a fifteenth possible implementation manner of the third aspect, when the VPN is an L3VPN, a label per VPN allocation manner may be used, and a label per route allocation manner or an interface per route allocation manner may also be used.

With reference to the third aspect, or the first or second or third or fourth or fifth or sixth or seventh or eighth or ninth or tenth or eleventh or twelfth or thirteenth or fourteenth or fifteenth possible implementation manner of the third aspect, in a sixteenth possible implementation manner of the third aspect, if multiple M–S pairs satisfy (1) or (2), an M–S pair whose S is minimum or an M–S pair whose M is minimum is selected, M in the selected M–S pair is carried in the first link state information, and S in the selected M–S pair is carried in the third link state information.

With reference to the third aspect, or the first or second or third or fourth or fifth or sixth or seventh or eighth or ninth or tenth or eleventh or twelfth or thirteenth or fourteenth or fifteenth possible implementation manner of the third aspect, in a seventeenth possible implementation manner of the third aspect, in manner (2), M=1, and S is a maximum IGP cost value.

According to a fourth aspect, an embodiment of the present application provides a method for allocating a label, where the method is applied to a network system, where the network system includes a first egress provider edge device Egress PE, a second Egress PE and an ingress provider edge device Ingress PE, the first Egress PE communicates with a customer edge device CE, the second Egress PE communicates with the CE, and the first Egress PE and the second Egress PE are located in a redundancy protection group including the first Egress PE and the second Egress PE, where the first Egress PE is a primary device, and the second Egress PE is a backup device. The method includes: generating a virtual node on the first Egress PE, where the virtual node has a global unique Router ID in the network system, the virtual node is used as a next hop node of the first Egress PE, and the virtual node is used as a next hop node of the second Egress PE; generating the virtual node on the second Egress PE; sending, by the first Egress PE, a first link state message to the Ingress PE, where the first link state message includes: a Router ID of the first Egress PE and state information of a link from the first Egress PE to the virtual node, and the state information includes a cost value M of the link from the first Egress PE to the virtual node and the Router ID of the virtual node; sending, by the first Egress PE, a second link state message to the Ingress PE, where the second link state message includes: the Router ID of the virtual node, state information of a link from the virtual node to the first Egress PE and state information of a link from the virtual node to the second Egress PE, the state information of the link from the virtual node to the first Egress PE includes a cost value N of the link from the virtual node to the first Egress PE and the Router ID of the first Egress PE, and the state information of the link from the virtual node to the second Egress PE includes a cost value T of the link from the virtual node to the second Egress PE and a Router ID of the second Egress PE; sending, by the second Egress PE, a third link state message to the Ingress PE, where the third link state message includes: the Router ID of the second Egress PE and state information of a link from the second Egress PE to the virtual node, and the state information of the link from the second Egress PE to the virtual node includes a cost value S of the link from the second Egress PE to the virtual node and the Router ID of the virtual node; sending, by the second Egress PE, a fourth link state message to the Ingress PE, where the fourth link state message includes: the Router ID of the virtual node, the state information of the link from the virtual node to the first Egress PE and the state information of the link from the virtual node to the second Egress PE, the state information of the link from the virtual node to the first Egress PE includes the cost value N of the link from the virtual node to the first Egress PE and the Router ID of the first Egress PE, and the state information of the link from the virtual node to the second Egress PE includes the cost value T of the link from the virtual node to the second Egress PE and the Router ID of the second Egress PE; allocating, by the first Egress PE, a first label to a first forwarding equivalence class of a first virtual private network VPN, and sending the first label and the Router ID of the virtual node to the Ingress PE; and allocating, by the second Egress PE, the first label to the first forwarding equivalence class of the first VPN, and sending the first label and the Router ID of the virtual node to the Ingress PE.

In a first possible implementation manner of the fourth aspect, the generating the virtual node on the first Egress PE and the second Egress PE includes: generating, by the first Egress PE and the second Egress PE, the virtual node by means of dynamic negotiation.

With reference the first possible implementation manner of the fourth aspect, in a second possible implementation manner of the fourth aspect, the generating, by the first Egress PE and the second Egress PE, the virtual node by means of dynamic negotiation includes: establishing an Inter-Chassis Communication Protocol ICCP connection between the first Egress PE and the second Egress PE, separately sending their respective priorities to each other, and selecting one party with a higher priority to determine the Router ID of the virtual node.

With reference to the fourth aspect, or the first or second possible implementation manner of the fourth aspect, in a third possible implementation manner of the fourth aspect, the Router ID of the virtual node is an IP address that is possessed by one party with a higher priority in the first Egress PE and the second Egress PE and is not occupied.

With reference to the second or third possible implementation manner of the fourth aspect, in a fourth possible implementation manner of the fourth aspect, if the priority of the first Egress PE is equal to that of the second Egress PE, an address of the first Egress PE is compared with that of the second Egress PE, the Router ID of the virtual node is determined by one party with a larger address in the first Egress PE and the second Egress PE.

With reference to the second or third possible implementation manner of the fourth aspect, in a fifth possible implementation manner of the fourth aspect, if the priority of the first Egress PE is equal to that of the second Egress PE, an address of the first Egress PE is compared with that of the second Egress PE, the Router ID of the virtual node is determined by one party with a smaller address in the first Egress PE and the second Egress PE.

With reference to the fourth aspect, or the first or second or third or fourth or fifth possible implementation manner of the fourth aspect, in a sixth possible implementation manner of the fourth aspect, the Router ID of the virtual node is an address that is possessed by the one party with the larger address in the first Egress PE and the second Egress PE and is not occupied.

With reference to the fourth aspect, or the first or second or third or fourth or fifth possible implementation manner of the fourth aspect, in a seventh possible implementation manner of the fourth aspect, the Router ID of the virtual node is an address that is possessed by the one party with the smaller address in the first Egress PE and the second Egress PE and is not occupied.

With reference to the fourth aspect, or the first or second or third or fourth or fifth or sixth or seventh possible implementation manner of the fourth aspect, in an eighth possible implementation manner of the fourth aspect, the generating, by the first Egress PE and the second Egress PE, the virtual node by means of dynamic negotiation includes: adding a first type-length-value TLV to an Inter-Chassis Communication Protocol ICCP packet, where the first TLV includes a vNH field and a priority field, the priority field carries a priority of a sender of the ICCP packet, and the vNH field carries an address of the sender of the CC packet.

With reference to the fourth aspect, or the first or second or third or fourth or fifth or sixth or seventh or eighth possible implementation manner of the fourth aspect, in a ninth possible implementation manner of the fourth aspect, the allocating, by the first Egress PE and the second Egress PE, the first label to the first forwarding equivalence class of the first VPN separately includes: allocating, by the first Egress PE and the second Egress PE, the first label by means of dynamic negotiation.

With reference the ninth possible implementation manner of the fourth aspect, in a tenth possible implementation manner of the fourth aspect, the allocating, by the first Egress PE and the second Egress PE, the first label by means of dynamic negotiation includes: establishing the ICCP connection between the first Egress PE and the second Egress PE, separately sending their respective priorities to each other, and selecting the one party with the higher priority to determine the first label.

With reference the tenth possible implementation manner of the fourth aspect, in an eleventh possible implementation manner of the fourth aspect, if the priority of the first Egress PE is equal to that of the second Egress PE, the address of the first Egress PE is compared with that of the second Egress PE, the first label is determined by the one party with the larger address in the first Egress PE and the second Egress PE.

With reference the tenth possible implementation manner of the fourth aspect, in a twelfth possible implementation manner of the fourth aspect, if the priority of the first Egress PE is equal to that of the second Egress PE, the address of the first Egress PE is compared with that of the second Egress PE, the first label is determined by the one party with the smaller address in the first Egress PE and the second Egress PE.

With reference to the ninth or tenth or eleventh or twelfth possible implementation manner of the fourth aspect, in a thirteenth possible implementation manner of the fourth aspect, the allocating, by the first Egress PE and the second Egress PE, the first label by means of dynamic negotiation is implemented by carrying a second TLV in the ICCP packet, where the second TLV includes a VPN label field and a priority field, the priority field carries the priority of the sender of the ICCP packet, and the VPN label field carries the first label provided by the sender of the ICCP packet.

With reference the thirteenth possible implementation manner of the fourth aspect, in a fourteenth possible implementation manner of the fourth aspect, the second TLV further includes an available label upper limit field and an available label lower limit field, where the available label upper limit field and the available label lower limit field are used for determining a label range that may be provided by the sender of the ICCP packet.

With reference to the fourth aspect, or the first or second or third or fourth or fifth or sixth or seventh or eighth or ninth or tenth or eleventh or twelfth or thirteenth or fourteenth possible implementation manner of the fourth aspect, in a fifteenth possible implementation manner of the fourth aspect, when the VPN is an L3VPN, a label per VPN allocation manner may be used, and a label per route allocation manner or an interface per route allocation manner may also be used.

According to a fifth aspect, an embodiment of the present application provides a first provider edge device PE, where the first PE is located in a network system including a second PE, an ingress provider edge device Ingress PE and the first PE, the first PE and the second PE are used as egress provider edge devices Egress PEs, the first PE and the second PE are located in a redundancy protection group including the first PE and the second PE, the first PE is used as a primary PE, the second PE is used as a backup PE, the first PE communicates with a customer edge device CE, and the second PE communicates with the CE. The first PE includes: a first virtual node generating module, a first state publishing module, and a first virtual node state publishing module, where the first virtual node generating module is configured to generate a virtual node on the first PE, where the virtual node has a global unique Router ID in the network system, the virtual node is used as a next hop node of the first PE, and the virtual node is used as a next hop node of the second PE. The first state publishing module is configured to send a first link state message to the Ingress PE, where the first link state message includes: a Router ID of the first PE and state information of a link from the first PE to the virtual node, and the state information of the link from the first PE to the virtual node includes a cost value M of the link from the first PE to the virtual node and the Router ID of the virtual node. The first virtual node state publishing module is further configured to send a second link state message to the Ingress PE, where the second link state message includes: the Router ID of the virtual node, state information of a link from the virtual node to the first PE and state information of a link from the virtual node to the second PE, the state information of the link from the virtual node to the first PE includes a cost value N of the link from the virtual node to the first PE and the Router ID of the first PE, and the state information of the link from the virtual node to the second PE includes a cost value T of the link from the virtual node to the second PE and a Router ID of the second PE, where N and T are maximum cost values in an Interior Gateway Protocol IGP, and S and M satisfy (1) or (2):

$$\begin{cases} Sxy4 + S > Sxy3 + M \quad \text{and} \\ C34 + S > M \end{cases} \quad (1)$$

where Px is any neighboring node of the first PE, Pxy is any neighboring node of Px in a network excluding the first PE, Sxy3 is a cost value of a shortest path from Pxy to the first PE, Sxy4 is a cost value of a shortest path from Pxy to the second PE, and C34 is a cost value of a shortest path from the first PE to the second PE; and $$X + M < Y + S \quad (2)$$

where X is a cost value of a shortest path from the Ingress PE to the first PE, and Y is a cost value of a shortest path from the Ingress PE to the second PE.

In a first possible implementation manner of the fifth aspect, the first PE further includes a first virtual node address negotiation module, configured to negotiate with the second PE to determine a same Router ID of the virtual node.

With reference to the fifth aspect, or the first possible implementation manner of the fifth aspect, in a second possible implementation manner of the fifth aspect, the first PE may further include a first label negotiation module, configured to negotiate with the second PE to determine a same label.

With reference to the fifth aspect, or the first or second possible implementation manner of the fifth aspect, in a third possible implementation manner of the fifth aspect, if multiple M–S pairs satisfy (1) or (2), an M–S pair whose S is minimum or an M–S pair whose M is minimum is selected, M in the selected M–S pair is carried in the first link state information, and S in the selected M–S pair is carried in the third link state information.

With reference to the fifth aspect, or the first or second possible implementation manner of the fifth aspect, in the fourth possible implementation manner of the fifth aspect, in manner (2), M=1, and S is a maximum IGP cost value.

In the method, the device, and the system described in the embodiments of the present application, a same virtual next hop is configured on an Egress PE in a redundancy protection group, and an address of the virtual next hop node is sent to an Ingress PE, so that the Ingress PE can establish a primary tunnel passing through a primary Egress PE, and a backup tunnel sequentially passing through a previous-hop node of the primary Egress PE, a previous-hop node of a backup Egress PE, and the backup Egress; and when a fault occurs in the primary Egress PE, the primary tunnel can be directly switched to the backup tunnel, a quantity of node devices involved in the switching is relatively small, and therefore protection switching can be completed in a relatively short time, where for an upper-layer service carried on the tunnel, the switching is seamless, and is not perceived by the upper-layer service.

BRIEF DESCRIPTION OF THE DRAWINGS

To describe the technical solutions in the embodiments of the present application more clearly, the following briefly introduces the accompanying drawings required for describing the embodiments or the prior art. Apparently, the accompanying drawings in the following description show some embodiments of the present application, and a person of ordinary skill in the art may still derive other drawings from these accompanying drawings without creative efforts.

FIG. 6 is a schematic diagram of a format of an ICCP packet header (ICC header) according to an embodiment of the present application;

FIG. 7 is a schematic diagram of a format of an ICC parameter in the ICCP packet header shown in FIG. 6;

FIG. 15 (a) is a schematic diagram of a format of a VPN disconnect code TLV according to an embodiment of the present application;

FIG. 15 (b) is a schematic diagram of a format of a VPN disconnect Cause TLV according to an embodiment of the present application;

FIG. 16 is a schematic diagram of a format of a VPN application data message according to an embodiment of the present application;

FIG. 17 is a schematic diagram of a format of a VPN label TLV according to an embodiment of the present application;

FIG. 18 is a schematic diagram of a □ shaped network architecture according to an embodiment of the present application;

FIGS. 19 and 20 are separately schematic diagrams of two network architectures according to Embodiment 2 of the present application;

DETAILED DESCRIPTION OF ILLUSTRATIVE EMBODIMENTS

Figure 1:
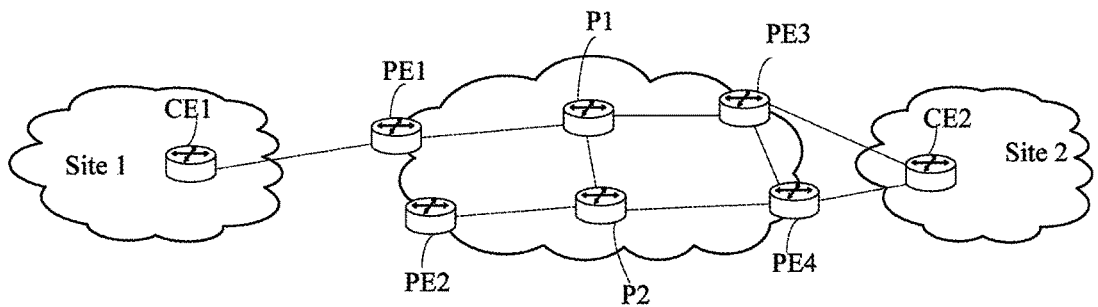
FIG. 1 is a schematic diagram of a network architecture according to an embodiment of the present application.

To make the objectives, technical solutions, and advantages of the embodiments of the present application clearer, the following describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

TLV mentioned in the embodiments of the present application refers to tag-length-value. An Interior Gateway Protocol (IGP) mentioned in the embodiments of the present application may be an Open Shortest Path First (OSPF) protocol, an Intermediate system to intermediate system (ISIS) protocol, or a Maximally Redundant Trees (MRT) protocol. A tunnel or path mentioned in the embodiments of the present application may be an MPLS tunnel, a generic routing encapsulation (GRE) tunnel, an L2TP tunnel, or an IPsec tunnel. In the embodiments of the present application, if multiple Egress PEs are located in a same redundancy protection group, when a vNH or label is negotiated between the multiple Egress PEs by using the ICCP, ICCP negotiation is performed between every two of the multiple Egress PEs.

In all the embodiments of the present application, if the MRT is used as the IGP protocol, setting M and S to any valid value can guarantee that a previous-hop node of an Egress PE can calculate a second path (backup path), such as setting both M and S to 1. The second path (backup path) does not pass through an Egress PE that a first path (primary path) passes through. The second path (backup path) can be calculated by using the MRT protocol in the IGP protocol without being limited to networking.

All the embodiments of the present application may be applied to a dual-plane network. If a network N satisfies the following conditions, the network is referred to as a dual-plane network:

(a) The network includes nodes R11, R12, . . . , R1n, R21, R22, . . . , and R2n, where $1<=i<=n$.

(b) When and only when there is a link between R1i and R1j, there is a link between R2i and R2j, and cost values of these two links are equal.

(c) A necessary condition on which there is a link between R1i and R2j is i=j.

In the dual-plane network, a network part formed by nodes R1i and links between the nodes R1i is referred to as a plane of the network N; and a network part formed by nodes R2i and links between the nodes R2i is referred to as another plane of the network N. R1i and R2i are referred to as symmetrical nodes, where $1<=i<=n$.

In all the embodiments of the present application, a "network" may be an IP network or MPLS network, and a "node" may be a routing device, or another device having a routing function. A "PE" may be a routing device, or another device having a routing function. An "Ingress PE" may be a routing device, or another device having a routing function. An "Egress PE" may be a routing device, or another device having a routing function. A CE and a customer edge device may be routing devices, or other devices having a routing function.

In all the embodiments of the present application, both a "VPN label" and a "VPN route label" refer to labels used for VPN routes.

In all the embodiments of the present application, an IP address may be an Internet Protocol version 4 (IPv4) address or Internet Protocol version 6 (IPv6) address, and an IP network refers to an IPv4 network or IPv6 network or a hybrid networking network of IPv4 and IPv6.

In all the embodiments of the present application, a Router ID is an address of an interface on a device. The Router ID may be a loopback address, that is, an IP address of a loopback interface, or may be an IP address of a device. Certainly, the Router ID may be also another identifier of a 32-bit unsigned integer.

As shown in FIG. 1, a network includes devices such as PE1, PE2, PE3, PE4, P1 and P2. provider edge device (PE) 1, PE2, PE3, and PE4 are provider edge devices of the network, customer edge device (CE) 1 and CE2 are user equipments, CE1 and CE2 belong to a virtual private network (VPN), and it is assumed that CE1 and CE2 belong to VPN1. CE1 is located at a site site1, and CE2 is located at site2. CE2 is connected to PE3 and PE4 in a dual-homing manner. CE1 may communicate with CE2 through PE1, P1 and PE3 sequentially, and may also communicate with CE2 through PE2, P2 and PE4 sequentially. For an L3VPN, a neighbor relationship may be established between PE3 and PE4 by using a Border Gateway Protocol (BGP).

P1 and P2 are provider devices (provider backbone device), and may be one or more in quantity. That is, there may be one or more P devices on a path between PE1 and PE3, and one or more P devices may also exist on a path between PE2 and PE4. All of CE, PE, and P devices may be routers or other network devices having a routing function. The PE device may be further a broadband remote access server (BRAS). A CE provides connection to a PE for a user, the PE processes VPN data from the CE or a label switched path (LSP) according to stored routing information and then forwards processed VPN data, and the PE is further responsible for exchanging routing information with another PE. The P device is a backbone network device that is not connected to any CE, and transparently forwards VPN data according to an outer-layer label of a packet, and the P device maintains routing information only directed to the PE device but does not maintain routing information related to a VPN.

Embodiment 1

Figure 2:
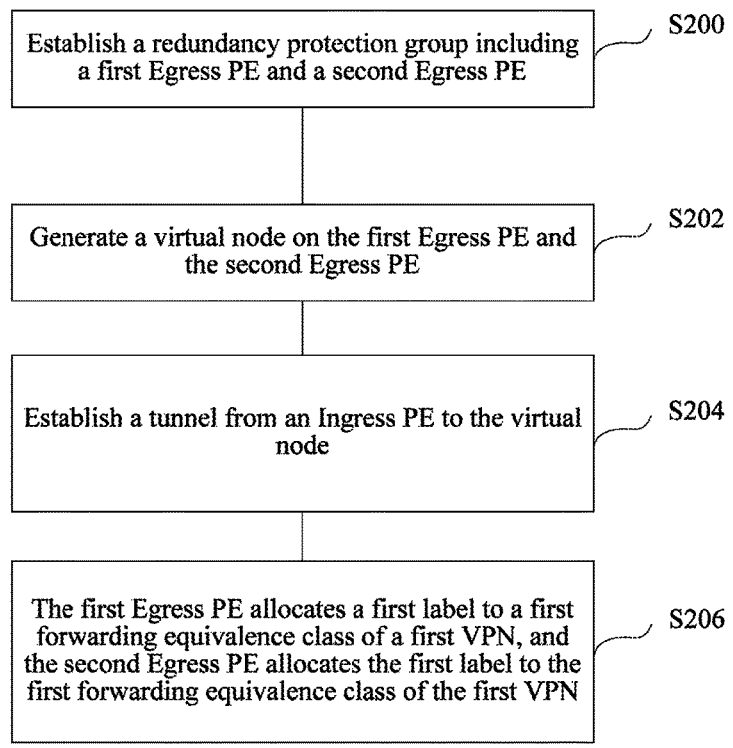
FIG. 2 is a schematic flowchart of a method for establishing a tunnel according to an embodiment of the present application.

As shown in FIG. 2, based on a network architecture shown in FIG. 1, a method for establishing a tunnel of this embodiment of the present application includes:

S200: Establish a redundancy protection group including a first Egress PE and a second Egress PE.

Figure 3:
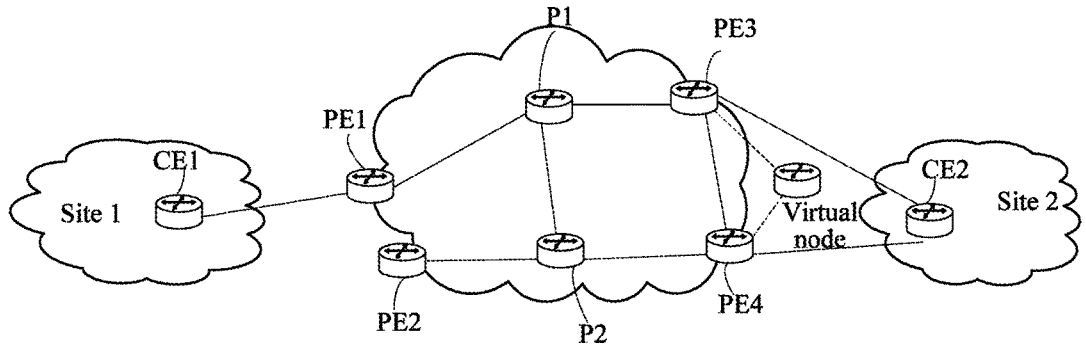
FIG. 3 is a schematic diagram of a network architecture including a virtual node according to an embodiment of the present application.

Network architectures shown in FIG. 1 and FIG. 3 are used as an example, the redundancy protection group includes PE3 and PE4, and it is assumed that PE3 is the first Egress PE and PE4 is the second Egress PE. PE3 and PE4 may be configured in a same redundancy protection group by means of static configuration, one of PE3 and PE4 is designated as a primary Egress PE in the redundancy protection group, and the other is designated as a backup Egress PE of the redundancy protection group. If the BGP is run between PE3 and PE4, PE3 and PE4 may find, by means of broadcasting routes, that their respective next hops are both CE2, and therefore it is determined that PE3 and PE4 are located in the same redundancy protection group. Additionally, PE3 and PE4 may also determine by using a route reflector that both parties are located in the same redundancy protection group. For the L3VPN, that their respective next hops are both CE2 also may be found by comparing broadcast of a VPN route with a route locally received from CE.

Optionally, the redundancy protection group may have two or more than two Egress PEs.

S202: Generate a virtual node on the first Egress PE and the second Egress PE.

The virtual node is generated on the first Egress PE and the second Egress PE, where the virtual node has a global unique Router ID in the network, the virtual node is used as a next hop node of the first Egress PE, and the virtual node is used as a next hop node of the second Egress PE. The generating the virtual node may be implemented by means of static configuration or dynamic negotiation. For the network architecture shown in FIG. 1, PE1 is used as an Ingress PE, PE3 and PE4 are used as Egress PEs, and the virtual node is separately generated on PE3 and PE4. The virtual node has a Router ID. The Router ID may be a loopback address. The Router ID is referred to as a virtual next hop (vNH). A network architecture including a virtual node is shown in FIG. 3. The Router ID of the virtual node may be an IP address that is possessed by PE3 and is not occupied or an IP address that is possessed by PE4 and is not occupied, or may be any loopback address or IP address that is not repetitive to that of a node device in the IGP domain. The virtual node is separately connected to PE3 and PE4, and the virtual node represents a protection relationship between PE3 and PE4. The vNH of the virtual node may be implemented by means of static configuration on PE3 and PE4, or may be implemented by means of Inter-Chassis Communication Protocol (ICCP) negotiation between PE3 and PE4. The virtual node is only visible to a node in the Interior Gateway Protocol (IGP) domain, that is, only visible to the P device and the PE device in the network, but invisible to CE2, and CE2 is still separately connected to PE3 and PE4.

The vNH of the virtual node may use a unique loopback address in the network, and may be configured by means of static configuration or dynamic selection. For the static configuration, configuration needs to be performed on multiple Egress PEs in the redundancy protection group, and in the embodiment, the vNH of the virtual node may be statically configured on PE3 and PE4. If the vNH of the virtual node is configured by means of dynamic negotiation, a loopback address is selected from the multiple Egress PEs in the redundancy protection group by means of dynamic negotiation.

Figure 4:
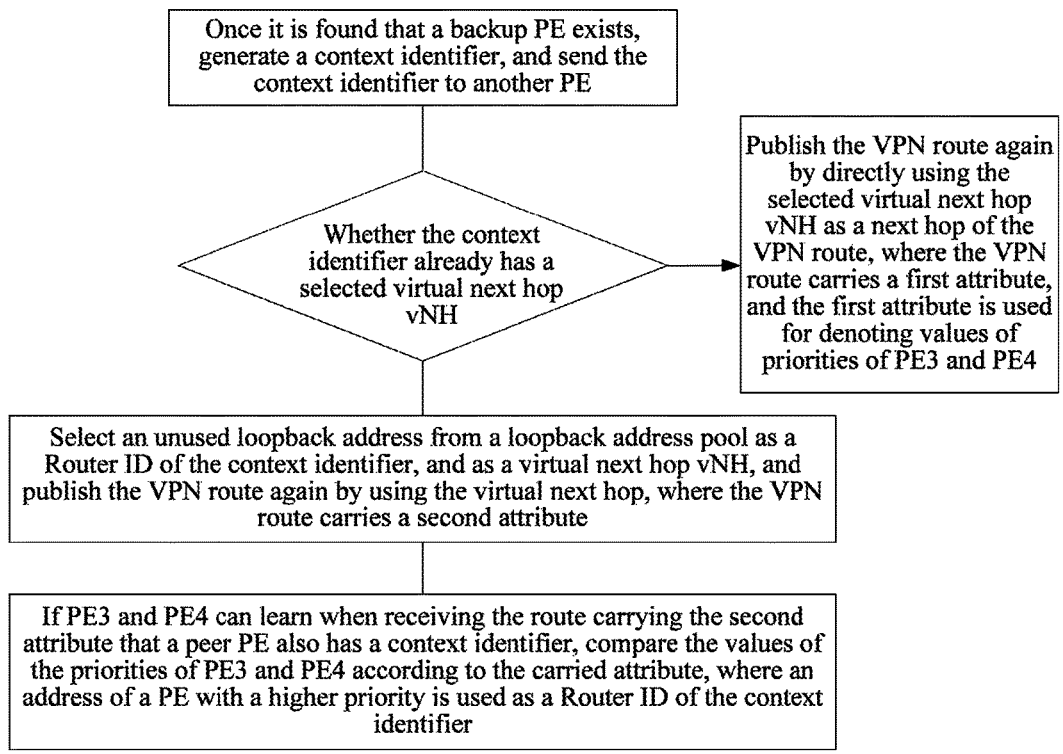
FIG. 4 is a schematic flowchart of a method for negotiating a vNH of a virtual node according to an embodiment of the present application.

As shown in FIG. 4, a method for negotiating a vNH of a virtual node, which is applied to an L3VPN, includes:

S401: Once finding that a backup Egress PE exists, PE3 and PE4 generate a context identifier <PE3, PE4>, and sends the context identifier to another PE in the redundancy protection group, and "PE3" and "PE4" in the context identifier may be denoted by using a Router ID of PE3 and a Router ID of PE4 respectively.

S402: Determine whether the context identifier already has a selected virtual next hop vNH, and if the context identifier already has a selected virtual next hop vNH, publish the VPN route again by directly using the selected virtual next hop vNH as a next hop of the VPN route, where the VPN route carries a first attribute, and the first attribute is used for denoting values of priorities of PE3 and PE4.

S403: If the context identifier has no selected virtual next hop vNH, select an unused loopback address or IP address from a loopback address pool of one with a higher priority in PE3 and PE4 as a Router ID of the context identifier, and as a virtual next hop vNH, and publish the VPN route again by using the virtual next hop, where the VPN route carries a second attribute, and the second attribute denotes a value of a priority of the vNH.

S404: If PE3 and PE4 can learn, when receiving the route carrying the second attribute, that a peer PE also has a context identifier processing capability, compare the values of the priorities of PE3 and PE4 according to the carried attribute; and if the priorities of PE3 and PE4 are the same, compare a next hop in a peer route with a next hop of a local route, and select a PE with a smaller IP address as a virtual next hop vNH. If a selection result is a local address, no processing is performed; and if the selection result is a peer PE, the VPN route is published again according to a new vNH.

Figure 5:
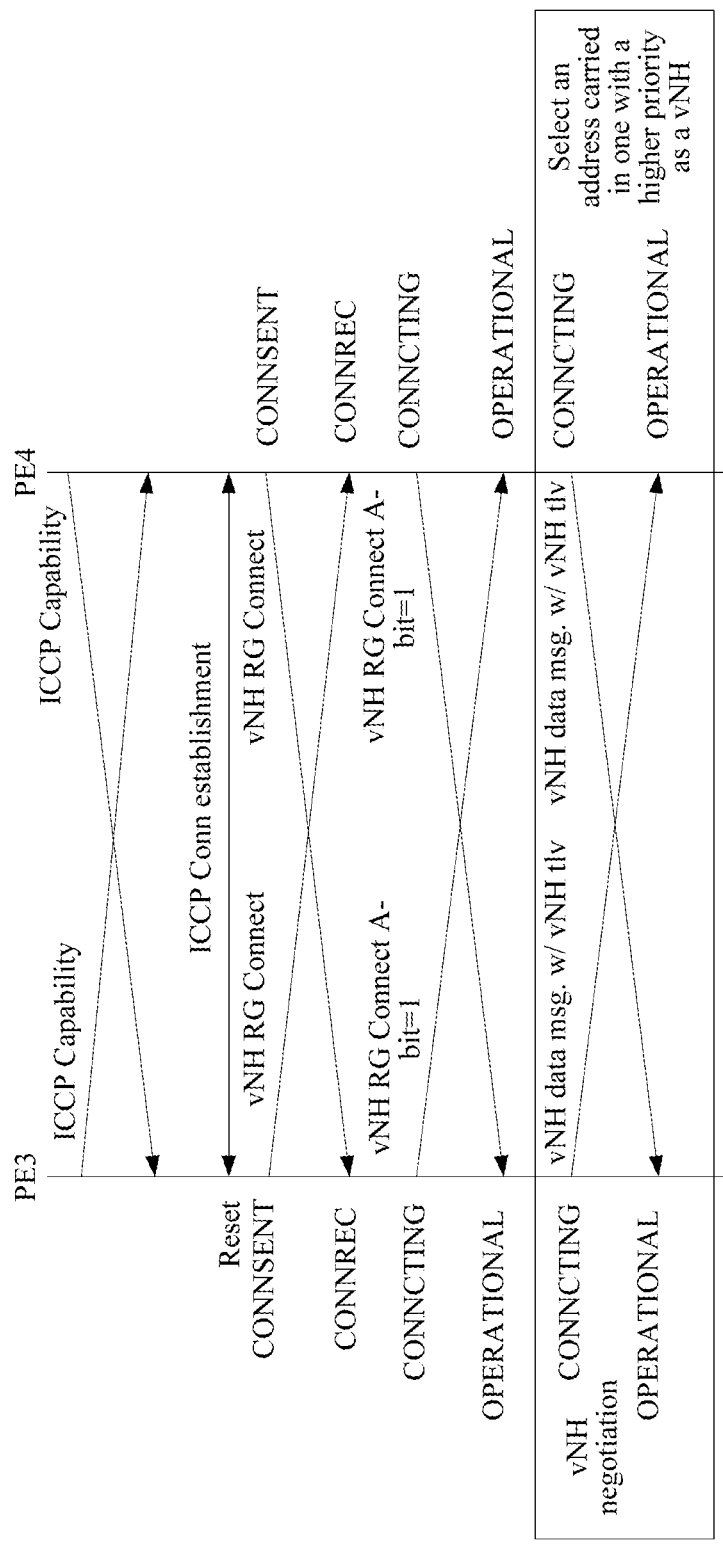
FIG. 5 is a schematic flowchart of a method for negotiating a vNH of a virtual node by using an extended ICCP according to an embodiment of the present application.

As shown in FIG. 5, it is assumed that a redundancy protection group RG includes two Egress PEs PE3 and PE4, PE3 and PE4 negotiate a vNH of a virtual node between each other by extending the Inter-Chassis Communication Protocol (ICCP), and a method for negotiating a vNH of a virtual node by extending the ICCP includes:

S501: A local PE and a peer PE in a redundancy protection group RG separately send an ICCP capability packet to an opposite party, to request to establish an ICCP connection.

S502: After the local PE and the peer PE receive the ICCP Capability packet sent by the opposite party, the local PE and the peer PE restart to establish an ICCP connection.

S503: The local PE and the peer PE separately send a vNH RG connect packet to the opposite party.

S504: After receiving the vNH RG connect packet sent by the opposite party, the local PE and the peer PE send vNH RG connect A-bit=1 to the opposite party, so as to acknowledge that the vNH RG connect packet sent by the opposite party is received.

S505: The local PE and the peer PE separately send a vNH data message (vNH data message) to the opposite party, where the vNH data message carries a vNH TLV, and the vNH TLV carries a priority of a sender.

S506: After receiving the vNH data message that carries the vNH TLV and is sent by the opposite party, the local PE and the peer PE compare a priority carried in the vNH data message sent by the opposite party with its own priority, and if the priority carried in the vNH data message sent by the opposite party is higher than its own priority, one party with a lower priority configures an address that is possessed by one party with a higher priority and is not occupied as a vNH of a virtual node, and the one party with the higher priority chooses to configure an address that is possessed by itself and is not occupied as the vNH of the virtual node.

In the embodiment, if the priority of PE3 is higher than the priority of PE4, the vNH of the virtual node generated on PE3 may be configured as an address that is possessed by PE3 and is not occupied (such as address 1), and the vNH of the virtual node generated on PE4 may be also configured as an address selected by PE3 (such as address 1); or if the priority of PE3 is less than the priority of PE4, the vNH of the virtual node generated on PE3 may be configured as an address that is possessed by PE4 and is not occupied (such as address 2), and the vNH of the virtual node generated on PE4 may be also configured as an address that is possessed by PE4 and is not occupied (such as address 2).

The ICCP message may be carried in a Label Distribution Protocol (LDP) message. The LDP message may include an LDP packet header and an LDP packet whose type value is 0x0700-0x07ff.

The message mentioned in the embodiment of FIG. 5 is introduced as follows:

A format of an ICCP packet header (ICC header) is shown in FIG. 6. The ICCP packet header includes a U-bit (U bit), a message type (Message Type), a message length (Message Length), a message identifier (Message ID), an ICC RG ID TLV, mandatory parameters (Mandatory Parameters) and optional parameters (Optional Parameters). Meanings of parameters are as follows:

U-bit: Unknown message bit. When an unknown message is received, if U=0, a notification is returned to a message originator; if U=1, the unknown message is ignored.

Message type (Message Type): Identifies a type of the ICCP message, and needs to be within a range from 0x0700 to 0x07ff.

Message length (Message Length): A two-byte integer identifying a total length of bytes of the message, excluding the U-bit, the message type, and the length fields.

Message identifier (Message ID): A four-byte value used for identifying the message. A sending PE uses the field to facilitate identifying an RG notification message that may apply to the message. A PE sending an RG notification message in response to the message should add the message identifier to "NAK TLV" of the RG notification message.

ICC RG ID TLV: A TLV of type 0x0005, length 4, including a four-byte unassigned integer indicating a redundancy protection group (Redundancy Group) in which a sending device is located.

Mandatory parameters (Mandatory Parameters): Variable length set of required parameters.

Optional parameters (Optional Parameters): Variable length set of optional message parameters.

In the format of the ICC header shown in FIG. 6, formats of ICC (Inter-Chassis Communication) parameters are shown in FIG. 7. The ICC parameters include a U-bit, an F-bit, a type, a length and a TLV. Meanings of fields are as follows:

U-bit: Unknown message bit. When an unknown message is received, if U=0, a notification is returned to a message originator; or if U=1, the unknown message is ignored.

F-bit: Forward an unknown TLV bit. The F-bit is used when the U-bit is set and an LDP message including an unknown TLV is forwarded. If F=0, the unknown TLV is not forwarded together with the inclusive message; or if F=1, the unknown TLV is forwarded together with the inclusive message. By setting the U-bit and the F-bit, the TLV may be used as opaque data to be forwarded in a node that does not recognize the TLV.

Type: 14 bits denoting a parameter type.

Length: Byte length of the TLV excluding the U-bit, the F-bit, the Type, and the Length field.

TLV(s): 0, 1 or more TLVs, which varies according to a message type.

Figure 8:
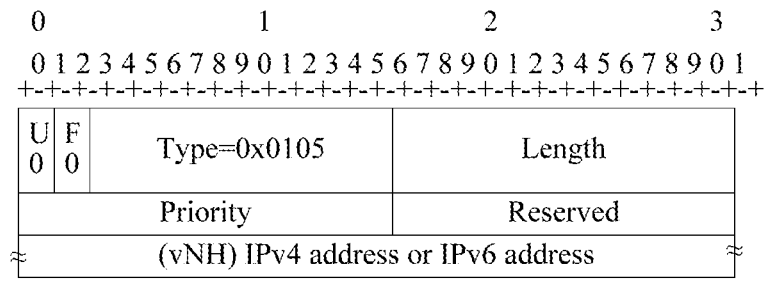
FIG. 8 is a schematic diagram of a format of a vNH TLV according to an embodiment of the present application.

In this embodiment of the present application, the negotiating the vNH of the virtual node by means of the ICCP may be implemented by adding a vNH TLV to the ICC message. As shown in FIG. 8, FIG. 8 is a schematic diagram of a format of a vNH TLV according to an embodiment of the present application. The vNH TLV includes a U-bit, an F-bit, a type (Type), a length (Length), a priority (Priority), a vNH and a reserved field (Reserved). Meanings of fields are as follows:

U-bit: Unknown message bit. When an unknown message is received, if U=0, a notification is returned to a message originator; or if U=1, the unknown message is ignored.

F-bit: Forward an unknown TLV bit. The F-bit is used when the U-bit is set and an LDP message including an unknown TLV is forwarded. If F=0, the unknown TLV is not forwarded together with the inclusive message; or if F=1, the unknown TLV is forwarded together with the inclusive message. By setting the U-bit and the F-bit, the TLV may be used as opaque data to be forwarded in a node that does not recognize the TLV.

Type: 14 bits denoting a parameter type, which may be set randomly.

Length: Byte length of the TLV excluding the U-bit, the F-bit, the Type, and the Length field.

Priority: Denotes a priority of a node generating a message including the TLV.

Virtual next hop (vNH): Denotes an IP address of the node generating the message including the TLV, where the IP address may be an IPv4 address or IPv6 address.

Reserved field (Reserved): Reserved for another use.

When multiple Egress PEs in a redundancy protection group negotiate a vNH of a virtual node by using the ICCP, a vNH data message sent by a local Egress PE to a peer Egress PE carries a vNH TLV. The vNH TLV carries a priority of a sender of the vNH data message and an IP address of the sender, and therefore a PE receiving the vNH data message compares a priority of the PE with the priority carried in the received vNH data message, and if the priority of the PE is higher than the priority carried in the received vNH data message, selects a vNH selected by the PE as a Router ID of the virtual node; and if the priority of the PE is less than the priority carried in the received vNH data message, selects a vNH selected by the sender of the received vNH data message as a Router ID of the virtual node; or if the priority of the PE is equal to the priority carried in the received vNH data message, selects a vNH selected by one with a larger IP address of the sender of the received vNH data message and the PE as a Router ID of the virtual node. That is, PE3 and PE4 separately send a vNH data message to an opposite party, a first vNH data message sent by PE3 carries a priority of PE3 and an IP address of PE3, and a second vNH data message sent by PE4 carries a priority of PE4 and an IP address of PE4. If the priority of PE3 is higher than the priority of PE4, the vNH selected by PE3 is selected as a Router ID of the virtual node; and if the priority of PE3 is less than the priority of PE4, the vNH selected by PE4 is selected as a Router ID of the virtual node; or if the priority of PE3 is equal to the priority of PE4, a value of the IP address of PE3 is compared with that of the IP address of PE4, if the IP address of PE3 is greater than the IP address of PE4, the vNH selected by PE3 is selected as a Router ID of the virtual node, or if the IP address of PE3 less than the IP address of PE4, the vNH selected by PE4 is selected as a Router ID of the virtual node. Certainly, when values of IP addresses are compared, a PE with a smaller IP address may be also selected to select a vNH as a Router ID of the virtual node, that is, a value of the IP address of PE3 is compared with that of the IP address of PE4, if the IP address of PE3 is greater than the IP address of PE4, the vNH selected by PE4 is selected as a Router ID of the virtual node, or if the IP address of PE3 is less than the IP address of PE4, the vNH selected by PE3 is selected as a Router ID of the virtual node. An Egress PE with a higher priority may select an IP address or a loopback address possessed by the Egress PE and is not occupied as a vNH of a virtual node generated on each Egress PE in the redundancy protection group, or may select a global unique Router ID in the network as a vNH of a virtual node generated on each Egress PE in the redundancy protection group.

Figure 9:
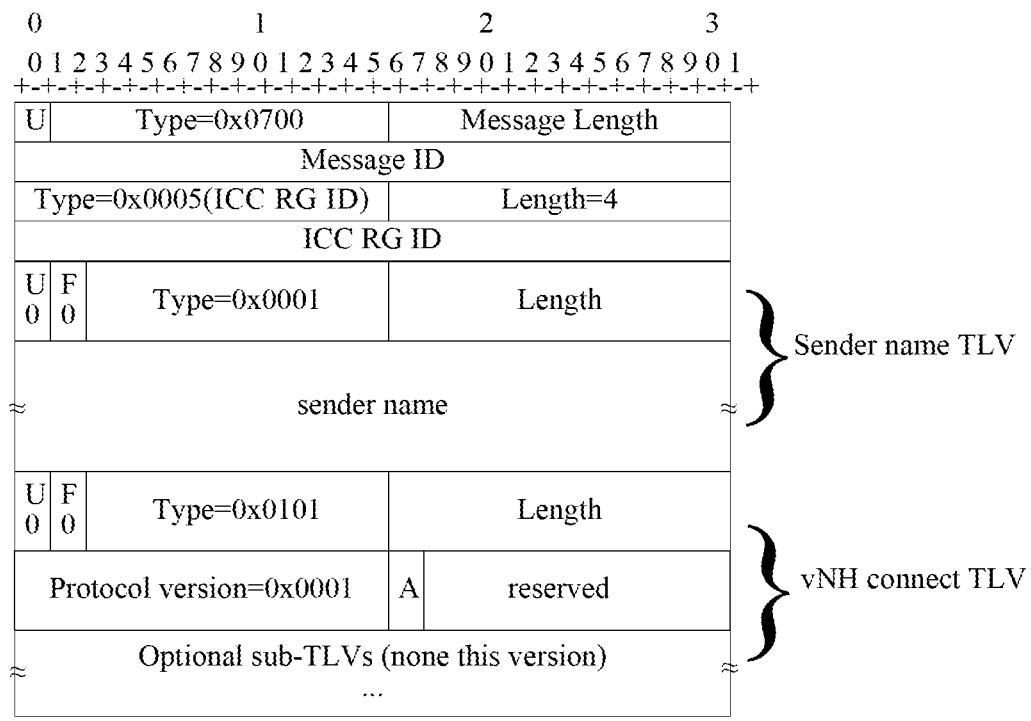
FIG. 9 is a schematic diagram of a format of a vNH RG connect message according to an embodiment of the present application.

A format of a vNH RG connect message is shown in FIG. 9. The vNH RG connect message carries a vNH connect TLV, where the vNH connect TLV includes a U-bit, an F-bit, a type (Type), a length (Length), a protocol version (Protocol Version), an A-bit, a reserved field (Reserved) and an optional sub-TLV. A value of the type (Type) is user-defined, and may be, for example, 0x0101.

Figure 10:
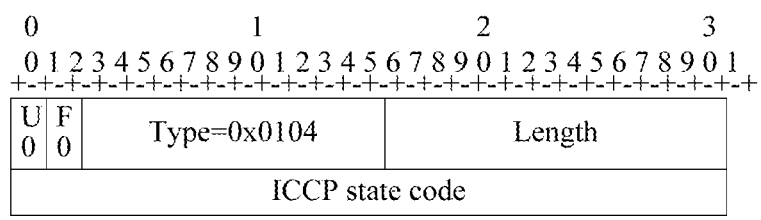
FIG. 10 is a schematic diagram of a format of a vNH RG disconnect message according to an embodiment of the present application.

As shown in FIG. 10, in a vNH RG disconnect message, a value of a type may be 0x0701. The vNH RG disconnect message carries a disconnect code TLV, and certainly may also carry another optional TLV. Type and Length in a vNH disconnect code TLV are 2 bytes in length, and values of Type and Length are user-defined, for example, the type in the vNH disconnect code TLV may be 0x0104.

Figure 11:
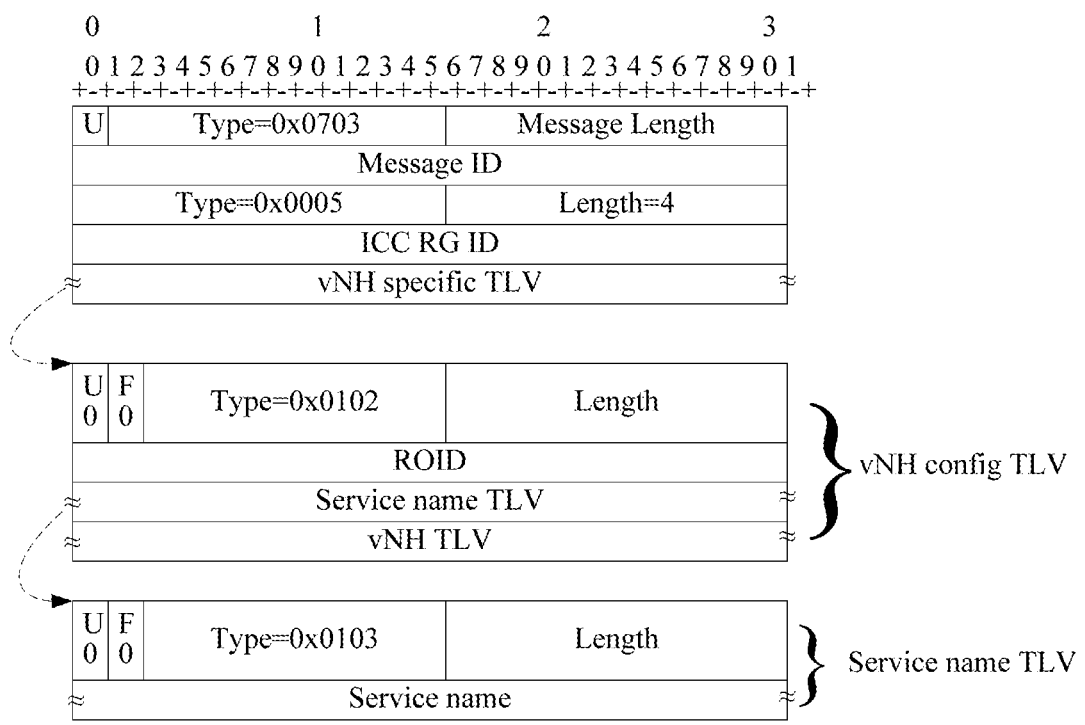
FIG. 11 is a schematic diagram of a format of a vNH RG application data message according to an embodiment of the present application.

A format of a vNH RG application data message is shown in FIG. 11. In the vNH RG application data message, coded values of a message type and a TLV type are only a type of possible coded values, and may be further other values, as long as the values do not conflict with allocated values in standards (draft-ietf-pwe3-iccp-11 and other relevant standards).

After the virtual node is generated on the first Egress PE, the first Egress PE sends a first link state message to an ingress provider edge device Ingress PE, where the first link state message includes: a Router ID of the first Egress PE and state information of a link from the first Egress PE to the virtual node, and the state information of the link from the first Egress PE to the virtual node includes a cost value M of the link from the first Egress PE to the virtual node and the Router ID of the virtual node.

After the virtual node is generated on the first Egress PE, the first Egress PE sends a second link state message to the Ingress PE, where the second link state message includes: the Router ID of the virtual node, state information of a link from the virtual node to the first Egress PE and state information of a link from the virtual node to the second Egress PE, the state information of the link from the virtual node to the first Egress PE includes a cost value N of the link from the virtual node to the first Egress PE and the Router ID of the first Egress PE, and the state information of the link from the virtual node to the second Egress PE includes a cost value T of the link from the virtual node to the second Egress PE and a Router ID of the second Egress PE. N and T are maximum cost values in an Interior Gateway Protocol IGP.

After the virtual node is generated on the second Egress PE, the second Egress PE sends a third link state message to the Ingress PE, where the third link state message includes: a Router ID of the second Egress PE and state information of a link from the second Egress PE to the virtual node, and the state information of the link from the second Egress PE to the virtual node includes a cost value S of the link from the second Egress PE to the virtual node and the Router ID of the virtual node.

After the virtual node is generated on the second Egress PE, the second Egress PE sends a fourth link state message to the Ingress PE, where the fourth link state message includes: the Router ID of the virtual node, state information of a link from the virtual node to the first Egress PE and state information of a link from the virtual node to the second Egress PE, the state information of the link from the virtual node to the first Egress PE includes a cost value N of the link from the virtual node to the first Egress PE and the Router ID of the first Egress PE, and the state information of the link from the virtual node to the second Egress PE includes a cost value T of the link from the virtual node to the second Egress PE and a Router ID of the second Egress PE. N and T are maximum cost values in an Interior Gateway Protocol IGP.

After receiving the first link state message, the second link state message, the third link state message and the fourth link state message, the Ingress PE (such as PE1) obtains a vNH of the virtual node, the cost value M of the link from the first Egress PE to the virtual node and the cost value S of the link from the second Egress PE to the virtual node.

According to different tunnel types used in the network, any one of the first link state message, the second link state message, the third link state message and the fourth link state message may further include other attributes, for example, for an MPLS TE tunnel, the any one further includes one or more of a bandwidth, an affinity, a color and the like.

The values of S and M are set by using multiple methods, for example, for the MPLS TE tunnel using an explicit route, S and M may be set to any valid cost value in the IGP. S and M may be also statically configured.

Moreover, the present application provides an automatic calculation method used for a GRE tunnel and an MPLS tunnel that is established based on an LDP.

At least one of the first Egress PE and the second Egress PE determines the cost value M of the link from the first Egress PE to the virtual node and the cost value S of the link from the second Egress PE to the virtual node according to a manner (1) or (2), and synchronizes the determined cost value M of the link from the first Egress PE to the virtual node and the determined cost value S of the link from the second Egress PE to the virtual node to the redundancy protection group in which the first Egress PE and the second Egress PE are located:

(1) S and M satisfy:

$$\begin{cases} Sxy4 + S > Sxy3 + M \text{ and} \\ C34 + S > M \end{cases}$$

where Px is any neighboring node of the first Egress PE, Pxy is any neighboring node of Px in a network excluding the first Egress PE, Sxy3 is a cost value of a shortest path from Pxy to the first Egress PE, Sxy4 is a cost value of a shortest path from Pxy to the second Egress PE, and C34 is a cost value of a shortest path from the first Egress PE to the second Egress PE.

(2) S and M satisfy:

$$X + M < Y + S \square$$

where X is a cost value of a shortest path from the Ingress PE to the first Egress PE, and Y is a cost value of a shortest path from the Ingress PE to the second Egress PE.

In manner (1), S and M that satisfy both the inequality □ and the inequality □ are solved, that is, an M–S pair satisfying both the inequality □ and the inequality □ is solved.

For calculation on a cost value of a link from an Egress PE to a virtual node, each Egress PE in the redundancy protection group may calculate an M–S pair satisfying the inequality □ and the inequality □, that is, PE3 in the redundancy protection group may calculate an M–S pair satisfying the inequality □ and the inequality □, and PE4 in the redundancy protection group may also calculate an M–S pair satisfying the inequality □ and the inequality □.

If multiple Egress PEs in the redundancy protection group calculate different M–S pairs, the multiple Egress PEs may determine M and S finally deployed on all Egress PEs of the redundancy protection group by means of negotiation between each other.

Optionally, if multiple M–S pairs satisfying conditions are obtained according to manner (1) or (2), an M–S pair whose S is minimum or an M–S pair whose M is minimum is selected, and the selected M–S pair is synchronized to all the Egress PE of the redundancy protection group. M in the selected M–S pair is carried in the first link state information, and S in the selected M–S pair is carried in the third link state information.

Optionally, an M–S pair may be determined on any Egress PE in the redundancy protection group according to manner (1) or manner (2), and the determined M–S pair is synchronized to another Egress PE in the redundancy protection group. Optionally, the synchronizing the determined M–S pair to another Egress PE in the redundancy protection group may be implemented by using a synchronization protocol.

Optionally, M and S may be also configured on all the Egress PEs of the redundancy protection group directly according to manner (2). For example, M may be set to 1, and S is set to a maximum value of cost values in the IGP protocol.

Optionally, M and S may be further calculated according to manner (1) or (2) on multiple Egress PEs of the redundancy protection group. If multiple M–S pairs satisfying the conditions are obtained according to manner (1) or (2), an M–S pair whose S is minimum or an M–S pair whose M is minimum is selected. Certainly, an M–S pair satisfying the inequalities □ and □ may be also selected randomly. M in the selected M–S pair is carried in the first link state information, and S in the selected M–S pair is carried in the third link state information.

S204: Establish a tunnel from an Ingress PE to the virtual node.

With reference to the network architecture in FIG. 3, assuming that PE3 is a first Egress PE, PE4 is a second Egress PE, and PE1 is an Ingress PE, a tunnel from the Ingress PE to the virtual node is established. PE1 calculates, by using the IGP, a first path using PE1 as a start point and passing through PE3: PE1→P1→PE3→virtual node. A previous-hop node P1 of PE3 calculates, by using the IGP, a third path using P1 as a start point, not passing through PE3, but passing through PE4: P1→P2→PE4→virtual node, and the third path and PE1→P1 in the first path form a second path: PE1→P1→P2→PE4→virtual node. The second path does not pass through an Egress PE PE3. The tunnel from the Ingress PE to the virtual node includes the first path and the second path.

The first path and the second path may be an MPLS LSP generated by running the LDP, or may be a path or tunnel generated according to another protocol. The IGP may be an Open Shortest Path First (OSPF) protocol or an Intermediate System to Intermediate System (ISIS) protocol or an MRT.

In the network architecture shown in FIG. 3, PE1 is an Ingress PE, and PE3 and PE4 are Egress PEs. It is assumed that PE3 is a primary device (Primary PE) in the redundancy protection group including PE3 and PE4, and PE4 is a backup device (Backup PE) in the redundancy protection group in which PE3 and PE4 are located. A primary tunnel or primary path passing through the primary device PE3 and reaching the virtual node PE1→P1→PE3→virtual node is established, and a protection tunnel or protection path sequentially passing through a previous-hop node P1 of the primary device PE3, a previous-hop node of the backup device PE4, and the backup device PE4 and reaching the virtual node PE1→P1→P2→PE4→virtual node is also established, where the protection tunnel or protection path does not pass through the primary device PE3.

Whether establishment of the primary tunnel passes through PE3 or PE4 differs as the tunnel type differs, and each node (including an intermediate node of a path) determines a next hop according to a total cost from the node to the virtual node, thereby obtaining an entire tunnel path. For a multi-protocol label switching (MPLS) tunnel established by using the LDP, the tunnel depends on a route, and when PE3 needs to be used as a node through which the primary tunnel passes, setting may be made according to the foregoing method for setting a link cost value in the IGP. When PE4 needs to be used as a node through which the primary tunnel passes, the link cost values of PE3 and PE4 in the IGP may be exchanged.

A link cost value may be further set by using other setting methods, and many values may be used for a specific network, and are generally a range. The foregoing method is only one of the methods.

Which is a primary device and which is a backup device in a pair of PEs in a mutual protection relationship are relative to an Ingress PE (such as PE1 in FIG. 3) of a tunnel, and different Ingress PEs may have different primary devices and backup devices. When an LDP tunnel is used, if the foregoing cost is set in such a way that M and S have solutions, the second path may be calculated according to an LFA algorithm, so that protection on an Egress PE may be completed by a previous-hop node P device of the Egress PE by switching traffic to the second path. By using the method, a P device in the live network only supporting LFA does not need to change, and as long as the Egress PE is replaced, the method of this embodiment of the present application may be implemented. Another method for setting a cost value is: M and S satisfy X+M<Y+S, where X is a cost value of a shortest path from the Ingress PE to the first Egress PE, and Y is a cost value of a shortest path from the Ingress PE to the second Egress PE. For example, M may be set to 1, and S may be set to a valid maximum value of an IGP (valid maximum values of different IGP protocols are different, and are also slightly different for specific implementation manufacturers). For the cost setting, there are the same primary device and backup device for all Ingress PEs. In some cases, which is a primary device and which is a backup device are not important, and if different Ingress PEs can select a PE in the redundancy protection group as a primary Egress PE relatively uniformly, it is favorable to traffic load sharing.

If the MRT is used as the IGP protocol, setting M and S to any valid value can guarantee that a previous-hop of an Egress PE can calculate a second path (backup path), such as setting both M and S to 1. The second path (backup path) does not pass through an Egress PE that a first path (primary path) passes through. The second path (backup path) can be calculated by using the MRT protocol in the IGP protocol without being limited to networking.

Generation of the virtual node, the link between the virtual node and PE3, and the link between the virtual node and PE4 may be completed by using the IGP protocol between PE3 and PE4.

When an Open Shortest Path First (OSPF) protocol is run between devices in the network, after a virtual node is generated on PE3, both a link state and a neighbor relationship of PE3 change, and therefore PE3 updates its own link state and neighbor relationship, constructs a first link state advertisement (LSA), and floods the first LSA into the entire network, where the first LSA includes: a Router ID of PE3 and state information of a link from PE3 to the virtual node, and the state information of the link from PE3 to the virtual node includes a cost value of the link from PE3 to the virtual node and the Router ID of the virtual node. Because the virtual node is generated on PE3, PE3 further "represents" the virtual node to construct a second LSA, and floods the second LSA into the entire network. The second LSA includes: the Router ID of the virtual node, state information of a link from the virtual node to PE3 and link state information of a link from the virtual node to PE4. The state information of the link from the virtual node to PE3 includes a cost value of the link from the virtual node to PE3 and a Router ID of PE3, and the state information of the link from the virtual node to PE4 includes a cost value of the link from the virtual node to PE4 and a Router ID of PE4. Similarly, other Egress PEs in the redundancy protection group also construct corresponding LSAs and flood these LSAs into an entire OSPF field, where the OSPF field may be the entire network. For example, after the virtual node is generated on PE4, both a link state and a neighbor relationship of PE4 change, and therefore PE4 updates its own link state and neighbor relationship, constructs a third LSA, and floods the third LSA into the entire network. The third LSA includes: a Router ID of PE4 and state information of a link from PE4 to the virtual node, and the state information of the link from PE4 to the virtual node includes a cost value of the link from PE4 to the virtual node and the Router ID of the virtual node. Because the virtual node is generated on PE4, PE4 further "represents" the virtual node to construct a fourth LSA, and floods the fourth LSA into the entire network, where the fourth LSA includes: the Router ID of the virtual node, state information of a link from the virtual node to PE3 and state information of a link from the virtual node to PE4. The state information of the link from the virtual node to PE3 includes a cost value of the link from the virtual node to PE3 and a Router ID of PE3, and the state information of the link from the virtual node to PE4 includes a cost value of the link from the virtual node to PE4 and a Router ID of PE4. PE3 and PE4 flood these LSAs into the OSPF field. In this way, another node located in the same OSPF field as PE3 and PE4, such as PE1, can "see" the virtual node, the link between the virtual node and PE3, and the link between the virtual node and PE4, and therefore a tunnel from PE1 to a vNH of the virtual node can be established. The link state is description information on an OSPF interface of a router, such as an IP address on the interface, a subnet mask, a network type, and a cost value. OSPF routers exchange link states rather than routing tables between each other, and an OSPF router (such as PE1) calculates a precise network path reaching each target by obtaining all link state information in the network.

When an Intermediate System to Intermediate System (ISIS) protocol is run between PE3 and PE4, after a virtual node is generated on PE3, both a link state and a neighbor relationship of PE3 change, and therefore PE3 updates its own link state and neighbor relationship, constructs a first link state packet LSP (Link-state PDU), and floods the first LSP into the entire network, where the first LSP includes: a Router ID of PE3 and state information of a link from PE3 to the virtual node, and the state information of the link from PE3 to the virtual node includes a cost value of the link from PE3 to the virtual node and the Router ID of the virtual node. Because the virtual node is generated on PE3, PE3 further "represents" the virtual node to construct a second LSP, and floods the second LSP into the entire network, where the second LSP includes: the Router ID of the virtual node, state information of a link from the virtual node to PE3 and link state information of a link from the virtual node to PE4. The state information of the link from the virtual node to PE3 includes a cost value of the link from the virtual node to PE3 and a Router ID of PE3, and the state information of the link from the virtual node to PE4 includes a cost value of the link from the virtual node to PE4 and a Router ID of PE4. Similarly, other Egress PEs in the redundancy protection group, for example, also construct corresponding LSPs and flood these LSPs into an entire ISIS field, where the ISIS field may be the entire network. For example, after the virtual node is generated on PE4, both a link state and a neighbor relationship of PE4 change, and therefore PE4 updates its own link state and neighbor relationship, constructs a third LSP, and floods the third LSP into the entire network, where the third LSP includes: a Router ID of PE4 and state information of a link from PE4 to the virtual node, and the state information of the link from PE4 to the virtual node includes a cost value of the link from PE4 to the virtual node and the Router ID of the virtual node. Because the virtual node is generated on PE4, PE4 further "represents" the virtual node to construct a fourth LSP, and floods the fourth LSP into the entire network, where the fourth LSP includes: the Router ID of the virtual node, state information of a link from the virtual node to PE3 and state information of a link from the virtual node to PE4. The state information of the link from the virtual node to PE3 includes a cost value of the link from the virtual node to PE3 and a Router ID of PE3, and the state information of the link from the virtual node to PE4 includes a cost value of the link from the virtual node to PE4 and a Router ID of PE4. PE3 and PE4 flood these LSPs into the ISIS field. In this way, another node located in the same ISIS field as PE3 and PE4, such as PE1, can "see" the virtual node, the link between the virtual node and PE3, and the link between the virtual node and PE4, and therefore a tunnel from PE1 to a vNH of the virtual node can be established.

An attribute value (cost value) of a link between the generated virtual node and an Egress PE in the redundancy protection group may be automatically set or manually set according to a situation. For example, if it is intended that PE3 becomes a node through which a primary path of a tunnel passes, and that PE4 becomes a node through which a backup path of the tunnel passes, a cost value of the link from PE3 to the virtual node may be set to 1, and a cost value of the link from PE4 to the virtual node may be set to a maximum cost value in the IGP. According to different IGPs run between PE3 and PE4, a different maximum cost value of a link may be set, for example, when OSPF is run in the network, a maximum cost value of a link may be set to 65535. To disable the virtual node to undertake transit traffic, both the cost value of the link from the virtual node to PE3 and the cost value of the link from the virtual node to PE4 may be set to a maximum cost value in the IGP. To avoid the transit traffic, the virtual node needs to be configured to be in an overload mode. In the OSPF protocol, implementation may be performed by setting the cost value of the link from the virtual node to the Egress PE node PE3 and the cost value of the link from the virtual node to PE4 to the maximum cost value in the IGP. In the ISIS protocol, implementation may be performed by setting overload bit bits of the second LSP and the fourth LSP to 1. In the IGP, a physical link is generally bidirectional, links described in the IGP are all directional, and each direction needs to be described individually. Cost values of a physical link in different directions may be different, or may be the same.

The virtual node does not truly exist physically, and is generated only for a purpose that another node in the IGP domain can calculate a tunnel passing through PE3. An upstream node P1 of PE3 can calculate another backup tunnel reaching PE4, such as PE1→P1→P2→PE4, and the backup tunnel does not pass through PE3. In this way, when PE3 is faulty, traffic can be switched to the backup tunnel by using P1 to reach PE4, thereby achieving an objective of protecting PE3.

Because PE3 and PE4 is symmetrical, a primary tunnel passing through PE4 may be also established, and a backup tunnel passing through PE3 but not passing through PE4 is established on a previous-hop node (such as P2 in FIG. 3) of PE4, such as PE1→P2→P1→PE3, and when PE4 is faulty, traffic is switched to the backup tunnel on P2, thereby achieving an objective of protecting PE4.

S206: The first Egress PE allocates a first label to a first forwarding equivalence class of a first virtual private network VPN, and the second Egress PE allocates the first label to the first forwarding equivalence class of the first VPN.

Figure 13:
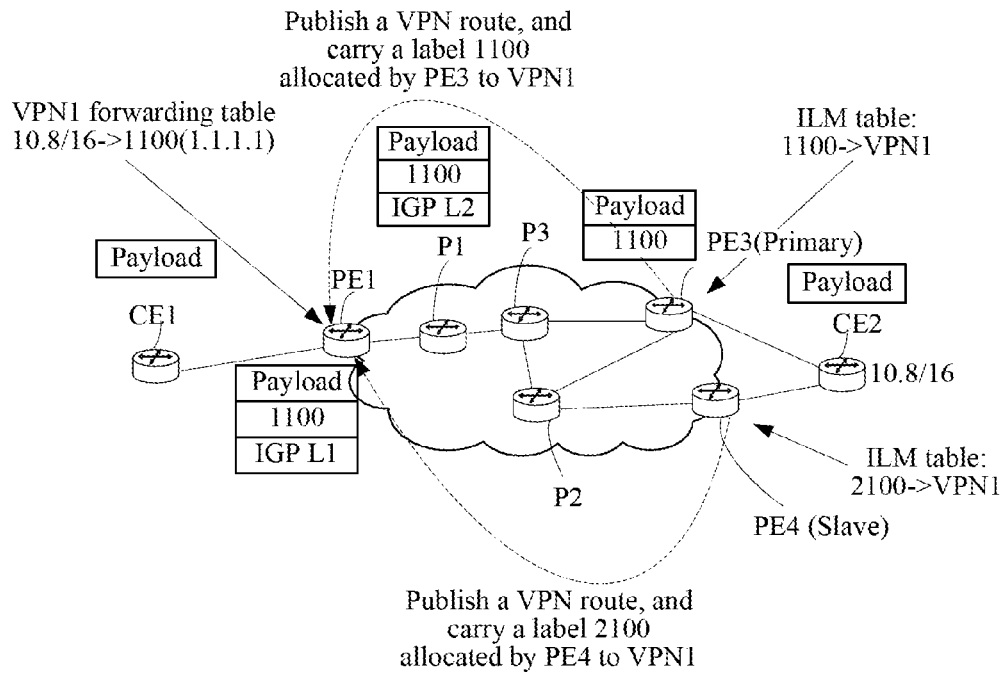
FIG. 13 is a schematic diagram of a method for allocating a label according to an embodiment of the present application.

The first Egress PE and the second Egress PE allocate the first label to the first forwarding equivalence class of the first VPN separately. Allocating a label may be allocating a label to each route, may be also allocating a label to each VPN, and may be further allocating a label to each interface or port. Each PE has its own label space, and independently performs allocation. If a label is allocated to each VPN, when an Ingress PE sends a packet to an Egress PE, the label allocated by the Egress PE to the VPN is added to the packet. For example, in FIG. 13, generally, a VPN label allocated by PE3 to a VPN (such as VPN1) is 1100, and a VPN label allocated by PE4 to the VPN1 may be 2100. In this case, when PE1 sends the VPN packet of the VPN1 to PE3, the VPN label 1100 allocated by PE3 needs to be used, and after the VPN packet reaches PE3, PE3 can correctly find a corresponding VPN (that is, VPN1) by using 1100. If the VPN packet carrying the VPN label 1100 is sent to PE4, PE4 cannot identify the VPN packet or perform correct processing, or erroneously forwards the VPN packet to another VPN, or discards the VPN packet or does not process the VPN packet because there is no entry corresponding to the VPN label 1100 on PE4.

In this embodiment of the present application, because the virtual node is generated on PE3 and PE4, and when finding that PE3 and PE4 are located in the redundancy protection group, PE3 and PE4 allocate a same VPN label to a VPN (such as VPN1) by means of dynamic negotiation or static configuration, no matter whether the VPN packet is sent to a primary PE (such as PE3) or a backup PE (such as PE4), the VPN packet may be correctly processed.

Figure 12:
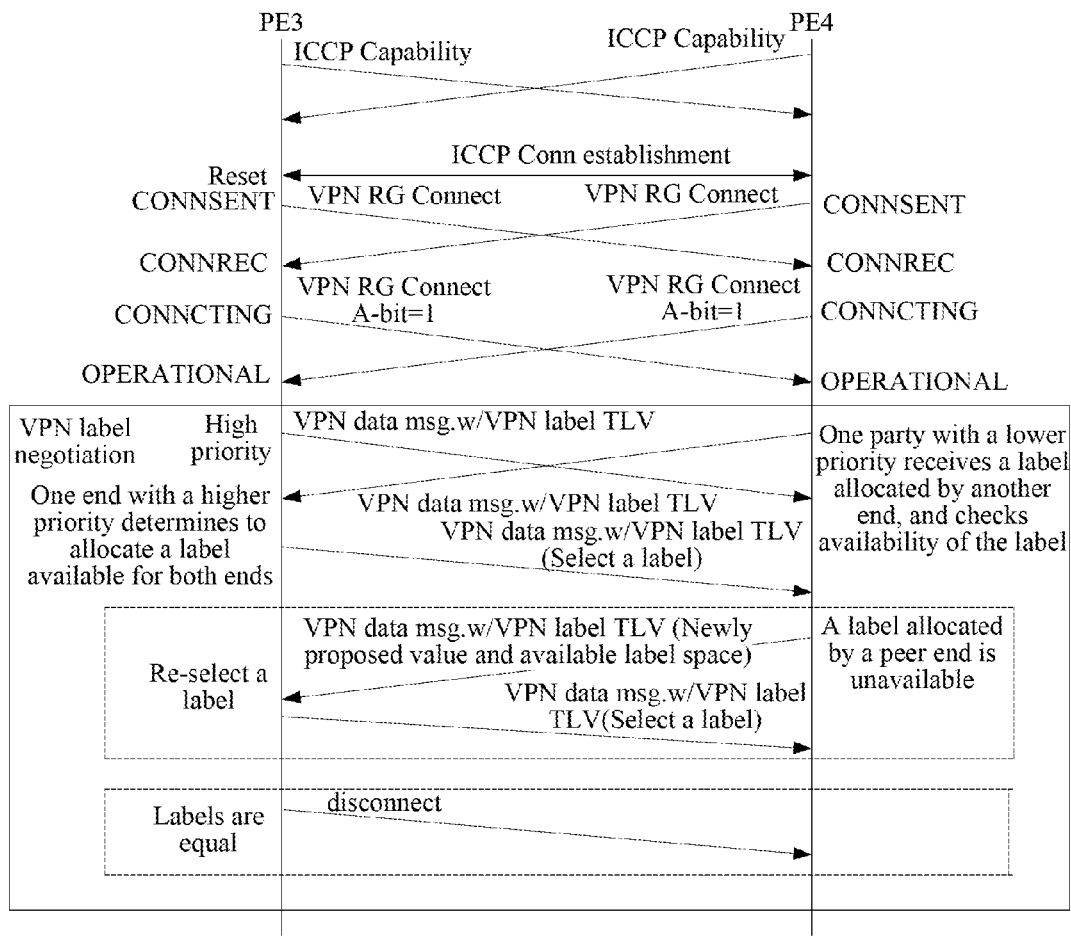
FIG. 12 is a schematic flowchart of a method for negotiating and allocating a VPN label according to an embodiment of the present application.

An ICCP session may be established between PE3 and PE4, and PE3 and PE4 negotiate to allocate a same label to a VPN. When publishing a VPN route, both PE3 and PE4 use the same label as a label of the VPN route. A label per VPN allocation manner (that is, a label is allocated to each VPN) is used herein, and actually, a label per route allocation manner (that is, a label is allocated to each route of a VPN), or an interface per route allocation manner (a label is allocated to each attached circuit (AC) interface) may be also used. An example in which a label is allocated to each VPN is used, and as shown in FIG. 12, a method for negotiating and allocating a VPN label includes:

S1201: A local PE (such as PE3 in FIG. 3) and a peer PE (such as PE4 in FIG. 3) in a redundancy protection group RG separately send an ICCP capability packet to an opposite party, to request to establish an ICCP connection.

S1202: After the ICCP connection is established, the local PE and the peer PE restart.

S1203: The local PE and the peer PE separately send a VPN RG connect packet to the opposite party.

S1204: After receiving the VPN RG connect packet sent by the opposite party, the local PE and the peer PE send VPN RG connect A-bit=1 to the opposite party.

S1205: The local PE and the peer PE separately send a VPN data message to the opposite party, where the VPN data message includes a VPN label TLV, and the VPN label TLV carries its own priority.

S1206: After receiving the VPN data message sent by the opposite party, the local PE and the peer PE compare a priority carried in the VPN data message sent by the opposite party with its own priority, if the priority carried in the VPN data message sent by the opposite party is higher than its own priority, one party with a lower priority receives a VPN label allocated by one party with a higher priority, where it is assumed herein that the priority of the local PE is higher than the priority of the peer PE.

That is, if the priority of the local PE is higher than the priority of the peer PE, and a label (Lr) allocated by the peer PE has not yet been occupied (not allocated) on the local PE, the local PE is selected to allocate Lr to the VPN. If the priority of the local PE is higher than the priority of the peer PE, and the label (Lr) allocated by the peer PE is already occupied on the local PE, a label Li is selected from available label space of the peer PE, Li is not allocated on the local PE, and the local PE allocates Li to the VPN. An ICCP message is updated by using the newly allocated label. If the priority of the local PE is less than the priority of the peer PE, it is checked whether the label Lr allocated by the peer PE is already occupied on the local PE, and if the label Lr allocated by the peer PE has not been occupied on the local PE, Lr is used. If the label Lr allocated by the peer PE is occupied on the local PE, the peer PE allocates a new label L1, the ICCP message is updated and sent to the local PE, and if the label L1 is not occupied by the local PE, the label L1 is used as a label of the VPN; or if the label L1 is occupied by the local PE, the peer PE allocates another label Ln as a label of the VPN. If the priority of the local PE is equal to the priority of the peer PE, the local PE and the peer PE separately report an error, and send an RG notification message that carries a reject TLV and a priority error TLV.

S1207: The local PE determines a label that is available for both parties, carries the label in the VPN label TLV of the VPN data message and sends the VPN data message to the peer PE.

S1208: After receiving the VPN data message sent by the local PE with the higher priority, the peer PE checks availability of the label determined by the local PE.

S1209: If the peer PE determines that the label determined by the local PE is unavailable, the peer PE sends the VPN data message to the local PE, where the VPN label TLV of the VPN data message carries a label value proposed by the peer PE and available label space of the peer PE.

S1210: The local PE receives the VPN data message that is sent by the peer PE and carries the label value proposed by the peer PE and the available label space of the peer PE, selects a label again, carries the newly selected label in the VPN label TLV of the VPN data message, and sends the VPN data message to the peer PE.

S1211: If the priority carried in the VPN label TLV of the VPN data message sent by the opposite party is equal to its own priority, send a disconnect message to the opposite party to disconnect the ICCP connection between both parties.

After a protection group of a tunnel from an Ingress PE to the virtual node is established, a previous-hop neighbor (such as P3) of the primary Egress PE of a primary Egress PE (such as PE3) can quickly switch traffic from the primary Egress PE (such as PE3) to a backup Egress PE (such as PE4) when the primary Egress PE (such as PE3) is faulty. There may be multiple methods for detecting a fault of the primary Egress PE, for example, whether the primary PE is faulty may be determined according to a state of a physical interface, and whether the primary PE is faulty may be also determined by running a Bidirectional Forwarding Detection (BFD) protocol between an Ingress PE (such as PE1) and an Egress PE (such as PE3). A backup path may be calculated in advance and installed on a forwarding plane, and detected by using the BFD protocol or Ethernet operation administration and maintenance (OAM), and a detection time can be also controlled within 50 ms, and therefore traffic can be switched from the primary PE (such as PE3) to the backup PE (such as PE4) within 50 ms. Fault detection may be also limited to be performed on a link layer between two devices on a link that are directly connected, and end-to-end (such as multiple hops cross from PE1 to PE3) BFD detection is not needed, for example, fault detection may be limited to be performed between these two directly connected devices P1 and PE3 on the primary tunnel.

After receiving traffic switched from the primary PE, the backup PE (such as PE4) needs to be capable of correctly processing an inner-layer label of the VPN. In this embodiment of the present application, a method for allocating a same label to a same VPN of the primary PE (such as PE3) and the backup PE (such as PE4) enables the backup PE (such as PE4), after receiving traffic switched from the primary PE (such as PE3), to perform processing according to an ordinary VPN process without the need of special forwarding hardware and process.

A format of a packet involved in a VPN label negotiation method shown in FIG. 12 is briefly introduced below.

Figure 14:
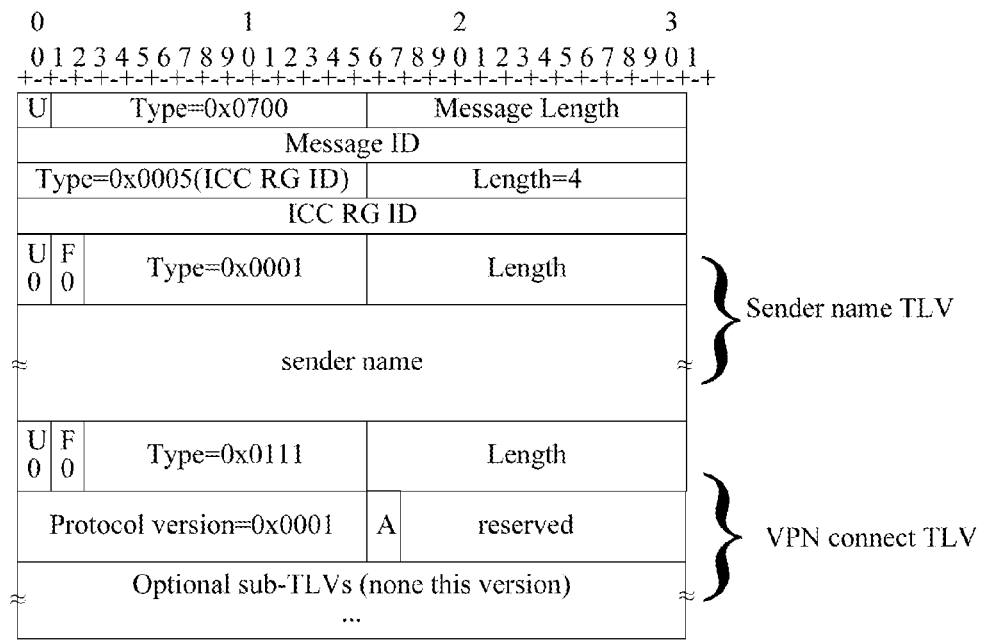
FIG. 14 is a schematic diagram of a format of a VPN connect message according to an embodiment of the present application.

A VPN connect message is used for establishing an ICCP redundancy protection group connection and individual application connections between PEs in a redundancy protection group. As shown in FIG. 14, the VPN connect message includes:

(1) an ICC header carrying a message type value that is "RG Connect Message" (0x0700), (2) an ICC sender name TLV, and (3) zero or one application-specific connect TLV.

The VPN connect TLV includes: a U-bit, an F-bit, a type (Type), a length (Length), a protocol version (Protocol Version), an A-bit, a reserved field (Reserved) and an optional sub-TLV. A value of the type (Type) is user-defined, and may be, for example, 0x0111. A value of the protocol version field may be 0x0001. Values of the U-bit and the F-bit may be set to 0.

The VPN disconnect message is used as:

(1) a signal indicating that a particular application connection is closed, or (2) a signal indicating that the ICCP redundancy protection group connection is closed because a PE intends to leave the redundancy protection group.

A type value of the VPN disconnect message may be 0x0701. The VPN disconnect message carries a VPN disconnect code TLV shown in FIG. 15 (*a*), and the VPN disconnect message may also carry another optional TLV. Type and Length in the VPN disconnect code TLV are 2 bytes in length, and values of Type and Length are user-defined, for example, the type in the VPN disconnect code TLV may be 0x0114.

Optionally, the VPN disconnect message may further carry a VPN disconnect Cause TLV shown in FIG. 15 (*b*).

The VPN disconnect Cause TLV includes: a U-bit, an F-bit, a length (Length), a type (Type) and a Disconnect Cause String. The Disconnect Cause String denotes a reason why an ICCP connection in VPN label negotiation is disconnected. Values of the U-bit and the F-bit may be 0. Type and Length in the VPN disconnect code TLV are 2 bytes in length, and values of Type and Length are user-defined, for example, the type in the VPN disconnect code TLV may be 0x0115.

A VPN application data message is used for transmitting data between PEs in a same redundancy protection group. As shown in FIG. 16, the VPN application data message includes: a single VPN application data message may be used for carrying data of an application, and multiple application TLVs may be carried in an individual VPN application data message as long as the multiple application TLVs all belong to the application. A format of the VPN application data message includes an ICC header carrying a message type that is an RG Application Data Message (0x703), and an application-specific TLV. FIG. 16, besides the ICC header, the VPN application data message further includes a VPN configuration TLV: VPN config TLV.

The VPN config TLV includes a U-bit, an F-bit, a type (Type), a length (Length), a redundant object identifier ROID, a service name TLV and a VPN label TLV, where values of both the U-bit and the F-bit may be 0. A value of the type may be 0x01112. The Redundant Object Identifier (ROID) is used for uniquely identifying a redundant object (Redundant Object) protected in the redundancy protection group. The redundant object may be a link, a link bundle (bundle), a virtual local area network (VLAN) or the like. The service name TLV may include a U-bit, an F-bit, a type (Type), a length (Length) and a service name. Values of the U-bit and the F-bit may be 0, a value of the type (Type) is user-defined, and may be, for example, 0x0113, the service name includes a name of an L2VPN service instance encoded in a UTF-8 format, and the service name field is as long as 80 characters (character) at most.

The VPN label TLV is used for identifying a VPN label allocated to an Ingress PE by a PE sending the VPN application data message. A primary PE (such as PE3) and a backup PE (such as PE4) separately send a VPN application data message to an opposite party to negotiate to allocate a same VPN label to the Ingress PE. A format of the VPN label TLV is shown in FIG. 17, and the VPN label TLV includes a U-bit, an F-bit, a type (Type), a length (Length), a label lower (Label Lower), a label upper (Label upper) and a reserved field (Reserved). Values of the U-bit and the F-bit may be 0, and a value of the type (Type) is a user-defined value, and may be, for example, 0x0102. The Label Lower identifies a lower value of available label space, and the Label upper identifies an upper value of the available label space.

Coded values of the message type and the TLV type in the foregoing message are only a type of possible coded values, and may be further other values, as long as the values do not conflict with allocated values in a standard (draft-ietf-pwe3-iccp-11).

The method of the foregoing embodiment is directed to a scenario in which a redundancy protection group only includes two egress PEs, and the method may be applied to a redundancy protection group including multiple egress PEs, where in the redundancy protection group, a PE is a node through which a primary tunnel of an Ingress PE passes, other PEs are all nodes through which a backup tunnel passes, and the backup tunnel does not pass through the PE node through which the primary tunnel passes. In a scenario in which multiple egress PEs are included, a primary PE and a backup PE need to be statically configured or selected. A priority sequence of multiple backup PEs may be further statically configured or designated by means of selection. When the primary PE is faulty, the multiple backup PEs may replace the primary PE according to the priority sequence, that is, a primary tunnel is switched to a backup tunnel. In the redundancy protection group including multiple Egress PEs, priorities of all the Egress PEs in the redundancy protection group may be compared, an Egress PE with a highest priority is selected as a primary Egress PE of the redundancy protection group, and other Egress PEs in the redundancy protection group are used as backup Egress PEs of the redundancy protection group. If in a comparison process, multiple Egress PEs have equal priorities and are all Egress PEs with the highest priority in the redundancy protection group, addresses of the multiple Egress PEs with the equal priorities are compared, and an Egress PE of the multiple Egress PEs with the equal priorities whose address is maximum or minimum is selected as the primary Egress PE. For example, if the redundancy protection group includes five Egress PEs: PE1, PE2, PE3, PE4, and PE5, PE1, PE2 and PE3 have equal priorities and the priorities of PE1, PE2 and PE3 are all higher than a priority of PE4 and a priority of PE5, a value of the address of PE1, a value of the address of PE2 and a value of the address of PE3 are compared between each other. Assuming that a comparison result is that the address of PE1 is greater than the address of PE2, and the address of PE2 is greater than the address of PE3, PE1 whose address is maximum may be selected as the primary Egress PE of the redundancy protection group. Certainly, PE3 whose address is minimum may be also selected as the primary Egress PE of the redundancy protection group.

After the primary Egress PE is selected, a tunnel that comes from an Ingress PE, passes through the primary Egress PE and reaches the virtual node may be established, multiple backup tunnels that sequentially pass through a previous-hop node of the primary PE, and the backup Egress PEs, and reach the virtual node may be further established, and the backup tunnels do not pass through the primary Egress PE.

When the primary Egress PE is faulty, multiple backup Egress PEs may replace the primary Egress PE according to a priority sequence, that is, traffic is switched from a primary tunnel that passes through the primary Egress PE and reaches the virtual node to a backup tunnel that passes through the previous-hop node of the primary PE and the backup Egress PEs and reaches the virtual node.

When multiple Egress PEs in a same redundancy protection group negotiate by means of the ICCP, ICCP negotiation between the multiple Egress PEs is implemented by means of negotiation between each pair of ICCP.

The method of this embodiment of the present application may be further used in cooperation with Maximally Redundant Trees (MRT) fast reroute (FRR), the MRT FRR may ensure that as long as the network is 2-connected, a backup tunnel can be calculated, and a backup tunnel calculated by an upstream neighbor of the primary PE does not pass through the primary PE. That is, once the primary PE is faulty, a packet can be definitely switched to the backup PE. A network is referred to as a 2-connected network if this network is divided into two or more parts only when at least two nodes are deleted (A graph that has no cut-vertices. This is a graph that requires two nodes to be removed before the network is partitioned). For definition of the 2-connected network, reference may be made to IETF draft-enyedi-rtgwg-mrt-frr-algorithm-02.

However, some networks may not use any MRT FRR technology. For a network that uses a Label Distribution Protocol (LDP) fast reroute (FRR) technology based on IGP LFA (loop-free alternate, loop-free alternate (a next hop)), an upstream neighbor of the primary Egress PE may not calculate any backup tunnel. This embodiment of the present application further provides a method for generating a cost value of a link from a primary/backup Egress PE to a virtual node, and the method can improve a possibility of calculating a backup tunnel by means of LDP FRR based on IGP LFA, and improve deployment of the technical solution of this embodiment of the present application.

For the network architecture shown in FIG. 3, it is assumed that the primary Egress PE is PE3, the backup Egress PE is PE4, a cost value of a link from PE3 to the virtual node is M, and a cost value of a link from PE4 to the virtual node is S. The cost values of the links are set by using multiple methods, for example, for the MPLS TE tunnel using an explicit route, S and M may be set to any valid cost value in the IGP. S and M may be also statically configured.

Moreover, the present application provides an automatic calculation method used for a GRE tunnel and an MPLS tunnel that is established based on an LDP.

At least one of PE3 and PE4 determines the cost value M of the link from PE3 to the virtual node and the cost value S of the link from PE4 to the virtual node according to a manner (1) or (2), and synchronizes the determined cost value M of the link from PE3 to the virtual node and the determined cost value S of the link from PE4 to the virtual node to the redundancy protection group in which PE3 and PE4 are located:

(1) S and M satisfy:

$$\begin{cases} Sxy4 + S > Sxy3 + M \text{ and} \\ C34 + S > M \end{cases}$$

where Px is any neighboring node of PE3, Pxy is any neighboring node of Px in a network excluding PE3, Sxy3 is a cost value of a shortest path from Pxy to PE3, Sxy4 is a cost value of a shortest path from Pxy to PE4, and C34 is a cost value of a shortest path from PE3 to PE4.

(2) S and M satisfy:

$$X+M<Y+S\square$$

where X is a cost value of a shortest path from the Ingress PE to the first Egress PE (PE3), is greater than a cost value of a shortest path from the Ingress PE to the second Egress PE (PE4).

In manner (1), S and M that satisfy both the inequality □ and the inequality □ are solved, that is, an M-S pair satisfying both the inequality □ and the inequality □ is solved.

For calculation on a cost value of a link from an Egress PE to a virtual node, each Egress PE in the redundancy protection group may calculate an M-S pair satisfying the inequality □ and the inequality □, that is, PE3 in the redundancy protection group may calculate an M-S pair satisfying the inequality □ and the inequality □, and PE4 in the redundancy protection group may also calculate an M-S pair satisfying the inequality □ and the inequality □.

If multiple Egress PEs in the redundancy protection group calculate different M-S pairs, the multiple Egress PEs may determine M and S finally deployed on all Egress PEs of the redundancy protection group by means of negotiation between each other.

Optionally, if multiple M-S pairs satisfying conditions are obtained according to manner (1) or (2), an M-S pair whose S is minimum or an M-S pair whose M is minimum is selected, and the selected M-S pair is synchronized to all the Egress PE of the redundancy protection group. M in the selected M-S pair is carried in the first link state information, and S in the selected M-S pair is carried in the third link state information.

Optionally, an M-S pair may be determined on any Egress PE in the redundancy protection group according to manner (1) or manner (2), and the determined M-S pair is synchronized to another Egress PE in the redundancy protection group. Optionally, the synchronizing the determined M-S pair to another Egress PE in the redundancy protection group may be implemented by using a synchronization protocol.

Optionally, M and S may be also configured on all the Egress PEs of the redundancy protection group directly according to manner (2). For example, M may be set to 1, and S is set to a maximum value of cost values in the IGP protocol.

Optionally, M and S may be further calculated according to manner (1) or (2) on multiple Egress PEs of the redundancy protection group. If multiple M-S pairs satisfying the conditions are obtained according to manner (1) or (2), an M-S pair whose S is minimum or an M-S pair whose M is minimum is selected. Certainly, an M-S pair satisfying the inequalities □ and □ may be also selected randomly. M in the selected M-S pair is carried in the first link state information, and S in the selected M-S pair is carried in the third link state information.

Particularly, as shown in FIG. 18, if a topology of two Egress PEs (PE3 and PE4) mutually protected in a network and a network side is of a □ shaped structure, a primary tunnel is PE1→P1→PE3→virtual node, and a backup tunnel is PE1→P1→P2→PE4→virtual node. It is assumed that a cost value of a link from P1 to PE3 is A=10, a cost value of a link from P1 to P2 is B=30, a cost value of a link from P2 to PE4 is C=20, a cost value from PE3 to PE4 is D=50, a cost value from PE3 to a virtual node is M, and a cost value from PE4 and the virtual node is S, an appropriate cost that is of a link from an Egress PE to the virtual node and satisfies an LFA calculation requirement may be also found according to costs of links between these four devices.

If C+D>A+B, C+S<A+B+M, that is, M-S>C-(A+B). It may be set herein that M=2+C-A-B, and S=1. This is only one of setting methods, and another setting method may further exist, as long as M-S>C-(A+B) is satisfied.

If C+D<A+B, it may be set that M=1, and S=D. This is only one of setting methods, and another setting method may further exist, as long as S<D+M is satisfied.

If C+D=A+B, it may be set that M=1, and S=1. This is only one of setting methods, and M and S may be further set to any valid value. The valid value refers to any valid value in a range of valid values stipulated by the IGP protocol.

If a PE is connected to two or more P devices at the same time, each group of P devices needs to satisfy the foregoing relationship.

Embodiment 2

As shown in FIG. 19, a method of this embodiment of the present application is applied to an L3VPN, and PE1, PE2, PE3, PE4, P1, and P2 are all located in an MPLS network, where PE1, PE2, PE3, and PE4 are located at edges of the MPLS network. The network is a symmetrical network. PE1, P3, and PE3 are on a plane A, PE2, P2, and PE4 are on a plane B, the plane A and the plane B are symmetrical, and CE1 and CE2 belong to a VPN, such as VPN1. For a packet from CE1 to CE2, PE1 is an ingress node, and PE3 and PE4 are egress nodes. A virtual node is generated on PE3, and a Router ID of the virtual node is vNH1. A virtual node whose address is vNH1 is also generated on PE4. The vNH1 of the virtual node may be dynamically negotiated or statically configured, and for a method for dynamically negotiating vNH1, reference may be made to a method described in FIG. 4 and a corresponding paragraph, and reference may be also made to methods described in FIG. 5 to FIG. 11 and corresponding paragraphs. It is assumed that PE3 in a redundancy protection group is a primary PE (Primary PE), and PE4 is a backup PE (Backup PE). A tunnel from PE1 to the virtual node is established, and the tunnel from PE1 to the virtual node includes a primary path and a backup path. PE1 calculates, by using the IGP, a first path (primary path) using PE1 as a start point and passing through PE3: PE1→P1→PE3→virtual node. A previous-hop node P1 of PE3 calculates, by using the IGP, a third path using P1 as a start point, not passing through PE3, but passing through PE4: P1→P2→PE4→virtual node, and the third path and PE1→P1 in the first path form a second path (backup path): PE1→P1→P2→PE4→virtual node. The second path does not pass through an Egress PE PE3. A BGP session is established between the Egress PE PE3 and the Ingress PE PE1. When PE3 and PE4 publish a VPN route, a same Router ID vNH1 of the virtual node is used as a BGP next hop of the VPN. For example, the VPN route published by PE3 may be VPN1: prefix1→L1, vNH1, that is, when PE1 receives a packet that belongs to VPN1, a label L1 is attached to the packet, and the packet is sent to CE2 through a primary path PE1→P1→PE3. If PE3 is faulty, a packet of VPN1 passing through PE3 is automatically switched to PE4, that is, switched to a backup path PE1→P1→P2→PE4 from PE1 to a first redundancy protection group.

A tunnel from PE2 to the virtual node is established, and the tunnel from PE2 to the virtual node includes a primary path and a backup path. PE2 calculates, by using the IGP, a fourth path (primary path) using PE2 as a start point and passing through PE4: PE2→P2→PE4→virtual node. A previous-hop node P2 of PE4 calculates, by using the IGP, a sixth path using P2 as a start point, not passing through PE4, but passing through PE3: P2→P1→PE3→virtual node, and the sixth path and PE2→P2 in the fourth path form a fifth path (backup path): PE2→P2→P1→PE3→virtual node. The fifth path does not pass through an Egress PE PE4. A BGP session is established between the Egress PE PE4 and the Ingress PE PE2, and correspondingly, a BGP session is also established between PE3 and PE2. When PE3 and PE4 publish a VPN route, a same Router ID vNH1 of the virtual node is used as a BGP next hop of the VPN. For example, the VPN route published by PE4 to PE2 may be VPN1: prefix1→L1, vNH1, that is, when PE2 receives a packet that belongs to VPN1, a label L1 is attached to the packet, and the packet is sent to CE2 through a primary path PE2→P2→PE4. If PE4 is faulty, a packet of VPN1 passing through PE4 is automatically switched to PE3, that is, switched to a backup path PE2→P2→P1→PE3 from PE3 to the redundancy protection group.

Embodiment 3

Figure 20:
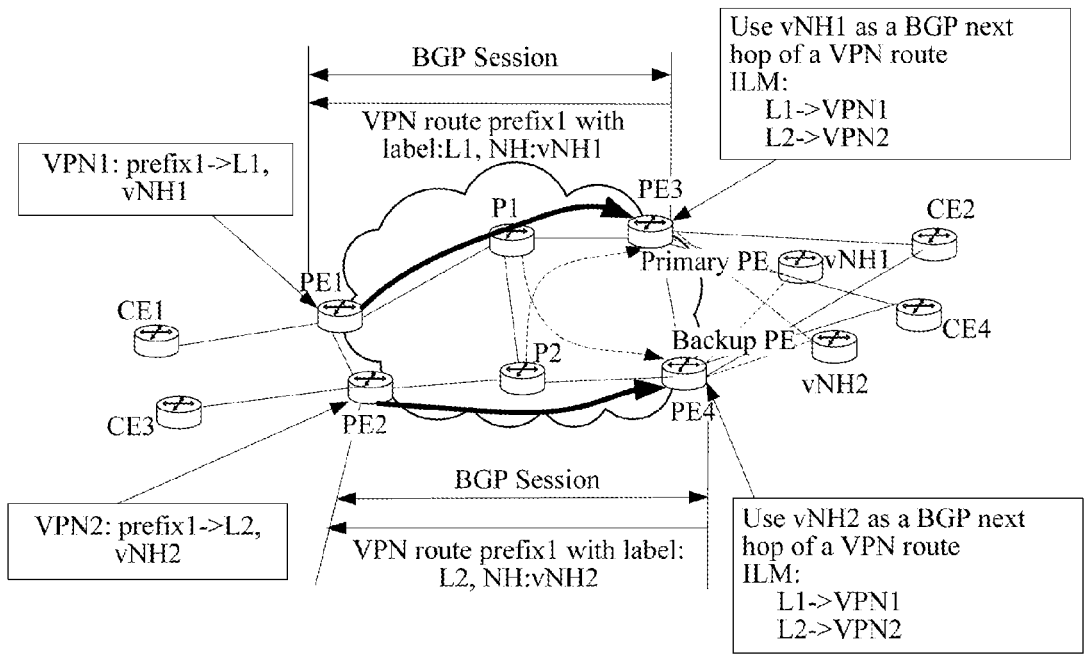

As shown in FIG. 20, a method of this embodiment of the present application is applied to an L3VPN, and PE1, PE2, PE3, PE4, P1, and P2 are all located in an MPLS network, where PE1, PE2, PE3, and PE4 are located at edges of the MPLS network. CE1 and CE2 belong to a VPN, such as VPN1. For a packet from CE1 to CE2, PE1 is an ingress node, and PE3 and PE4 are egress nodes. CE3 and CE4 belong to a VPN, such as VPN2. For a packet from CE3 to CE4, PE2 is an ingress node, and PE3 and PE4 are egress nodes. Two virtual nodes may be separately generated on PE3 and PE4: a first virtual node and a second virtual node, where a solid line denotes a primary path passing through a primary PE (Primary PE), and a dashed line denotes a backup path passing through a backup PE (Backup PE). Therefore, a part of a packet passing through an Ingress PE is transmitted by using the first virtual node, and another part of the packet passing through the Ingress PE is transmitted by using the second virtual node, so that traffic distribution may be relatively uniform.

It is assumed that on two virtual nodes are generated on PE3: a first virtual node and a second virtual node, where an address of the first virtual node (the virtual node 1) is vHN1, and an address of the second virtual node (virtual node 2) is vNH2. A first virtual node whose address is vNH1 and a second virtual node whose address is vNH2 are also generated on PE4. The vNH1 of the first virtual node and the vNH2 of the second virtual node may be determined by means of dynamic negotiation or static configuration, and for a method for dynamically negotiating vNH1 or vNH2, reference may be made to a method described in FIG. 4 and a corresponding paragraph, and reference may be also made to methods described in FIG. 5 to FIG. 11 and corresponding paragraphs.

If an MPLS tunnel is established by using the LDP, PE3 and PE4 may be set as follows: a cost value of a link from PE3 to the virtual node 1 is set to a relatively small value, so that a total cost value from any Ingress PE to the virtual node is less than a maximum cost value in the IGP, for example, the cost value of the link from PE3 to the virtual node 1 is set to 1, and a cost value of a link from PE4 to the virtual node 1 is set to the maximum cost value in the IGP. Alternatively, a cost value of a link from PE3 to the virtual node 2 may be also set to the maximum cost value in the IGP, and a cost value of a link from PE4 to the virtual node 2 may be also set to a relatively small value, so that a total cost value from any Ingress PE to the virtual node is less than the maximum cost value in the IGP, for example, the cost value of the link from PE4 to the virtual node 2 is set to 1. For a method for dynamically negotiating vNH2, reference may be made to a method described in FIG. 4 and a corresponding paragraph, and reference may be also made to methods described in FIGS. 5 to 11 and corresponding paragraphs.

By using vNH1 as a BGP next hop of a VPN1 route, a first redundancy protection group may be established, and the first redundancy protection group includes PE3 and PE4, where it may be assumed that PE3 is a primary PE (Primary PE), and PE4 is a backup PE (Backup PE). A tunnel from PE1 to the virtual node is established, and the tunnel from PE1 to the virtual node includes a primary path and a backup path. PE1 calculates, by using the IGP, a first path (primary path) using PE1 as a start point and passing through PE3: PE1→P1→PE3→virtual node. A previous-hop node P1 of PE3 calculates, by using the IGP, a third path using P1 as a start point, not passing through PE3, but passing through PE4: P1→P2→PE4→virtual node, and the third path and PE1→P1 in the first path form a second path (backup path): PE1→P1→P2→PE4→virtual node. The second path does not pass through an Egress PE PE3. A BGP session is established between the Egress PE PE3 and the Ingress PE PE1, and a BGP session is established between PE4 and PE1. When PE3 and PE4 publish a VPN1 route, a Router ID vNH1 of the virtual node is used as a BGP next hop of the VPN1. For example, the VPN1 route published by PE3 may be VPN1: prefix1→L1, vNH1, that is, when PE1 receives a packet that belongs to VPN1, a label L1 is attached to the packet, and the packet is sent to CE2 through PE1→P1→PE3. If PE3 is faulty, a packet of VPN1 passing through PE3 is automatically switched to PE4, a path is adjusted to PE1→P1→P2→PE4, and PE4 may identify that the label L1 carried in the packet corresponds to VPN1.

By using vNH2 as a BGP next hop of a VPN2 route, a second redundancy protection group may be established, and the second redundancy protection group includes PE3 and PE4, where it may be assumed that PE4 is a primary PE (Primary PE), and PE3 is a backup PE (Backup PE). A tunnel from PE2 to the virtual node is established, and the tunnel from PE2 to the virtual node includes a primary path and a backup path. PE2 calculates, by using the IGP, a fourth path (primary path) using PE2 as a start point and passing through PE4: PE2→P2→PE4→virtual node. A previous-hop node P2 of PE4 calculates, by using the IGP, a sixth path using P2 as a start point, not passing through PE4, but passing through PE3: P2→P1→PE3→virtual node, and the sixth path and PE2→P2 in the fourth path form a fifth path (backup path): PE2→P2→P1→PE3→virtual node. The fifth path does not pass through an Egress PE PE4. A BGP session is established between the Egress PE PE4 and the Ingress PE PE2, and a BGP session is established between PE3 and PE2. When PE3 and PE4 publish a VPN2 route, a Router ID vNH2 of the virtual node is used as a BGP next hop of the VPN2. For example, the VPN2 route published by PE4 to PE2 may be VPN2: prefix1→L2, vNH2, that is, when PE2 receives a packet that belongs to VPN2, a label L2 is attached to the packet, the packet is sent to CE2 through PE2→P2→PE4, and PE4 may identify that the label L2 carried in the packet corresponds to VPN2. If PE4 is faulty, a packet of VPN2 passing through PE4 is automatically switched to PE3, a path is adjusted to PE2→P2→P1→PE3, and PE3 may identify that the label L2 carried in the packet corresponds to VPN2.

After receiving the VPN route, PE1 and PE2 find a corresponding tunnel according to the vNH, a protection tunnel of the tunnel is calculated on the previous-hop node of the primary Egress PE, and the protection tunnel has a function of protecting the primary PE.

An Ingress PE is not concerned with which Egress PE in a PE protection pair is the primary PE, and which Egress PE is the backup PE. However, tunnels selected by different Ingress PEs may have different primary Egress PEs. Therefore, in this embodiment of the present application, a cost value of a link from an Egress PE to a virtual node may be set by using an automatic calculation method, a backup path is calculated by using LDP FRR based on IGP LFA, and for details, reference may be made to description in Embodiment 1. An LDP FRR algorithm based on MRT FRR or another algorithm may be also used. Traffic may be distributed to Egress PEs that are mutually protected.

Embodiment 4

A method of this embodiment of the present application may be applied to L2VPN or PWE3, and when Egress PEs that are mutually protected send an LDP mapping message, a TLV is carried in the LDP mapping message, and a value field of the TLV is a vNH. After receiving the LDP mapping message, an Ingress PE finds a corresponding tunnel by using the vNH in the TLV, and the tunnel has a function of protecting a primary PE.

If two ACs (attached circuit, which is a link through which a CE is connected to a PE) of a dual-homing CE are in a load balance mode, or the two ACs are both active, in tunnels to an Egress PE that are established by the Ingress PE, which Egress PE is a primary PE, and which PE is a backup PE may be random. Tunnels selected by different Ingress PEs may have different primary Egress PEs, and therefore, traffic may be distributed to Egress PEs that are mutually protected.

If two ACs of a CE on an Egress PE side are in a primary/backup operating mode, it is generally required that a primary Egress PE of a tunnel and a primary AC are kept consistent, for example, the AC uses a multi-chassis link aggregation group (MC-LAG).

Figure 21:
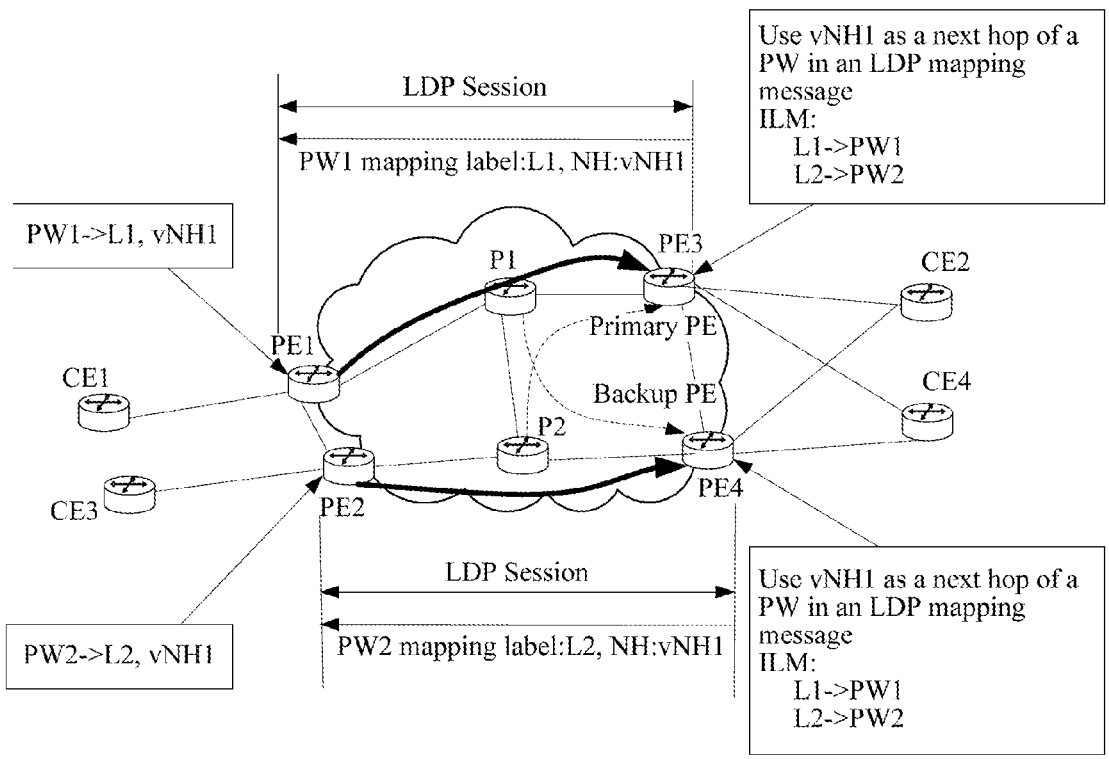
FIGS. 21 and 22 are separately schematic diagrams of two network architectures according to Embodiment 3 of the present application.

As shown in FIG. 21, a pseudo-wire PW is established between PE1 and PE3 by using the LDP, the LDP allocates a PW label in a downstream autonomous allocation manner, and an LDP session is established between PEs by using an extended Hello discovery mechanism. An LDP mapping message includes an FEC TLV, a label TLV and other optional parameters. The FEC TLV is used for distinguishing different PWs bound to PW labels. In this embodiment of the present application, a TLV may be carried in the LDP mapping message, and a value field of the TLV is a vNH. After receiving the LDP mapping message, an Ingress PE finds a corresponding tunnel by using the vNH in the TLV, and the tunnel has a function of protecting a primary PE.

In FIG. 21, PE1, PE2, PE3, PE4, P1, and P2 are all located in an MPLS network, where PE1, PE2, PE3, and PE4 are located at edges of the MPLS network. CE1 and CE2 belong to a VPN, such as VPN1, and CE3 and CE4 belong to a VPN, such as VPN2. For a packet from CE1 to CE2, PE1 is an ingress node, and PE3 and PE4 are egress nodes. For a packet from CE3 to CE4, PE2 is an ingress node, and PE3 and PE4 are egress nodes. When a layer-2 packet is transmitted on the MPLS network, an MPLS label is added to the packet on an ingress node, the packet is sent to an egress node through an MPLS LSP tunnel, and the egress node parses a next hop corresponding to the packet according to the label carried in the packet, detaches the label and then forwards the packet to a CE. CE1 sequentially passes through PE1→P1→PE3 and communicates with CE2, and CE3 sequentially passes through PE2→P2→PE4 and communicates with CE4. A virtual node is generated on PE3, and a Router ID of the virtual node is vNH1. A virtual node whose address is vNH1 is also generated on PE4. The vNH1 of the virtual node may be determined by means of dynamic negotiation or static configuration, and for a method for dynamically negotiating vNH1, reference may be made to a method described in FIG. 4 and a corresponding paragraph, and reference may be also made to methods described in FIG. 5 to FIG. 11 and corresponding paragraphs. A first redundancy protection group including PE3 and PE4 is established. It is assumed that PE3 in the first redundancy protection group is a primary PE (Primary PE), and PE4 is a backup PE (Backup PE). A tunnel from PE1 to the virtual node is established, and the tunnel from PE1 to the virtual node includes a primary path and a backup path. A first LDP session is established between the egress node PE3 and the ingress node PE1. PE3 publishes a first LDP mapping message to VPN1, that is, a VPN corresponding to CE2, and a Router ID vNH1 of the virtual node is used as a next hop of a PW label in the first LDP mapping message, that is, the PW label published by PE3 to VPN1 may be PW1→L1, vNH1. The PW label denotes that a pseudo-wire PW1 exists from PE1 to PE3, a label L1 is added to a packet transmitted by using the pseudo-wire PW1 on the ingress node PE1, and a destination node address of the packet is vNH1. After the label L1 is added to the packet on the ingress node PE1, the packet reaches PE3 through P1, and if PE3 determines according to a label mapping table of PE3 that the label L1 carried in the packet corresponds to the pseudo-wire PW1, the label L1 is detached, and the packet is sent to a next hop CE2 of PW1.

If PE3 is faulty, a packet of VPN1 passing through PE3 is automatically switched to PE4, a path is adjusted to PE1→P1→P2→PE4, and the packet of the VPN1 still uses the label L1. For a VPN service, the switching cannot be perceived, and because the switching is merely performed from a previous-hop node of the primary Egress PE (PE3) to the backup Egress PE (PE4), a primary tunnel passing through the primary Egress PE and reaching the virtual node and a backup tunnel passing through the backup Egress PE and reaching the virtual node are not switched from the viewpoint of an Ingress PE. A second LDP session is established between the egress node PE4 and the ingress node PE2. PE4 publishes a second LDP mapping message to VPN2, that is, a VPN corresponding to CE4, and a Router ID vNH1 of the virtual node is used as a next hop ILM of a PW label in the second LDP mapping message, that is, the PW label published by PE4 to VPN2 may be PW2→L2, vNH1. The PW label denotes that a pseudo-wire PW2 exists from PE2 to PE4, a label L2 is added to a packet transmitted by using the pseudo-wire PW2 on the ingress node PE2, and a destination node address of the packet is vNH1. After the label L2 is added to the packet on the ingress node PE2, the packet reaches PE4 through P2, and if PE4 determines according to a label mapping table of PE4 that the label L2 carried in the packet corresponds to the pseudo-wire PW2, the label L2 is detached, and the packet is sent to a next hop CE4 of PW2.

If PE4 is faulty, a packet of VPN2 passing through PE4 is automatically switched to PE3, a path is adjusted to PE2→P2→P1→PE3, and the packet of the VPN2 still uses the label L2. For a VPN service, the switching cannot be perceived, and because the switching is merely performed from a previous-hop node of the primary Egress PE (PE4) to the backup Egress PE (PE3), a primary tunnel passing through the primary Egress PE and reaching the virtual node and a backup tunnel passing through the backup Egress PE and reaching the virtual node are not switched from the viewpoint of an Ingress PE.

Figure 22:
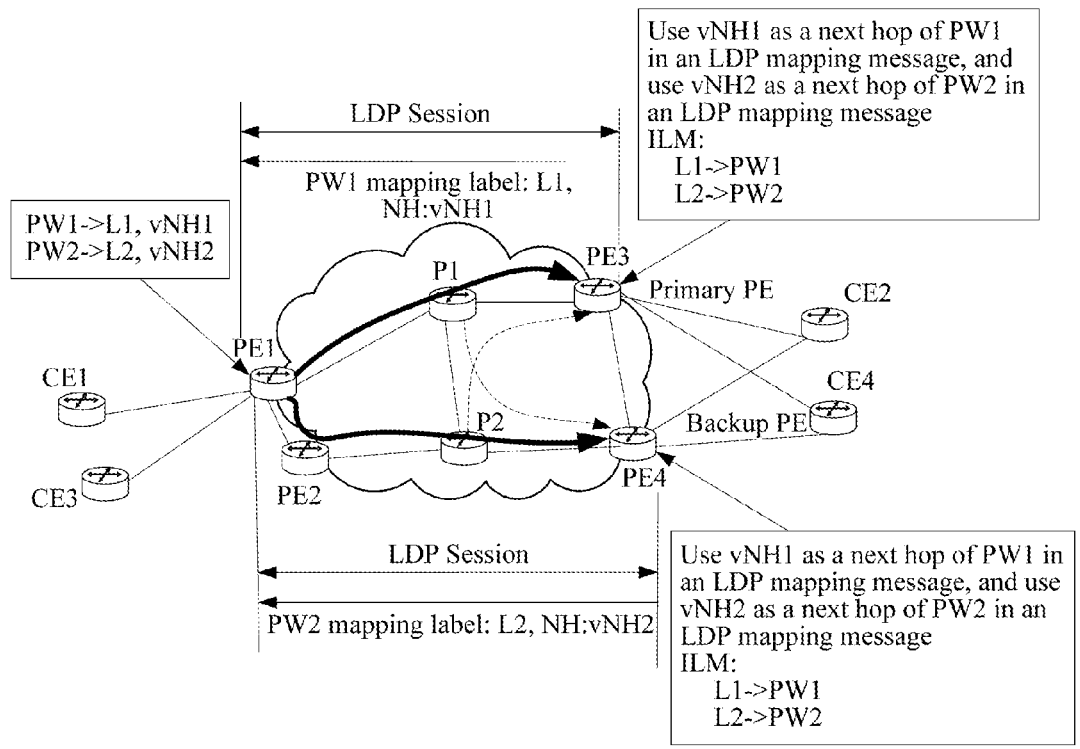

As shown in FIG. 22, two virtual nodes are used, some PWs use a virtual node 1, and some other PWs use a virtual node 2, so that traffic may be distributed relatively uniformly.

PE1, PE2, PE3, PE4, P1, and P2 are all located in an MPLS network, where PE1, PE2, PE3, and PE4 are located at edges of the MPLS network. CE1 and CE2 belong to a VPN, such as VPN1, and CE3 and CE4 belong to a VPN, such as VPN2. For a packet from CE1 to CE2, PE1 is an ingress node, and PE3 and PE4 are egress nodes. For a packet from CE3 to CE4, PE1 is an ingress node, and PE3 and PE4 are egress nodes. CE1 sequentially passes through PE1→P1→PE3 and communicates with CE2, and CE3 sequentially passes through PE1→PE2→P2→PE4 and communicates with CE4.

A virtual node 1 is generated on PE3, and an address of the virtual node 1 is vNH1. A virtual node whose address is vNH1 is also generated on PE4. The vNH1 of the virtual node may be determined by means of dynamic negotiation or static configuration, and for a method for dynamically negotiating vNH1, reference may be made to a method described in FIG. 4 and a corresponding paragraph, and reference may be also made to methods described in FIG. 5 to FIG. 11 and corresponding paragraphs. A first redundancy protection group including PE3 and PE4 is established. It is assumed that PE3 in the first redundancy protection group is a primary PE (Primary PE), and PE4 is a backup PE (Backup PE). A tunnel from PE1 to the virtual node is established, and the tunnel from PE1 to the virtual node includes a primary path and a backup path.

A first LDP session is established between the egress node PE3 and the ingress node PE1. PE3 publishes a first LDP mapping message to VPN1, that is, a VPN corresponding to CE2, and an address vNH1 of the virtual node is used as a next hop of a PW label in the first LDP mapping message, that is, the PW label published by PE3 to VPN1 may be PW1→L1, vNH1. The PW label denotes that a pseudo-wire PW1 exists from PE1 to PE3, a label L1 is added to a packet transmitted by using the pseudo-wire PW1 on the ingress node PE1, and a destination node address of the packet is vNH1. After the label L1 is added to the packet on the ingress node PE1, the packet reaches PE3 through P1, and if PE3 determines according to a label mapping table of PE3 that the label L1 carried in the packet corresponds to the pseudo-wire PW1, the label L1 is detached, and the packet is sent to a next hop CE2 of PW1.

If PE3 is faulty, a packet of VPN1 passing through PE3 is automatically switched to PE4, a path is adjusted to PE1→P1→P2→PE4, and the packet of the VPN1 still uses the label L1. For a VPN service, the switching cannot be perceived, and because the switching is merely performed from a previous-hop node of the primary Egress PE (PE3) to the backup Egress PE (PE4), a primary tunnel passing through the primary Egress PE and reaching the virtual node 1 and a backup tunnel passing through the backup Egress PE and reaching the virtual node 1 are not switched from the viewpoint of an Ingress PE.

For PE3 and PE4, a second redundancy protection group may be further established and corresponding virtual nodes 2 may be further generated. A virtual node 2 is generated on PE3, and an address of the virtual node 2 is vNH2. A virtual node 2 whose address is vNH2 is also generated on PE4. The vNH2 of the virtual node 2 may be determined by means of dynamic negotiation or static configuration, and for a method for dynamically negotiating vNH2, reference may be made to a method described in FIG. 4 and a corresponding paragraph, and reference may be also made to methods described in FIG. 5 to FIG. 11 and corresponding paragraphs. It is assumed that PE4 in the second redundancy protection group is a primary PE (Primary PE), and PE3 is a backup PE (Backup PE). A second LDP session is established between the egress node PE4 and the ingress node PE1. PE4 publishes a second LDP mapping message to VPN2, that is, a VPN corresponding to CE4, and an address vNH2 of the virtual node 2 is used as a next hop ILM of a PW label in the second LDP mapping message, that is, the PW label published by PE4 to VPN2 may be PW2→L2, vNH2. The PW label denotes that a pseudo-wire PW2 exists from PE1 to PE4, a label L2 is added to a packet transmitted by using the pseudo-wire PW2 on the ingress node PE1, and a destination node address of the packet is vNH2. After the label L2 is added to the packet on the ingress node PE1, the packet reaches PE4 through PE2→P2, and if PE4 determines according to a label mapping table of PE4 that the label L2 carried in the packet corresponds to the pseudowire PW2, the label L2 is detached, and the packet is sent to a next hop CE4 of PW2.

If PE4 is faulty, a packet of VPN2 passing through PE4 is automatically switched to PE3, a path is adjusted to PE1→PE2→P2→P1→PE3, and the packet of the VPN2 still uses the label L2. For a VPN service, the switching cannot be perceived, and because the switching is merely performed from a previous-hop node of the primary Egress PE (PE4) to the backup Egress PE (PE3), a primary tunnel passing through the primary Egress PE and reaching the virtual node and a backup tunnel passing through the backup Egress PE and reaching the virtual node are not switched from the viewpoint of an Ingress PE.

Embodiment 5

This embodiment of the present application further provides a network system, where the network system includes a first egress provider edge device Egress PE, a second Egress PE and an ingress provider edge device Ingress PE, the first Egress PE communicates with a customer edge device CE, the second Egress PE communicates with the CE, and the first Egress PE and the second Egress PE are located in a redundancy protection group including the first Egress PE and the second Egress PE, where the first Egress PE is a primary device, and the second Egress PE is a backup device. As shown in FIG. 3, the first Egress PE is PE3, the second Egress PE is PE4, and CE2 separately communicates with PE3 and PE4.

Figure 23:
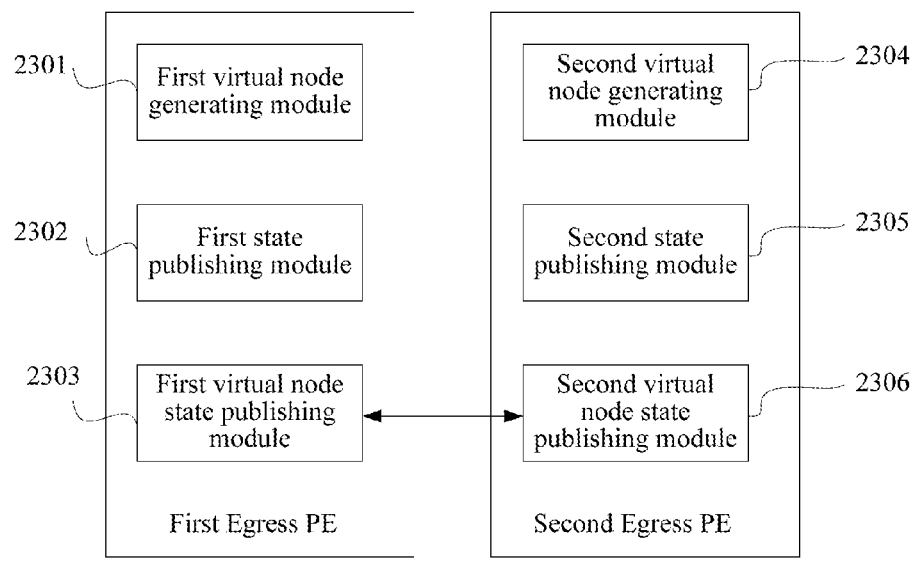
FIG. 23 is a schematic diagram of a network structure according to Embodiment 4 of the present application.

As shown in FIG. 23, the first Egress PE includes: a first virtual node generating module 2301, a first state publishing module 2302, and a first virtual node state publishing module 2303.

The first virtual node generating module 2301 is configured to generate a virtual node on the first Egress PE, where the virtual node has a global unique Router ID in the network system, the virtual node is used as a next hop node of the first Egress PE, and the virtual node is used as a next hop node of the second Egress PE.

The first state publishing module 2302 is configured to send a first link state message to the Ingress PE, where the first link state message includes: a Router ID of the first Egress PE and state information of a link from the first Egress PE to the virtual node, and the state information of the link from the first Egress PE to the virtual node includes a cost value M of the link from the first Egress PE to the virtual node and the Router ID of the virtual node.

The first virtual node state publishing module 2303 is configured to send a second link state message to the Ingress PE, where the second link state message includes: the Router ID of the virtual node, state information of a link from the virtual node to the first Egress PE and state information of a link from the virtual node to the second Egress PE, the state information of the link from the virtual node to the first Egress PE includes a cost value N of the link from the virtual node to the first Egress PE and the Router ID of the first Egress PE, and the state information of the link from the virtual node to the second Egress PE includes a cost value T of the link from the virtual node to the second Egress PE and a Router ID of the second Egress PE. N and T are maximum cost values in an Interior Gateway Protocol IGP.

The second Egress PE includes: a second virtual node generating module 2304, a second state publishing module 2305, and a second virtual node state publishing module 2306.

The second virtual node generating module 2304 is configured to generate, on the second Egress PE, the virtual node generated on the first Egress PE.

The second state publishing module 2305 is configured to send a third link state message to the Ingress PE, where the third link state message includes: a Router ID of the second Egress PE and state information of a link from the second Egress PE to the virtual node, and the state information of the link from the second Egress PE to the virtual node includes a cost value S of the link from the second Egress PE to the virtual node and the Router ID of the virtual node.

The second virtual node state publishing module 2306 is configured to send a fourth link state message to the Ingress PE, where the fourth link state message includes: the Router ID of the virtual node, state information of a link from the virtual node to the first Egress PE and state information of a link from the virtual node to the second Egress PE, the state information of the link from the virtual node to the first Egress PE includes a cost value N of the link from the virtual node to the first Egress PE and the Router ID of the first Egress PE, and the state information of the link from the virtual node to the second Egress PE includes a cost value T of the link from the virtual node to the second Egress PE and a Router ID of the second Egress PE. N and T are maximum cost values in an Interior Gateway Protocol IGP.

After receiving the first link state message, the second link state message, the third link state message and the fourth link state message, the Ingress PE (such as PE1) obtains a vNH of the virtual node, the cost value M of the link from the first Egress PE to the virtual node and the cost value S of the link from the second Egress PE to the virtual node.

According to different tunnel types used in the network, any one of the first link state message, the second link state message, the third link state message and the fourth link state message may further include other attributes, for example, for an MPLS TE tunnel, the any one further includes one or more of a bandwidth, an affinity, a color and the like.

The cost values of the links are set by using multiple methods, for example, for the MPLS TE tunnel using an explicit route, the cost values S and M of the link may be set to any valid cost value in the IGP. The cost values S and M of the link may be also statically configured.

At least one of the first Egress PE and the second Egress PE determines the cost value M of the link from the first Egress PE to the virtual node and the cost value S of the link from the second Egress PE to the virtual node according to a manner (1) or (2), and synchronizes the determined cost value M of the link from the first Egress PE to the virtual node and the determined cost value S of the link from the second Egress PE to the virtual node to the redundancy protection group in which the first Egress PE and the second Egress PE are located:

(1) S and M satisfy:

$$\begin{cases} S_{xy4} + S > S_{xy3} + M \text{ and} \\ C_{34} + S > M \end{cases}$$

where Px is any neighboring node of the first Egress PE, Pxy is any neighboring node of Px in a network excluding the first Egress PE, Sxy3 is a cost value of a shortest path from Pxy to the first Egress PE, Sxy4 is a cost value of a shortest path from Pxy to the second Egress PE, and C34 is a cost value of a shortest path from the first Egress PE to the second Egress PE.

(2) S and M satisfy:

$$X+M<Y+S\square$$

where X is a cost value of a shortest path from the Ingress PE to the first Egress PE, and Y is a cost value of a shortest path from the Ingress PE to the second Egress PE.

In manner (1), S and M that satisfy both the inequality ☐ and the inequality ☐ are solved, that is, an M–S pair satisfying both the inequality ☐ and the inequality ☐ is solved.

For calculation on a cost value of a link from an Egress PE to a virtual node, each Egress PE in the redundancy protection group may calculate an M–S pair satisfying the inequality ☐ and the inequality ☐, that is, PE3 in the redundancy protection group may calculate an M–S pair satisfying the inequality ☐ and the inequality ☐, and PE4 in the redundancy protection group may also calculate an M–S pair satisfying the inequality ☐ and the inequality ☐.

If multiple Egress PEs in the redundancy protection group calculate different M–S pairs, the multiple Egress PEs may determine M and S finally deployed on all Egress PEs of the redundancy protection group by means of negotiation between each other.

Optionally, if multiple M–S pairs satisfying conditions are obtained according to manner (1) or (2), an M–S pair whose S is minimum or an M–S pair whose M is minimum is selected, and the selected M–S pair is synchronized to all the Egress PE of the redundancy protection group. M in the selected M–S pair is carried in the first link state information, and S in the selected M–S pair is carried in the third link state information.

Optionally, an M–S pair may be determined on any Egress PE in the redundancy protection group according to manner (1) or manner (2), and the determined M–S pair is synchronized to another Egress PE in the redundancy protection group. Optionally, the synchronizing the determined M–S pair to another Egress PE in the redundancy protection group may be implemented by using a synchronization protocol.

Optionally, M and S may be also configured on all the Egress PEs of the redundancy protection group directly according to manner (2). For example, M may be set to 1, and S is set to a maximum value of cost values in the IGP protocol.

Optionally, M and S may be further calculated according to manner (1) or (2) on multiple Egress PEs of the redundancy protection group. If multiple M–S pairs satisfying the conditions are obtained according to manner (1) or (2), an M–S pair whose S is minimum or an M–S pair whose M is minimum is selected. Certainly, an M–S pair satisfying the inequalities ☐ and ☐ may be also selected randomly. M in the selected M–S pair is carried in the first link state information, and S in the selected M–S pair is carried in the third link state information.

When an Open Shortest Path First (OSPF) protocol is run between devices in the network, after a virtual node is generated on PE3, both a link state and a neighbor relationship of PE3 change, and therefore PE3 updates its own link state and neighbor relationship, constructs a first link state advertisement (LSA), and floods the first LSA into the entire network, where the first LSA includes: a Router ID of PE3 and state information of a link from PE3 to the virtual node, and the state information of the link from PE3 to the virtual node includes a cost value of the link from PE3 to the virtual node and the Router ID of the virtual node. Because the virtual node is generated on PE3, PE3 further "represents" the virtual node to construct a second LSA, and floods the second LSA into the entire network. The second LSA includes: the Router ID of the virtual node, state information of a link from the virtual node to PE3 and link state information of a link from the virtual node to PE4. The state information of the link from the virtual node to PE3 includes a cost value of the link from the virtual node to PE3 and a Router ID of PE3, and the state information of the link from the virtual node to PE4 includes a cost value of the link from the virtual node to PE4 and a Router ID of PE4. Similarly, other Egress PEs in the redundancy protection group also construct corresponding LSAs and flood these LSAs into an entire OSPF field, where the OSPF field may be the entire network. For example, after the virtual node is generated on PE4, both a link state and a neighbor relationship of PE4 change, and therefore PE4 updates its own link state and neighbor relationship, constructs a third LSA, and floods the third LSA into the entire network. The third LSA includes: a Router ID of PE4 and state information of a link from PE4 to the virtual node, and the state information of the link from PE4 to the virtual node includes a cost value of the link from PE4 to the virtual node and the Router ID of the virtual node. Because the virtual node is generated on PE4, PE4 further "represents" the virtual node to construct a fourth LSA, and floods the fourth LSA into the entire network, where the fourth LSA includes: the Router ID of the virtual node, state information of a link from the virtual node to PE3 and state information of a link from the virtual node to PE4. The state information of the link from the virtual node to PE3 includes a cost value of the link from the virtual node to PE3 and a Router ID of PE3, and the state information of the link from the virtual node to PE4 includes a cost value of the link from the virtual node to PE4 and a Router ID of PE4. PE3 and PE4 flood these LSAs into the OSPF field. In this way, another node located in the same OSPF field as PE3 and PE4, such as PE1, can "see" the virtual node, the link between the virtual node and PE3, and the link between the virtual node and PE4, and therefore a tunnel from PE1 to a vNH of the virtual node can be established. The link state is description information on an OSPF interface of a router, such as an IP address on the interface, a subnet mask, a network type, and a cost value. OSPF routers exchange link states rather than routing tables between each other, and an OSPF router (such as PE1) calculates a precise network path reaching each target by obtaining all link state information in the network.

When an Intermediate System to Intermediate System (ISIS) protocol is run between PE3 and PE4, after a virtual node is generated on PE3, both a link state and a neighbor relationship of PE3 change, and therefore PE3 updates its own link state and neighbor relationship, constructs a first link state packet LSP (Link-state PDU), and floods the first LSP into the entire network, where the first LSP includes: a Router ID of PE3 and state information of a link from PE3 to the virtual node, and the state information of the link from PE3 to the virtual node includes a cost value of the link from PE3 to the virtual node and the Router ID of the virtual node. Because the virtual node is generated on PE3, PE3 further "represents" the virtual node to construct a second LSP, and floods the second LSP into the entire network, where the second LSP includes: the Router ID of the virtual node, state information of a link from the virtual node to PE3 and link state information of a link from the virtual node to PE4. The state information of the link from the virtual node to PE3 includes a cost value of the link from the virtual node to PE3 and a Router ID of PE3, and the state information of the link from the virtual node to PE4 includes a cost value of the link from the virtual node to PE4 and a Router ID of PE4.

Similarly, other Egress PEs in the redundancy protection group, for example, also construct corresponding LSPs and flood these LSPs into an entire ISIS field, where the ISIS field may be the entire network. For example, after the virtual node is generated on PE4, both a link state and a neighbor relationship of PE4 change, and therefore PE4 updates its own link state and neighbor relationship, constructs a third LSP, and floods the third LSP into the entire network, where the third LSP includes: a Router ID of PE4 and state information of a link from PE4 to the virtual node, and the state information of the link from PE4 to the virtual node includes a cost value of the link from PE4 to the virtual node and the Router ID of the virtual node. Because the virtual node is generated on PE4, PE4 further "represents" the virtual node to construct a fourth LSP, and floods the fourth LSP into the entire network, where the fourth LSP includes: the Router ID of the virtual node, state information of a link from the virtual node to PE3 and state information of a link from the virtual node to PE4. The state information of the link from the virtual node to PE3 includes a cost value of the link from the virtual node to PE3 and a Router ID of PE3, and the state information of the link from the virtual node to PE4 includes a cost value of the link from the virtual node to PE4 and a Router ID of PE4. PE3 and PE4 flood these LSPs into the ISIS field. In this way, another node located in the same ISIS field as PE3 and PE4, such as PE1, can "see" the virtual node, the link between the virtual node and PE3, and the link between the virtual node and PE4, and therefore a tunnel from PE1 to a vNH of the virtual node can be established.

An attribute value (cost value) of a link between the generated virtual node and an Egress PE in the redundancy protection group may be automatically set or manually set according to a situation. For example, if it is intended that PE3 becomes a node through which a primary path of a tunnel passes, and that PE4 becomes a node through which a backup path of the tunnel passes, a cost value of the link from PE3 to the virtual node may be set to 1, and a cost value of the link from PE4 to the virtual node may be set to a maximum cost value in the IGP. According to different IGPs run between PE3 and PE4, a different maximum cost value of a link may be set, for example, when OSPF is run in the network, a maximum cost value of a link may be set to 65535. To disable the virtual node to undertake transit traffic, both the cost value of the link from the virtual node to PE3 and the cost value of the link from the virtual node to PE4 may be set to a maximum cost value in the IGP. To avoid the transit traffic, the virtual node needs to be configured to be in an overload mode. In the OSPF protocol, implementation may be performed by setting the cost value of the link from the virtual node to the Egress PE node PE3 and the cost value of the link from the virtual node to PE4 to the maximum cost value in the IGP. In the ISIS protocol, implementation may be performed by setting overload bit bits of the second LSP and the fourth LSP to 1. In the IGP, a physical link is generally bidirectional, links described in the IGP are all directional, and each direction needs to be described individually. Cost values of a physical link in different directions may be different, or may be the same.

The virtual node does not truly exist physically, and is generated only for a purpose that another node in the IGP domain can calculate a tunnel passing through PE3. An upstream node P1 of PE3 can calculate another backup tunnel reaching PE4, such as PE1→P1→P2→PE4, and the backup tunnel does not pass through PE3. In this way, when PE3 is faulty, traffic can be switched to the backup tunnel by using P1 to reach PE4, thereby achieving an objective of protecting PE3.

Because PE3 and PE4 is symmetrical, a primary tunnel passing through PE4 may be also established, and a backup tunnel passing through PE3 but not passing through PE4 is established on a previous-hop node (such as P2 in FIG. 3) of PE4, such as PE1→P2→P1→PE3, and when PE4 is faulty, traffic is switched to the backup tunnel on P2, thereby achieving an objective of protecting PE4.

Figure 24:
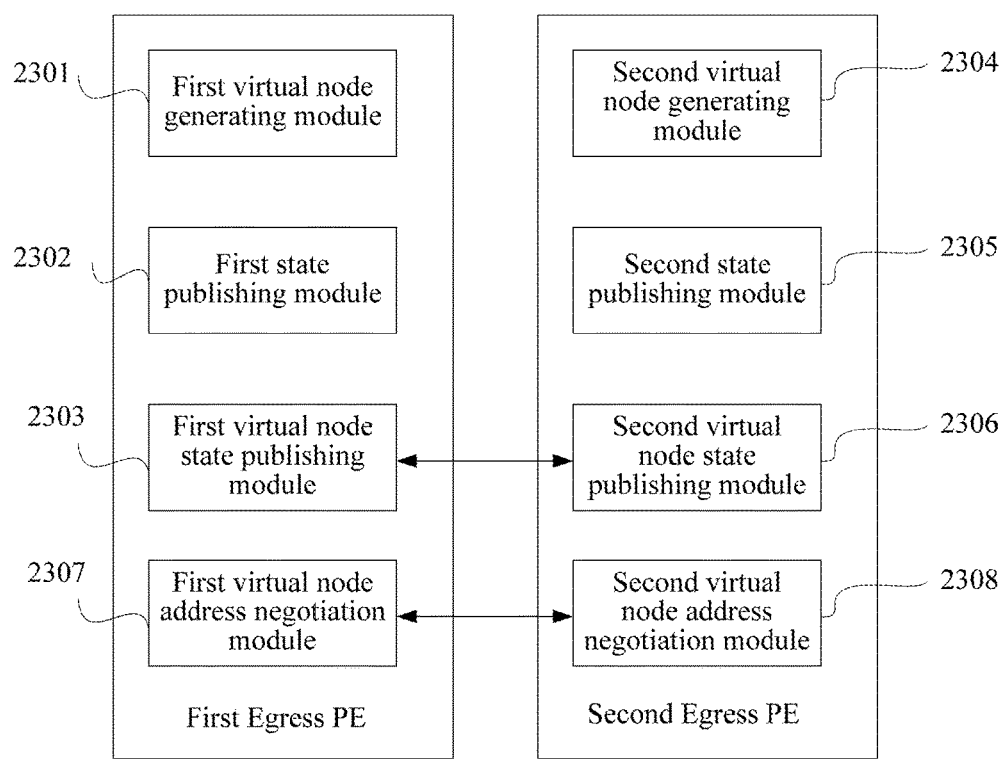
FIG. 24 is a schematic diagram of another network structure according to an embodiment of the present application.

Optionally, as shown in FIG. 24, the first Egress PE may further include a first virtual node address negotiation module 2307, configured to negotiate with the second Egress PE to determine a same Router ID of the virtual node. Correspondingly, the second Egress PE may further include a second virtual node address negotiation module 2308, configured to negotiate with the virtual node address negotiation module 2307 of the first Egress PE to determine a same Router ID of the virtual node. For details of a method for negotiating a vNH of a virtual node, reference may be made to FIG. 4 and a paragraph corresponding to FIG. 4, and reference may be also made to FIG. 5 to FIG. 10 and paragraphs corresponding to FIG. 5 to FIG. 10.

Figure 25:
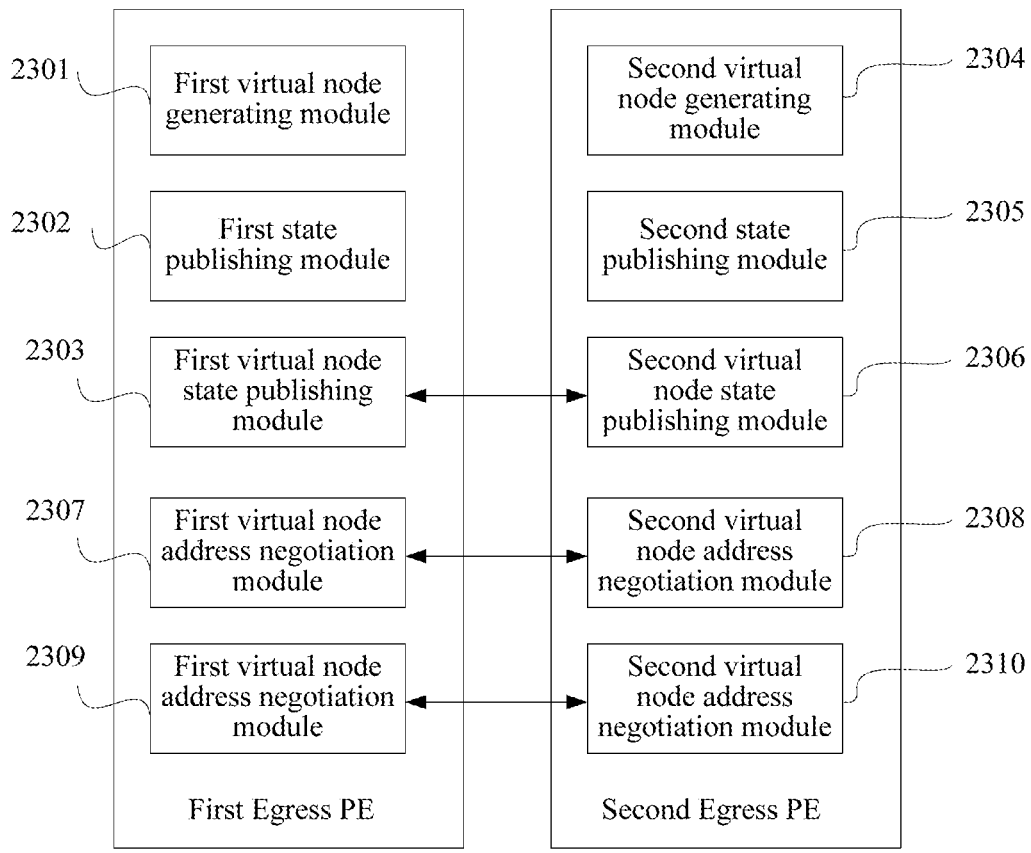
FIG. 25 is a schematic diagram of another network structure according to an embodiment of the present application.

Optionally, as shown in FIG. 25, the first Egress PE may further include a first label negotiation module 2309, configured to negotiate with the second Egress PE to determine a same label. Correspondingly, the second Egress PE may further include a second label negotiation module 2310, configured to negotiate with the first Egress PE to determine a same label. For details of a method for determining a same label by means of negotiation, reference may be made to FIG. 12 to FIG. 17 and paragraphs corresponding to FIG. 12 to FIG. 17.

Optionally, the network system may further include a third Egress PE, where the third Egress PE is located in the redundancy protection group including the first Egress PE and the second Egress PE, and the third Egress PE is used as a backup device. The first Egress PE, the second Egress PE and the third Egress PE may determine the vNH of the virtual node by means of static configuration or dynamic negotiation between each other, and for a method for dynamically negotiating a vNH, reference may be made to FIG. 4 and a paragraph corresponding to FIG. 4, and reference may be also made to FIG. 5 to FIG. 10 and paragraphs corresponding to FIG. 5 to FIG. 10. The first Egress PE, the second Egress PE and the third Egress PE may determine by means of dynamic negotiation between each other to allocate a same label. For details of a method for determining a same label by means of negotiation, reference may be made to FIG. 12 to FIG. 17 and paragraphs corresponding to FIG. 12 to FIG. 17.

Optionally, each module in this embodiment of the present application may be implemented by using corresponding hardware.

The network system, the first Egress PE, and the second Egress PE may be applied to an L2VPN or an L3VPN.

Embodiment 6

This embodiment of the present application further provides another network system, where the network system includes a first PE device, a second PE device and an Ingress PE, the first PE device and the second PE device are used as Egress PEs, the first PE device communicates with a customer edge device CE, and the second PE device communicates with the CE. The first PE device and the second PE device are located in a redundancy protection group including the first PE device and the second PE device, where the first PE device is a primary device, and the second PE device is a backup device. The first PE device is configured to:

generate a virtual node, where the virtual node has a global unique Router ID in the network system, the virtual node is used as a next hop node of the first PE device, and the virtual node is used as a next hop node of the second PE device;

send a first link state message to the Ingress PE, where the first link state message includes: a Router ID of the first PE device and state information of a link from the first PE device to the virtual node, and the state information of the link from the first PE device to the virtual node includes a cost value M of the link from the first PE device to the virtual node and the Router ID of the virtual node; and send a second link state message to the Ingress PE, where the second link state message includes: the Router ID of the virtual node, state information of a link from the virtual node to the first PE device and state information of a link from the virtual node to the second PE device, the state information of the link from the virtual node to the first PE includes a cost value N of the link from the virtual node to the first PE device and the Router ID of the first PE device, and the state information of the link from the virtual node to the second PE includes a cost value T of the link from the virtual node to the second PE device and a Router ID of the second PE device; and the second PE device is configured to:

generate the virtual node;

send a third link state message to the Ingress PE, where the third link state message includes: the Router ID of the second PE device and state information of a link from the second PE device to the virtual node, and the state information of the link from the second PE device to the virtual node includes a cost value S of the link from the second PE device to the virtual node and the Router ID of the virtual node; and send a fourth link state message to the Ingress PE, where the fourth link state message includes: the Router ID of the virtual node, the state information of the link from the virtual node to the first PE device and the state information of the link from the virtual node to the second PE device, the state information of the link from the virtual node to the first PE device includes the cost value N of the link from the virtual node to the first PE device and the Router ID of the first PE device, and the state information of the link from the virtual node to the second Egress PE includes the cost value T of the link from the virtual node to the second PE device and the Router ID of the second PE device;

the first PE device is further configured to allocate a first label to a first forwarding equivalence class of a first virtual private network VPN, and send the first label to the Ingress PE; and the second PE device is further configured to allocate the first label to the first forwarding equivalence class of the first VPN, and send the first label to the Ingress PE.

When an Open Shortest Path First (OSPF) protocol is run between devices in the network, after a virtual node is generated on the first PE device, both a link state and a neighbor relationship of the first PE device change, and therefore the first PE device updates its own link state and neighbor relationship, constructs a first link state advertisement LSA (LSA), and floods the first LSA into the entire network, where the first LSA includes: a Router ID of the first PE device and state information of a link from the first PE device to the virtual node, and the state information of the link from the first PE device to the virtual node includes a cost value of the link from the first PE device to the virtual node and the Router ID of the virtual node. Because the virtual node is generated on the first PE device, the first PE device further "represents" the virtual node to construct a second LSA, and floods the second LSA into the entire network. The second LSA includes: the Router ID of the virtual node, state information of a link from the virtual node to the first PE device and link state information of a link from the virtual node to the second PE device. The state information of the link from the virtual node to the first PE device includes a cost value of the link from the virtual node to the first PE device and a Router ID of the first PE device, and the state information of the link from the virtual node to the second PE device includes a cost value of the link from the virtual node to the second PE device and a Router ID of the second PE device. Similarly, other Egress PEs in the redundancy protection group also construct corresponding LSAs and flood these LSAs into an entire OSPF field, where the OSPF field may be the entire network. For example, after the virtual node is generated on the second PE device, both a link state and a neighbor relationship of the second PE device change, and therefore the second PE device updates its own link state and neighbor relationship, constructs a third LSA, and floods the third LSA into the entire network. The third LSA includes: a Router ID of the second PE device and state information of a link from the second PE device to the virtual node, and the state information of the link from the second PE device to the virtual node includes a cost value of the link from the second PE device to the virtual node and the Router ID of the virtual node. Because the virtual node is generated on the second PE device, the second PE device further "represents" the virtual node to construct a fourth LSA, and floods the fourth LSA into the entire network. The fourth LSA includes: the Router ID of the virtual node, state information of a link from the virtual node to the first PE device and state information of a link from the virtual node to the second PE device. The state information of the link from the virtual node to the first PE device includes a cost value of the link from the virtual node to the first PE device and a Router ID of the first PE device, and the state information of the link from the virtual node to the second PE device includes a cost value of the link from the virtual node to the second PE device and a Router ID of the second PE device. The first PE device and the second PE device flood these LSAs into the OSPF field. In this way, another node located in the same OSPF field as the first PE device and the second PE device, such as PE1, can "see" the virtual node, the link between the virtual node and the first PE device, and the link between the virtual node and the second PE device, and therefore a tunnel from PE1 to a vNH of the virtual node can be established. The link state is description information on an OSPF interface of a router, such as an IP address on the interface, a subnet mask, a network type, and a cost value. OSPF routers exchange link states rather than routing tables between each other, and an OSPF router (such as PE1) calculates a precise network path reaching each target by obtaining all link state information in the network.

When an Intermediate System to Intermediate System (ISIS) protocol is run between the first PE device and the second PE device, after a virtual node is generated on PE3, both a link state and a neighbor relationship of the first PE device change, and therefore the first PE device updates its own link state and neighbor relationship, constructs a first link state packet LSP (Link-state PDU), and floods the first LSP into the entire network, where the first LSP includes: a Router ID of the first PE device and state information of a link from the first PE device to the virtual node, and the state information of the link from the first PE device to the virtual node includes a cost value of the link from the first PE device to the virtual node and the Router ID of the virtual node. Because the virtual node is generated on the first PE device, the first PE device further "represents" the virtual node to construct a second LSP, and floods the second LSP into the entire network. The second LSP includes: the Router ID of the virtual node, state information of a link from the virtual node to the first PE device and link state information of a link from the virtual node to the second PE device. The state information of the link from the virtual node to the first PE device includes a cost value of the link from the virtual node to the first PE device and a Router ID of the first PE device, and the state information of the link from the virtual node to the second PE device includes a cost value of the link from the virtual node to the second PE device and a Router ID of the second PE device. Similarly, other Egress PEs in the redundancy protection group, for example, also construct corresponding LSPs and flood these LSPs into an entire ISIS field, where the ISIS field may be the entire network. For example, after the virtual node is generated on the second PE device, both a link state and a neighbor relationship of the second PE device change, and therefore the second PE device updates its own link state and neighbor relationship, constructs a third LSP, and floods the third LSP into the entire network. The third LSP includes: a Router ID of the second PE device and state information of a link from the second PE device to the virtual node, and the state information of the link from the second PE device to the virtual node includes a cost value of the link from the second PE device to the virtual node and the Router ID of the virtual node. Because the virtual node is generated on the second PE device, the second PE device further "represents" the virtual node to construct a fourth LSP, and floods the fourth LSP into the entire network. The fourth LSP includes: the Router ID of the virtual node, state information of a link from the virtual node to the first PE device and state information of a link from the virtual node to the second PE device. The state information of the link from the virtual node to the first PE device includes a cost value of the link from the virtual node to the first PE device and a Router ID of the first PE device, and the state information of the link from the virtual node to the second PE device includes a cost value of the link from the virtual node to the second PE device and a Router ID of the second PE device. The first PE device and the second PE device flood these LSPs into the ISIS field. In this way, another node located in the same ISIS field as the first PE device and the second PE device, such as PE1, can "see" the virtual node, the link between the virtual node and the first PE device, and the link between the virtual node and the second PE device, and therefore a tunnel from PE1 to a vNH of the virtual node can be established.

An attribute value (cost value) of a link between the generated virtual node and an Egress PE in the redundancy protection group may be automatically set or manually set according to a situation. For example, if it is intended that the first PE device becomes a node through which a primary path of a tunnel passes, and that the second PE device becomes a node through which a backup path of the tunnel passes, a cost value of the link from the first PE device to the virtual node may be set to 1, and a cost value of the link from PE4 to the virtual node may be set to a maximum cost value in the IGP. According to different IGPs run between the first PE device and the second PE device, a different maximum cost value of a link may be set, for example, when OSPF is run in the network, a maximum cost value of a link may be set to 65535. To disable the virtual node to undertake transit traffic, both the cost value of the link from the virtual node to the first PE device and the cost value of the link from the virtual node to the second PE device may be set to a maximum cost value in the IGP. To avoid the transit traffic, the virtual node needs to be configured to be in an overload mode. In the OSPF protocol, implementation may be performed by setting the cost value of the link from the virtual node to the first PE device and the cost value of the link from the virtual node to the second PE device to the maximum cost value in the IGP. In the ISIS protocol, implementation may be performed by setting overload bit bits of the second LSP and the fourth LSP to 1. In the IGP, a physical link is generally bidirectional, links described in the IGP are all directional, and each direction needs to be described individually. Cost values of a physical link in different directions may be different, or may be the same.

Optionally, the first PE device may further include a first virtual node address negotiation module, configured to negotiate with the second PE device to determine a same Router ID of the virtual node. Correspondingly, the second PE device may further include a second virtual node address negotiation module, configured to negotiate with the virtual node address negotiation module of the first PE device to determine a same Router ID of the virtual node. For details of a method for negotiating a Router ID of a virtual node, reference may be made to FIG. 4 and a paragraph corresponding to FIG. 4, and reference may be also made to FIG. 5 to FIG. 10 and paragraphs corresponding to FIG. 5 to FIG. 10.

Optionally, the first PE device may further include a first label negotiation module, configured to negotiate with the second PE device to determine a same label. Correspondingly, the second PE device may further include a second label negotiation module, configured to negotiate with the first PE device to determine a same label. For details of a method for determining a same label by means of negotiation, reference may be made to FIG. 12 to FIG. 17 and paragraphs corresponding to FIG. 12 to FIG. 17.

Embodiment 7

Figure 26:
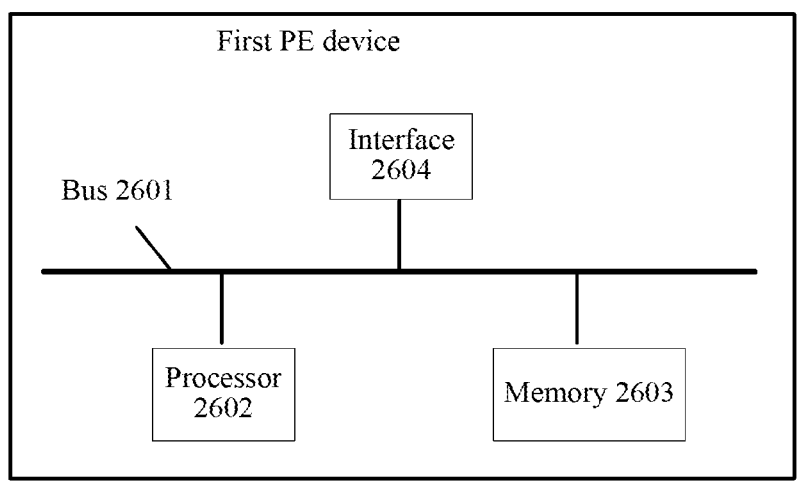
FIG. 26 is a schematic structural diagram of a first PE device according to an embodiment of the present application.

This embodiment of the present application further provides another network system, where the network system includes a first PE device and a second PE device, and the first PE device and the second PE device are used as Egress PEs, and separately communicate with a customer edge device CE. The network system further includes a third PE device that is used as an Ingress PE. The first PE device and the second PE device are located in a redundancy protection group including the first PE device and the second PE device, where the first PE device is a primary device, and the second PE device is a backup device. As shown in FIG. 26, the first PE device includes: a first bus 2601; and a first processor 2602, a first memory 2603 and a first interface 2604 that are connected to the first bus 2601, where the first memory 2603 is configured to store an instruction, and the first processor 2602 is configured to execute the instruction to perform the following operations:

generating a virtual node on the first PE device, where the virtual node has a global unique Router ID in the network system, the virtual node is used as a next hop node of the first PE device, and the virtual node is used as a next hop node of the second PE device;

triggering the first interface 2604 to send, by using the first bus 2601, a first link state message to the Ingress PE, where the first link state message includes: a Router ID of the first PE device and state information of a link from the first PE device to the virtual node, and the state information of the link from the first PE device to the virtual node includes a cost value M of the link from the first PE device to the virtual node and the Router ID of the virtual node; and triggering the first interface 2604 to send, by using the first bus 2601, a second link state message to the Ingress PE, where the second link state message includes: the Router ID of the virtual node, state information of a link from the virtual node to the first PE device and state information of a link from the virtual node to the second PE device, the state information of the link from the virtual node to the first PE device includes a cost value N of the link from the virtual node to the first PE device and the Router ID of the first PE device, and the state information of the link from the virtual node to the second PE device includes a cost value T of the link from the virtual node to the second PE device and a router ID of the second PE device, where N and T are maximum cost values in an Interior Gateway Protocol (IGP).

Similarly, the second PE device may also include a second bus; and a second processor, a second memory and a second interface that are connected to the second bus, where the second memory is configured to store an instruction, and the second processor is configured to execute the instruction to perform the following operations:

generating the virtual node on the second PE device;

triggering the second interface to send, by using the second bus, a third link state message to the Ingress PE, where the third link state message includes: a Router ID of the second PE device and state information of a link from the second PE device to the virtual node, and the state information of the link from the second PE device to the virtual node includes a cost value S of the link from the second PE device to the virtual node and the Router ID of the virtual node; and triggering the second interface to send, by using the second bus, a fourth link state message to the Ingress PE, where the fourth link state message includes: the Router ID of the virtual node, state information of a link from the virtual node to the first PE device and state information of a link from the virtual node to the second PE device, the state information of the link from the virtual node to the first PE device includes a cost value N of the link from the virtual node to the first PE device and the Router ID of the first PE device, and the state information of the link from the virtual node to the second PE device includes a cost value T of the link from the virtual node to the second PE device and a Router ID of the second PE device, where N and T are maximum cost values in an Interior Gateway Protocol IGP.

After receiving the first link state message, the second link state message, the third link state message and the fourth link state message, the Ingress PE obtains a vNH of the virtual node, the cost value M of the link from the first PE device to the virtual node and the cost value S of the link from the second PE device to the virtual node.

According to different tunnel types used in the network, any one of the first link state message, the second link state message, the third link state message and the fourth link state message may further include other attributes, for example, for an MPLS TE tunnel, the any one further includes one or more of a bandwidth, an affinity, a color and the like.

The cost values of the links are set by using multiple methods, for example, for the MPLS TE tunnel using an explicit route, the cost value, S or M, of the link, may be set to any valid cost value in the IGP. The cost value of the link S or M may be also statically configured.

At least one of the first processor and the second processor determines the cost value M of the link from the first PE device to the virtual node and the cost value S of the link from the second PE device to the virtual node according to a manner (1) or (2), and synchronizes the determined cost value M of the link from the first PE device to the virtual node and the determined cost value S of the link from the second PE device to the virtual node to the redundancy protection group in which the first PE device and the second PE device are located:

(1) S and M satisfy:

$$\begin{cases} Sxy4 + S > Sxy3 + M \text{ and} \\ C34 + S > M \end{cases}$$

where Px is any neighboring node of the first PE device, Pxy is any neighboring node of Px in a network excluding the first PE device, Sxy3 is a cost value of a shortest path from Pxy to the first PE device, Sxy4 is a cost value of a shortest path from Pxy to the second PE device, and C34 is a cost value of a shortest path from the first PE device to the second PE device.

(2) S and M satisfy:

$$X+M<Y+S\square$$

where X is a cost value of a shortest path from the Ingress PE to the first Egress PE, and Y is a cost value of a shortest path from the Ingress PE to the second Egress PE.

In manner (1), S and M that satisfy both the inequality □ and the inequality □ are solved, that is, an M–S pair satisfying both the inequality □ and the inequality □ is solved.

For calculation on a cost value of a link from an Egress PE to a virtual node, each Egress PE in the redundancy protection group may calculate an M–S pair satisfying the inequality □ and the inequality □, that is, PE3 in the redundancy protection group may calculate an M–S pair satisfying the inequality □ and the inequality □, and PE4 in the redundancy protection group may also calculate an M–S pair satisfying the inequality □ and the inequality □.

If multiple Egress PEs in the redundancy protection group calculate different M–S pairs, the multiple Egress PEs may determine M and S finally deployed on all Egress PEs of the redundancy protection group by means of negotiation between each other.

Optionally, if multiple M–S pairs satisfying conditions are obtained according to manner (1) or (2), an M–S pair whose S is minimum or an M–S pair whose M is minimum is selected, and the selected M–S pair is synchronized to all the Egress PE of the redundancy protection group. M in the selected M–S pair is carried in the first link state information, and S in the selected M–S pair is carried in the third link state information.

Optionally, an M–S pair may be determined on any Egress PE in the redundancy protection group according to manner (1) or manner (2), and the determined M–S pair is synchronized to another Egress PE in the redundancy protection group. Optionally, the synchronizing the determined M–S pair to another Egress PE in the redundancy protection group may be implemented by using a synchronization protocol.

Optionally, M and S may be also configured on all the Egress PEs of the redundancy protection group directly according to manner (2). For example, M may be set to 1, and S is set to a maximum value of cost values in the IGP protocol.

Optionally, M and S may be further calculated according to manner (1) or (2) on multiple Egress PEs of the redundancy protection group. If multiple M–S pairs satisfying the conditions are obtained according to manner (1) or (2), an M–S pair whose S is minimum or an M–S pair whose M is minimum is selected. Certainly, an M–S pair satisfying the inequalities ☐ and ☐ may be also selected randomly. M in the selected M–S pair is carried in the first link state information, and S in the selected M–S pair is carried in the third link state information.

When an Open Shortest Path First (OSPF) protocol is run between devices in the network, after a virtual node is generated on the first PE device, both a link state and a neighbor relationship of the first PE device change, and therefore the first PE device updates its own link state and neighbor relationship, constructs a first link state advertisement (LSA), and floods the first LSA into the entire network, where the first LSA includes: a Router ID of the first PE device and state information of a link from the first PE device to the virtual node, and the state information of a link from the first PE device to the virtual node includes a cost value of the link from the first PE device to the virtual node and the Router ID of the virtual node. Because the virtual node is generated on the first PE device, the first PE device further "represents" the virtual node to construct a second LSA, and floods the second LSA into the entire network. The second LSA includes: the Router ID of the virtual node, state information of a link from the virtual node to the first PE device and link state information of a link from the virtual node to the second PE device. The state information of the link from the virtual node to the first PE device includes a cost value of the link from the virtual node to the first PE device and a Router ID of the first PE device, and the state information of the link from the virtual node to the second PE device includes a cost value of the link from the virtual node to the second PE device and a Router ID of the second PE device. Similarly, other Egress PEs in the redundancy protection group also construct corresponding LSAs and flood these LSAs into an entire OSPF field, where the OSPF field may be the entire network. For example, after the virtual node is generated on the second PE device, both a link state and a neighbor relationship of the second PE device change, and therefore the second PE device updates its own link state and neighbor relationship, constructs a third LSA, and floods the third LSA into the entire network. The third LSA includes: a Router ID of the second PE device and state information of a link from the second PE device to the virtual node, and the state information of the link from the second PE device to the virtual node includes a cost value of the link from the second PE device to the virtual node and the Router ID of the virtual node. Because the virtual node is generated on the second PE device, the second PE device further "represents" the virtual node to construct a fourth LSA, and floods the fourth LSA into the entire network. The fourth LSA includes: the Router ID of the virtual node, state information of a link from the virtual node to the first PE device and state information of a link from the virtual node to the second PE device. The state information of the link from the virtual node to the first PE device includes a cost value of the link from the virtual node to the first PE device and a Router ID of the first PE device, and the state information of the link from the virtual node to the second PE device includes a cost value of the link from the virtual node to the second PE device and a Router ID of the second PE device. The first PE device and the second PE device flood these LSAs into the OSPF field. In this way, another node located in the same OSPF field as the first PE device and the second PE device, such as PE1, can "see" the virtual node, the link between the virtual node and the first PE device, and the link between the virtual node and the second PE device, and therefore a tunnel from PE1 to a vNH of the virtual node can be established. The link state is description information on an OSPF interface of a router, such as an IP address on the interface, a subnet mask, a network type, and a cost value. OSPF routers exchange link states rather than routing tables between each other, and an OSPF router (such as PE1) calculates a precise network path reaching each target by obtaining all link state information in the network.

When an Intermediate System to Intermediate System (ISIS) protocol is run between the first PE device and the second PE device, after a virtual node is generated on PE3, both a link state and a neighbor relationship of the first PE device change, and therefore the first PE device updates its own link state and neighbor relationship, constructs a first link state packet LSP (Link-state PDU), and floods the first LSP into the entire network, where the first LSP includes: a Router ID of the first PE device and state information of a link from the first PE device to the virtual node, and the state information of the link from the first PE device to the virtual node includes a cost value of the link from the first PE device to the virtual node and the Router ID of the virtual node. Because the virtual node is generated on the first PE device, the first PE device further "represents" the virtual node to construct a second LSP, and floods the second LSP into the entire network. The second LSP includes: the Router ID of the virtual node, state information of a link from the virtual node to the first PE device and link state information of a link from the virtual node to the second PE device. The state information of the link from the virtual node to the first PE device includes a cost value of the link from the virtual node to the first PE device and a Router ID of the first PE device, and the state information of the link from the virtual node to the second PE device includes a cost value of the link from the virtual node to the second PE device and a Router ID of the second PE device. Similarly, other Egress PEs in the redundancy protection group, for example, also construct corresponding LSPs and flood these LSPs into an entire ISIS field, where the ISIS field may be the entire network. For example, after the virtual node is generated on the second PE device, both a link state and a neighbor relationship of the second PE device change, and therefore the second PE device updates its own link state and neighbor relationship, constructs a third LSP, and floods the third LSP into the entire network. The third LSP includes: a Router ID of the second PE device and state information of a link from the second PE device to the virtual node, and the state information of the link from the second PE device to the virtual node includes a cost value of the link from the second PE device to the virtual node and the Router ID of the virtual node. Because the virtual node is generated on the second PE device, the second PE device further "represents" the virtual node to construct a fourth LSP, and floods the fourth LSP into the entire network. The fourth LSP includes: the Router ID of the virtual node, state information of a link from the virtual node to the first PE device and state information of a link from the virtual node to the second PE device. The state information of the link from the virtual node to the first PE device includes a cost value of the link from the virtual node to the first PE device and a Router ID of the first PE device, and the state information of the link from the virtual node to the second PE device includes a cost value of the link from the virtual node to the second PE device and a Router ID of the second PE device. The first PE device and the second PE device flood these LSPs into the ISIS field. In this way, another node located in the same ISIS field as the first PE device and the second PE device, such as PE1, can "see" the virtual node, the link between the virtual node and the first PE device, and the link between the virtual node and the second PE device, and therefore a tunnel from PE1 to a vNH of the virtual node can be established.

An attribute value (cost value) of a link between the generated virtual node and an Egress PE in the redundancy protection group may be automatically set or manually set according to a situation. For example, if it is intended that the first PE device becomes a node through which a primary path of a tunnel passes, and that the second PE device becomes a node through which a backup path of the tunnel passes, a cost value of the link from the first PE device to the virtual node may be set to 1, and a cost value of the link from PE4 to the virtual node may be set to a maximum cost value in the IGP. According to different IGPs run between the first PE device and the second PE device, a different maximum cost value of a link may be set, for example, when OSPF is run in the network, a maximum cost value of a link may be set to 65535. To disable the virtual node to undertake transit traffic, both the cost value of the link from the virtual node to the first PE device and the cost value of the link from the virtual node to the second PE device may be set to a maximum cost value in the IGP. To avoid the transit traffic, the virtual node needs to be configured to be in an overload mode. In the OSPF protocol, implementation may be performed by setting the cost value of the link from the virtual node to the first PE device and the cost value of the link from the virtual node to the second PE device to the maximum cost value in the IGP. In the ISIS protocol, implementation may be performed by setting overload bit bits of the second LSP and the fourth LSP to 1. In the IGP, a physical link is generally bidirectional, links described in the IGP are all directional, and each direction needs to be described individually. Cost values of a physical link in different directions may be different, or may be the same.

Optionally, the first processor may further execute the instruction to perform the following operation: negotiating with the second PE device to determine a same Router ID of the virtual node. Correspondingly, the second processor may further execute the instruction to perform the following operation: negotiating with the first processor of the first PE device to determine a same Router ID of the virtual node. For details of a method for negotiating a Router ID of a virtual node, reference may be made to FIG. 4 and a paragraph corresponding to FIG. 4, and reference may be also made to FIG. 5 to FIG. 10 and paragraphs corresponding to FIG. 5 to FIG. 10.

Optionally, the first processor 2602 may further execute the instruction to perform the following operation: negotiating with the second PE device to determine a same label. Correspondingly, the second processor may further execute the instruction to perform the following operation: negotiating with the first PE device to determine a same label. For details of a method for determining a same label by means of negotiation, reference may be made to FIG. 12 to FIG. 17 and paragraphs corresponding to FIG. 12 to FIG. 17.

Optionally, each module in this embodiment of the present application may be implemented by using corresponding hardware.

The network system, the first Egress PE, and the second Egress PE may be applied to an L2VPN or an L3VPN.

In this embodiment of the present application, when a primary Egress PE and a backup Egress PE publish a virtual routing forwarding (VRF) route to which a CE node belongs, the primary Egress PE and the backup Egress PE separately allocate a same VPN route label to each VRF label (such as a first VRF label).

In the method, the device, and the system described in the embodiments of the present application, a same virtual next hop is configured on an Egress PE in a redundancy protection group, and an address of the virtual next hop node is sent to an Ingress PE, so that the Ingress PE can establish a primary tunnel passing through a primary Egress PE, and a backup tunnel sequentially passing through a previous-hop node of the primary Egress PE, a previous-hop node of a backup Egress PE, and the backup Egress; and when a fault occurs in the primary Egress PE, the primary tunnel can be directly switched to the backup tunnel, a quantity of node devices involved in the switching is relatively small, and therefore protection switching can be completed in a relatively short time, where for an upper-layer service carried on the tunnel, the switching is seamless, and is not perceived by the upper-layer service.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit. For example, a detector, a sender, a receiver, and an obtaining unit may be all implemented by using a general-purpose central processing unit CPU or an application specific integrated circuit (ASIC) or a field-programmable gate array (FPGA).

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present application but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A network system, comprising a first egress provider edge device (Egress PE), a second Egress PE and an ingress provider edge device (Ingress PE), wherein the first Egress PE communicates with a customer edge device (CE), and the second Egress PE communicates with the CE,
   wherein the first Egress PE and the second Egress PE are located in a redundancy protection group comprising the first Egress PE and the second Egress PE, wherein the first Egress PE is a primary device, and the second Egress PE is a backup device;
   wherein the first Egress PE comprises a first processor and a first memory storing a first program to be executed in the first processor, the first program including instructions for:
      generating a virtual node, wherein the virtual node has a global unique Router ID in the network system, the virtual node is used as a next hop node of the first Egress PE, and the virtual node is used as a next hop node of the second Egress PE;
      sending a first link state message to the Ingress PE, wherein the first link state message comprises a Router ID of the first Egress PE and state information of a link from the first Egress PE to the virtual node, and the state information of the link from the first Egress PE to the virtual node comprises a cost value M of the link from the first Egress PE to the virtual node and the Router ID of the virtual node; and
      sending a second link state message to the Ingress PE, wherein the second link state message comprises the Router ID of the virtual node, state information of a link from the virtual node to the first Egress PE and state information of a link from the virtual node to the second Egress PE, the state information of the link from the virtual node to the first Egress PE comprises a cost value N of the link from the virtual node to the first Egress PE and the Router ID of the first Egress PE, and the state information of the link from the virtual node to the second Egress PE comprises a cost value T of the link from the virtual node to the second Egress PE and a Router ID of the second Egress PE; and
   wherein the second Egress PE comprises a second processor and a second memory storing a second program to be executed in the second processor, the second program including instructions for:
      generating the virtual node;
      sending a third link state message to the Ingress PE, wherein the third link state message comprises the Router ID of the second Egress PE and state information of a link from the second Egress PE to the virtual node, and the state information of the link from the second Egress PE to the virtual node comprises a cost value S of the link from the second Egress PE to the virtual node and the Router ID of the virtual node; and
      sending a fourth link state message to the Ingress PE, wherein the fourth link state message comprises the Router ID of the virtual node, the state information of the link from the virtual node to the first Egress PE and the state information of the link from the virtual node to the second Egress PE, the state information of the link from the virtual node to the first Egress PE comprises the cost value N of the link from the virtual node to the first Egress PE and the Router ID of the first Egress PE, and the state information of the link from the virtual node to the second Egress PE comprises the cost value T of the link from the virtual node to the second Egress PE and the Router ID of the second Egress PE, wherein N and T are maximum cost values in an Interior Gateway Protocol (IGP), and S and M satisfy groups (1) or (2):

$$\begin{cases} Sxy4 + S > Sxy3 + M \quad \text{and} \\ C34 + S > M \end{cases} \quad (1)$$

wherein Px is any neighboring node of the first Egress PE, Pxy is any neighboring node of Px in a network excluding the first Egress PE, Sxy3 is a cost value of a shortest path from Pxy to the first Egress PE, Sxy4 is a cost value of a shortest path from Pxy to the second Egress PE, and C34 is a cost value of a shortest path from the first Egress PE to the second Egress PE; and $$X+M<Y+S \quad (2)$$

wherein X is a cost value of a shortest path from the Ingress PE to the first Egress PE, and Y is a cost value of a shortest path from the Ingress PE to the second Egress PE;
where the network system further satisfies with one or more of (a)-(c):
(a) wherein if multiple M–S pairs satisfy groups (1) or (2), an M–S pair whose S is minimum or an M–S pair whose M is minimum is selected, M in the selected M–S pair is carried in the first link state message, and S in the selected M–S pair is carried in the third link state message;
(b) wherein in the group (2), M=1, and S is a maximum IGP cost value;
(c) wherein the Router ID of the virtual node is an Internet Protocol (IP) address that is Possessed by one with a higher priority in the first Egress PE and the second Egress PE and is not occupied.

2. The network system according to claim 1, wherein the Router ID of the virtual node is statically configured, or obtained by using a dynamic negotiation between the first Egress PE and the second Egress PE.

3. The network system according to claim 1, wherein the Router ID of the virtual node is a loopback identifier.

4. A network system comprising a first egress provider edge device (Egress PE), a second Egress PE and an ingress provider edge device (Ingress PE), wherein the first Egress PE communicates with a customer edge device (CE), and the second Egress PE communicates with the CE, wherein the first Egress PE and the second Egress PE are located in a redundancy protection group comprising the first Egress PE and the second Egress PE, wherein the first Egress PE is a primary device, and the second Egress PE is a backup device;
  wherein the first Egress PE comprises a first processor and a first memory storing a first program to be executed in the first processor, the first program including instructions for:
    generating a virtual node, wherein the virtual node has a global unique Router ID in the network system, the virtual node is used as a next hop node of the first Egress PE, and the virtual node is used as a next hop node of the second Egress PE;
    sending a first link state message to the Ingress PE, wherein the first link state message comprises: a Router ID of the first Egress PE and state information of a link from the first Egress PE to the virtual node, and the state information of the link from the first Egress PE to the virtual node comprises a cost value M of the link from the first Egress PE to the virtual node and the Router ID of the virtual node; and
    sending a second link state message to the Ingress PE, wherein the second link state message comprises: the Router ID of the virtual node, state information of a link from the virtual node to the first Egress PE and state information of a link from the virtual node to the second Egress PE, the state information of the link from the virtual node to the first Egress PE comprises a cost value N of the link from the virtual node to the first Egress PE and the Router ID of the first Egress PE, and the state information of the link from the virtual node to the second Egress PE comprises a cost value T of the link from the virtual node to the second Egress PE and a Router ID of the second Egress PE; and
  wherein the second Egress PE comprises a second processor and a second memory storing a second program to be executed in the second processor, the second program including instructions for:
    generating the virtual node;
    sending a third link state message to the Ingress PE, wherein the third link state message comprises the Router ID of the second Egress PE and state information of a link from the second Egress PE to the virtual node, and the state information of the link from the second Egress PE to the virtual node comprises a cost value S of the link from the second Egress PE to the virtual node and the Router ID of the virtual node; and
    sending a fourth link state message to the Ingress PE, wherein the fourth link state message comprises: the Router ID of the virtual node, the state information of the link from the virtual node to the first Egress PE and the state information of the link from the virtual node to the second Egress PE, the state information of the link from the virtual node to the first Egress PE comprises the cost value N of the link from the virtual node to the first Egress PE and the Router ID of the first Egress PE, and the state information of the link from the virtual node to the second Egress PE comprises the cost value T of the link from the virtual node to the second Egress PE and the Router ID of the second Egress PE;

wherein the first program further includes instructions for allocating a first label to a first forwarding equivalence class of a first virtual private network (VPN), and send the first label and the Router ID of the virtual node to the Ingress PE; and wherein the second program further includes instructions for allocating the first label to the first forwarding equivalence class of the first VPN, and send the first label and the Router ID of the virtual node to the Ingress PE;

wherein the Router ID of the virtual node is one of:
  an IP address that is possessed by the first Egress PE and is not occupied;
  an Internet Protocol (IP) address that is possessed by the second Egress PE and is not occupied;
  an IP address that is possessed by one with a higher priority in the first Egress PE and the second Egress PE and is not occupied; and
  a loopback identifier.

5. The network system according to claim 4, wherein the Router ID of the virtual node is statically configured, or obtained by using a dynamic negotiation between the first Egress PE and the second Egress PE.

6. The network system according to claim 4, wherein the first label is statically configured, or obtained by using a dynamic negotiation between the first Egress PE and the second Egress PE.

7. A method for establishing a tunnel, wherein the method is applied to a network system, wherein the network system comprises a first egress provider edge device (Egress PE), a second Egress PE and an ingress provider edge device (Ingress PE), the first Egress PE communicates with a customer edge device (CE), the second Egress PE communicates with the CE, and the first Egress PE and the second Egress PE are located in a redundancy protection group comprising the first Egress PE and the second Egress PE, wherein the first Egress PE is a primary device, and the second Egress PE is a backup device; and wherein the method comprises:
  generating a virtual node on the first Egress PE, wherein the virtual node has a global unique Router ID in the network system, the virtual node is used as a next hop node of the first Egress PE, and the virtual node is used as a next hop node of the second Egress PE;
  generating the virtual node on the second Egress PE;
  sending, by the first Egress PE, a first link state message to the Ingress PE, wherein the first link state message comprises: a Router ID of the first Egress PE and state information of a link from the first Egress PE to the virtual node, and the state information of the link from the first Egress PE to the virtual node comprises a cost value M of the link from the first Egress PE to the virtual node and the Router ID of the virtual node;
  sending, by the first Egress PE, a second link state message to the Ingress PE, wherein the second link state message comprises: the Router ID of the virtual node, state information of a link from the virtual node to the first Egress PE and state information of a link from the virtual node to the second Egress PE, the state information of the link from the virtual node to the first Egress PE comprises a cost value N of the link from the virtual node to the first Egress PE and the Router ID of the first Egress PE, and the state information of the link from the virtual node to the second Egress PE comprises a cost value T of the link from the virtual node to the second Egress PE and a Router ID of the second Egress PE;

sending, by the second Egress PE, a third link state message to the Ingress PE, wherein the third link state message comprises: the Router ID of the second Egress PE and state information of a link from the second Egress PE to the virtual node, and the state information of the link from the second Egress PE to the virtual node comprises a cost value S of the link from the second Egress PE to the virtual node and the Router ID of the virtual node; and sending, by the second Egress PE, a fourth link state message to the Ingress PE, wherein the fourth link state message comprises: the Router ID of the virtual node, the state information of the link from the virtual node to the first Egress PE and the state information of the link from the virtual node to the second Egress PE, the state information of the link from the virtual node to the first Egress PE comprises the cost value N of the link from the virtual node to the first Egress PE and the Router ID of the first Egress PE, and the state information of the link from the virtual node to the second Egress PE comprises the cost value T of the link from the virtual node to the second Egress PE and the Router ID of the second Egress PE, wherein N and T are maximum cost values in an Interior Gateway Protocol (IGP), and S and M satisfy groups (1) or (2):

$$\begin{cases} Sxy4 + S > Sxy3 + M \text{ and} \\ C34 + S > M \end{cases} \quad (1)$$

wherein Px is any neighboring node of the first Egress PE, Pxy is any neighboring node of Px in a network excluding the first Egress PE, Sxy3 is a cost value of a shortest path from Pxy to the first Egress PE, Sxy4 is a cost value of a shortest path from Pxy to the second Egress PE, and C34 is a cost value of a shortest path from the first Egress PE to the second Egress PE; and $$X+M<Y+S \quad (2)$$

wherein X is a cost value of a shortest path from the Ingress PE to the first Egress PE, and Y is a cost value of a shortest path from the Ingress PE to the second Egress PE;

where the network system further satisfies with one or more of (a)-(c):

(a) wherein the generating the virtual node on the first Egress PE and the second Egress PE comprises: generating, by the first Egress PE and the second Egress PE, the virtual node by using a dynamic negotiation respectively;

wherein the generating, by the first Egress PE and the second Egress PE, the virtual node by using a dynamic negotiation comprises: establishing an Inter-Chassis Communication Protocol (ICCP) connection between the first Egress PE and the second Egress PE, separately sending their respective priorities to each other, and selecting a party with a higher priority to determine the Router ID of the virtual node;

(b) wherein if multiple M–S pairs satisfy groups (1) or (2), an M–S pair whose S is minimum or an M–S pair whose M is minimum is selected, M in the selected M–S pair is carried in the first link state message, and S in the selected M–S pair is carried in the third link state message;

(c) wherein in group (2), M=1, and S is a maximum IGP cost value.

8. The method according to claim 7, wherein the Router ID of the virtual node is: an Internet Protocol (IP) address that is possessed by the party with a higher priority in the first Egress PE and the second Egress PE and is not occupied.

9. The method according to claim 8, wherein if the priority of the first Egress PE is equal to that of the second Egress PE, an address of the first Egress PE is compared with that of the second Egress PE, the Router ID of the virtual node is determined by one party with a larger or smaller address in the first Egress PE and the second Egress PE.

10. The method according to claim 9, wherein the Router ID of the virtual node is one of:
an address that is possessed by the one party with the larger address in the first Egress PE and the second Egress PE and is not occupied; and
an address that is possessed by the one party with the smaller address in the first Egress PE and the second Egress PE and is not occupied.

11. The method according to 7,
wherein the generating, by the first Egress PE and the second Egress PE, the virtual node by using a dynamic negotiation comprises: adding a first type-length-value (TLV) to an Inter-Chassis Communication Protocol (ICCP) packet, wherein the first TLV comprises a vNH field and a priority field, the priority field carries a priority of a sender of the ICCP packet, and the vNH field carries an address of the sender of the ICCP packet.

12. The method according to claim 7, further comprising: allocating, by the first Egress PE and the second Egress PE, a first label by using the dynamic negotiation, and the allocating is implemented by carrying a second TLV in the ICCP packet, wherein the second TLV comprises a VPN label field and a priority field, the priority field carries the priority of a sender of the ICCP packet, and the VPN label field carries the first label provided by the sender of the ICCP packet.

13. The method according to claim 12, wherein the second TLV further comprises an available label upper limit field and an available label lower limit field, wherein the available label upper limit field and the available label lower limit field are used for determining a label range that may be provided by the sender of the ICCP packet.

14. The method according to claim 7, further comprising: allocating, by the first Egress PE and the second Egress PE, a first label, and the allocating comprises: establishing the ICCP connection between the first Egress PE and the second Egress PE, separately sending their respective priorities to each other, and selecting a party with the higher priority to determine the first label.

15. The method according to claim 14, wherein if the priority of the first Egress PE is equal to that of the second Egress PE, the address of the first Egress PE is compared with that of the second Egress PE, the first label is determined by the party with the larger or smaller address in the first Egress PE and the second Egress PE.

16. A method for allocating a label, wherein the method is applied to a network system, wherein the network system comprises a first egress provider edge device (Egress PE), a second Egress PE and an ingress provider edge device (Ingress PE), the first Egress PE communicates with a customer edge device (CE), the second Egress PE communicates with the CE, and the first Egress PE and the second Egress PE are located in a redundancy protection group comprising the first Egress PE and the second Egress PE, wherein the first Egress PE is a primary device, and the second Egress PE is a backup device; and wherein the method comprises:
generating a virtual node on the first Egress PE, wherein the virtual node has a global unique Router ID in the network system, the virtual node is used as a next hop node of the first Egress PE, and the virtual node is used as a next hop node of the second Egress PE;

generating the virtual node on the second Egress PE;

sending, by the first Egress PE, a first link state message to the Ingress PE, wherein the first link state message comprises: a Router ID of the first Egress PE and state information of a link from the first Egress PE to the virtual node, and the state information comprises a cost value M of the link from the first Egress PE to the virtual node and the Router ID of the virtual node;

sending, by the first Egress PE, a second link state message to the Ingress PE, wherein the second link state message comprises: the Router ID of the virtual node, state information of a link from the virtual node to the first Egress PE and state information of a link from the virtual node to the second Egress PE, the state information of the link from the virtual node to the first Egress PE comprises a cost value N of the link from the virtual node to the first Egress PE and the Router ID of the first Egress PE, and the state information of the link from the virtual node to the second Egress PE comprises a cost value T of the link from the virtual node to the second Egress PE and a Router ID of the second Egress PE;

sending, by the second Egress PE, a third link state message to the Ingress PE, wherein the third link state message comprises: the Router ID of the second Egress PE and state information of a link from the second Egress PE to the virtual node, and the state information of the link from the second Egress PE to the virtual node comprises a cost value S of the link from the second Egress PE to the virtual node and the Router ID of the virtual node;

sending, by the second Egress PE, a fourth link state message to the Ingress PE, wherein the fourth link state message comprises: the Router ID of the virtual node, the state information of the link from the virtual node to the first Egress PE and the state information of the link from the virtual node to the second Egress PE, the state information of the link from the virtual node to the first Egress PE comprises the cost value N of the link from the virtual node to the first Egress PE and the Router ID of the first Egress PE, and the state information of the link from the virtual node to the second Egress PE comprises the cost value T of the link from the virtual node to the second Egress PE and the Router ID of the second Egress PE;

allocating, by the first Egress PE, a first label to a first forwarding equivalence class of a first virtual private network (VPN), and sending the first label and the Router ID of the virtual node to the Ingress PE; and allocating, by the second Egress PE, the first label to the first forwarding equivalence class of the first VPN, and sending the first label and the Router ID of the virtual node to the Ingress PE;

wherein the generating the virtual node on the first Egress PE and the second Egress PE comprises: generating, by the first Egress PE and the second Egress PE, the virtual node by using dynamic negotiation, respectively;

where the network system further satisfies with one or more of (a)-(d):

(a) wherein the generating, by the first Egress PE and the second Egress PE, the virtual node by using dynamic negotiation comprises: establishing an Inter-Chassis Communication Protocol (ICCP) connection between the first Egress PE and the second Egress PE, separately sending their respective priorities to each other, and selecting a party with a higher priority to determine the Router ID of the virtual node;

(b) wherein the Router ID of the virtual node is one of:
an address that is possessed by a party with the larger address in the first Egress PE and the second Egress PE and is not occupied;
an address that is possessed by the party with the smaller address in the first Egress PE and the second Egress PE and is not occupied;
a loopback address; and
an IP address that is possessed by the party with a higher priority in the first Egress PE and the second Egress PE and is not occupied;

(c) wherein the generating, by the first Egress PE and the second Egress PE, the virtual node by using dynamic negotiation comprises: adding a first type-length-value TLV to an Inter-Chassis Communication Protocol ICCP packet, wherein the first TLV comprises a vNH field and a priority field, the priority field carries a priority of a sender of the ICCP packet, and the vNH field carries an address of the sender of the ICCP packet;

(d) wherein the allocating, by the first Egress PE and the second Egress PE, the first label to the first forwarding equivalence class of the first VPN separately comprises: allocating, by the first Egress PE and the second Egress PE, the first label by using dynamic negotiation.

17. The method according to claim 16, wherein if the priority of the first Egress PE is equal to that of the second Egress PE, an address of the first Egress PE is compared with that of the second Egress PE, the Router ID of the virtual node is determined by one party with a larger or smaller address in the first Egress PE and the second Egress PE.

18. The method according to claim 16, wherein the allocating, by the first Egress PE and the second Egress PE, the first label by using dynamic negotiation comprises: establishing the ICCP connection between the first Egress PE and the second Egress PE, separately sending their respective priorities to each other, and selecting a party with the higher priority to determine the first label.

19. The method according to claim 18, wherein if the priority of the first Egress PE is equal to that of the second Egress PE, the address of the first Egress PE is compared with that of the second Egress PE, the first label is determined by the party with the larger or smaller address in the first Egress PE and the second Egress PE.

20. The method according to claim 16, wherein the allocating, by the first Egress PE and the second Egress PE, the first label by using dynamic negotiation is implemented by carrying a second TLV in the ICCP packet, wherein the second TLV comprises a VPN label field and a priority field, the priority field carries the priority of a sender of the ICCP packet, and the VPN label field carries the first label provided by the sender of the ICCP packet.

21. The method according to claim 20, wherein the second TLV further comprises an available label upper limit field and an available label lower limit field, wherein the available label upper limit field and the available label lower limit field are used for determining a label range that may be provided by the sender of the ICCP packet.

22. A first provider edge device (PE), wherein the first PE is located in a network system comprising a second PE, an ingress provider edge device (Ingress PE) and the first PE, the first PE and the second PE are used as egress provider edge devices (Egress PEs), the first PE and the second PE are located in a redundancy protection group comprising the first PE and the second PE, the first PE is used as a primary PE, the second PE is used as a backup PE, the first PE communicates with a customer edge device (CE), and the second PE communicates with the CE; and wherein the first PE comprises a first processor, and a non-transitory computer-readable medium storing first program modules executable by the first processor, the first program modules including: a first virtual node generating module, a first state publishing module, and a first virtual node state publishing module, wherein the first virtual node generating module is configured to generate a virtual node on the first PE, wherein the virtual node has a global unique Router ID in the network system, the virtual node is used as a next hop node of the first PE, and the virtual node is used as a next hop node of the second PE;

wherein the first state publishing module is configured to send a first link state message to the Ingress PE, wherein the first link state message comprises: a Router ID of the first PE and state information of a link from the first PE to the virtual node, and the state information of the link from the first PE to the virtual node comprises a cost value M of the link from the first PE to the virtual node and the Router ID of the virtual node; and wherein the first virtual node state publishing module is configured to send a second link state message to the Ingress PE, wherein the second link state message comprises: the Router ID of the virtual node, state information of a link from the virtual node to the first PE and state information of a link from the virtual node to the second PE, the state information of the link from the virtual node to the first PE comprises a cost value N of the link from the virtual node to the first PE and the Router ID of the first PE, and the state information of the link from the virtual node to the second PE comprises a cost value T of the link from the virtual node to the second PE and a Router ID of the second PE, wherein N and T are maximum cost values in an Interior Gateway Protocol (IGP), and S and M satisfy groups (1) or (2):

$$\begin{cases} Sxy4 + S > Sxy3 + M \quad \text{and} \\ C34 + S > M \end{cases} \quad (1)$$

wherein Px is any neighboring node of the first PE, Pxy is any neighboring node of Px in a network excluding the first PE, Sxy3 is a cost value of a shortest path from Pxy to the first PE, Sxy4 is a cost value of a shortest path from Pxy to the second PE, and C34 is a cost value of a shortest path from the first PE to the second PE, S is a cost value of the link from the second PE to the virtual node; and $$X+M<Y+S \quad (2)$$

wherein X is a cost value of a shortest path from the Ingress PE to the first PE, and Y is a cost value of a shortest path from the Ingress PE to the second PE;

where the network system further satisfies with one or more of (a)-(b):

(a) wherein if multiple M–S pairs satisfy groups (1) or (2), an M–S pair whose S is minimum or an M–S pair whose M is minimum is selected, M in the selected M–S pair is carried in the first link state message, and S in the selected M–S pair is carried in the third link state message;

(b) wherein in group (2), M=1, and S is a maximum IGP cost value.

23. The first PE according to claim 22, further comprising a first virtual node address negotiation module, configured to negotiate with the second PE to determine a same Router ID of the virtual node.

24. The first PE according to claim 22, wherein the first PE may further comprise a first label negotiation module, configured to negotiate with the second PE to determine a same label.

* * * * *